(12) United States Patent  (10) Patent No.: US 8,773,516 B2
Matsumoto  (45) Date of Patent: Jul. 8, 2014

(54) VIDEO SIGNAL PROCESSING APPARATUS, VIDEO DISPLAY APPARATUS, VIDEO SIGNAL PROCESSING METHOD, AND INTEGRATED CIRCUIT

(75) Inventor: Keizo Matsumoto, Okayama (JP)

(73) Assignee: Panasonic Corporation, Osaka (JP)

( * ) Notice: Subject to any disclaimer, the term of this patent is extended or adjusted under 35 U.S.C. 154(b) by 862 days.

(21) Appl. No.: 12/947,923

(22) Filed: Nov. 17, 2010

(65) Prior Publication Data

US 2011/0115981 A1 May 19, 2011

(30) Foreign Application Priority Data

Nov. 18, 2009  (JP) ................................. 2009-263395
Dec. 22, 2009  (JP) ................................. 2009-291519
Nov. 12, 2010  (JP) ................................. 2010-253835

(51) Int. Cl.
*G09G 5/00*  (2006.01)
*H04N 9/47*  (2006.01)
*H04N 13/00*  (2006.01)

(52) U.S. Cl.
CPC ....... *H04N 13/0018* (2013.01); *H04N 13/0037* (2013.01)
USPC ................................................ 348/53; 345/8

(58) Field of Classification Search
CPC ..................... H04N 13/0018; H04N 13/0037
USPC ................................................ 345/8; 348/53
See application file for complete search history.

(56) References Cited

U.S. PATENT DOCUMENTS

2008/0036696 A1* 2/2008 Slavenburg et al. ............. 345/8
2011/0025832 A1  2/2011 Cowan et al.

FOREIGN PATENT DOCUMENTS

| JP | 08-331600 | 12/1996 |
| JP | 2000-134644 | 5/2000 |
| JP | 2001-054142 | 2/2001 |
| JP | 2001-258052 | 9/2001 |
| JP | 2008-072699 | 3/2008 |
| JP | 2009-507401 | 2/2009 |
| WO | 2006/128066 | 11/2006 |

* cited by examiner

*Primary Examiner* — Sath V Perungavoor
*Assistant Examiner* — Xiaolan Xu
(74) *Attorney, Agent, or Firm* — Wenderoth, Lind & Ponack, L.L.P.

(57) ABSTRACT

A CT processing unit as an example of a video signal processing apparatus includes: a CT canceling unit which calculates, for each of a first color component and a second color component of each of pixels, a crosstalk component that is produced by a first image and subtracts the crosstalk component from the corresponding one of the signal levels of the pixels of a second image, to generate a modified second image represented as a combination of a signal level of a modified first color component and a signal level of a modified second color component; and a saturation modifying unit which updates the negative signal level of the modified first color component to a value of 0 or larger from among a modified first color component and a modified second color component, and modifies the signal level of the modified second color component according to this update.

19 Claims, 42 Drawing Sheets

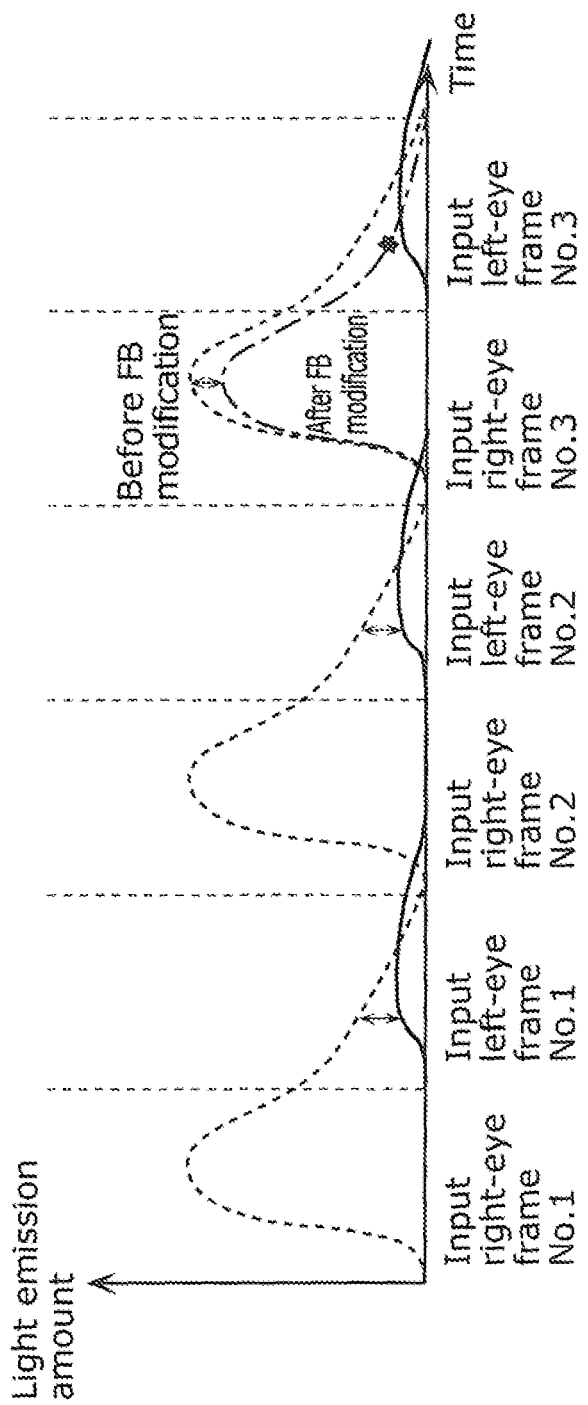

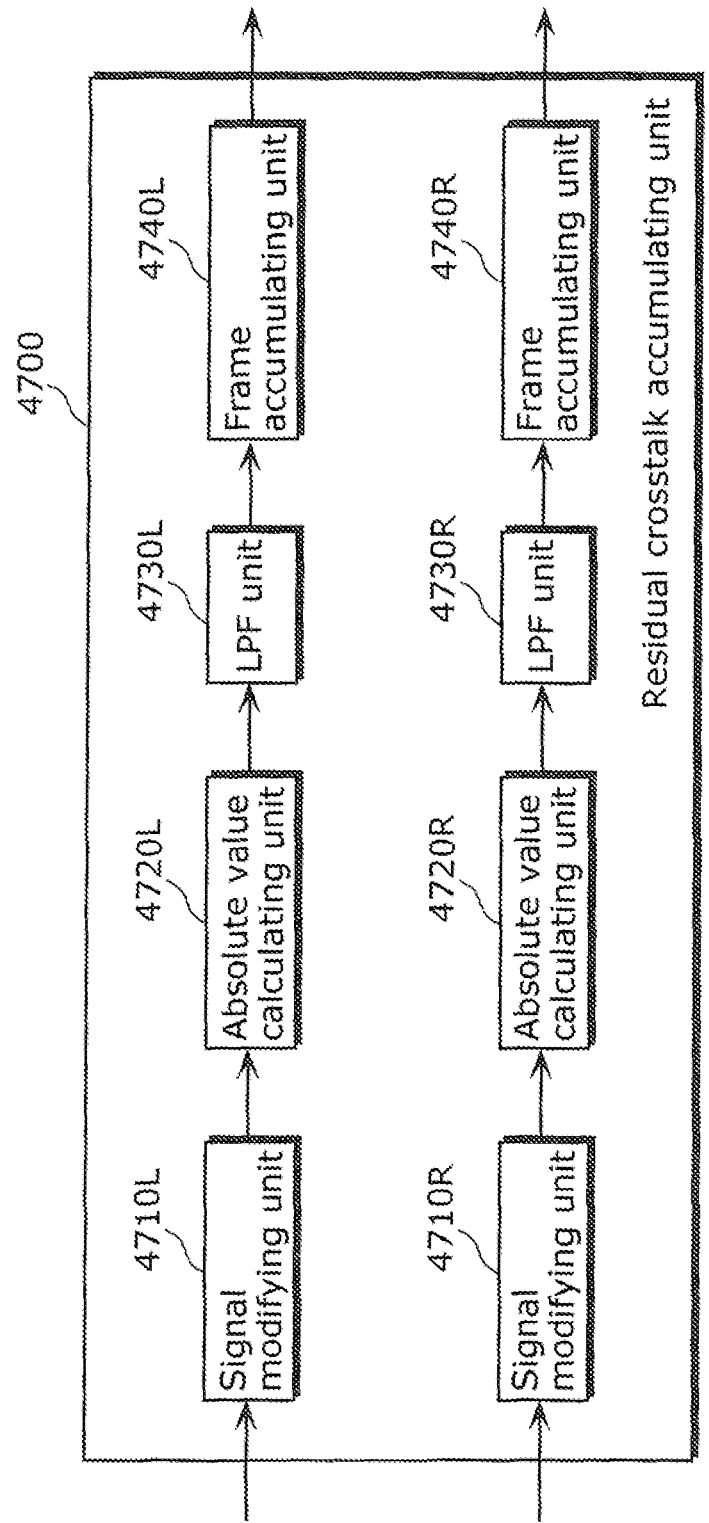

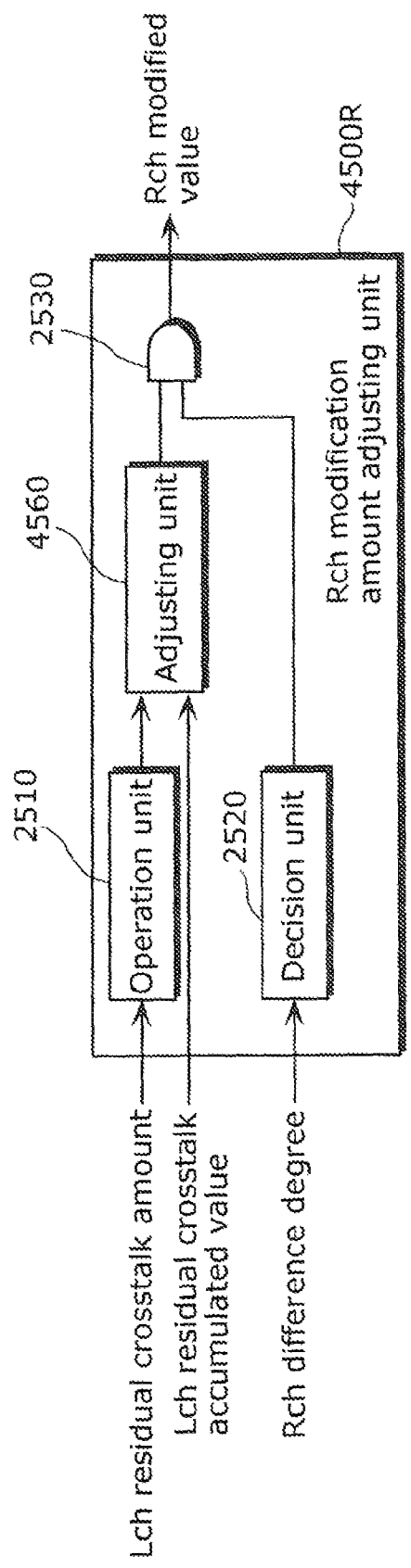

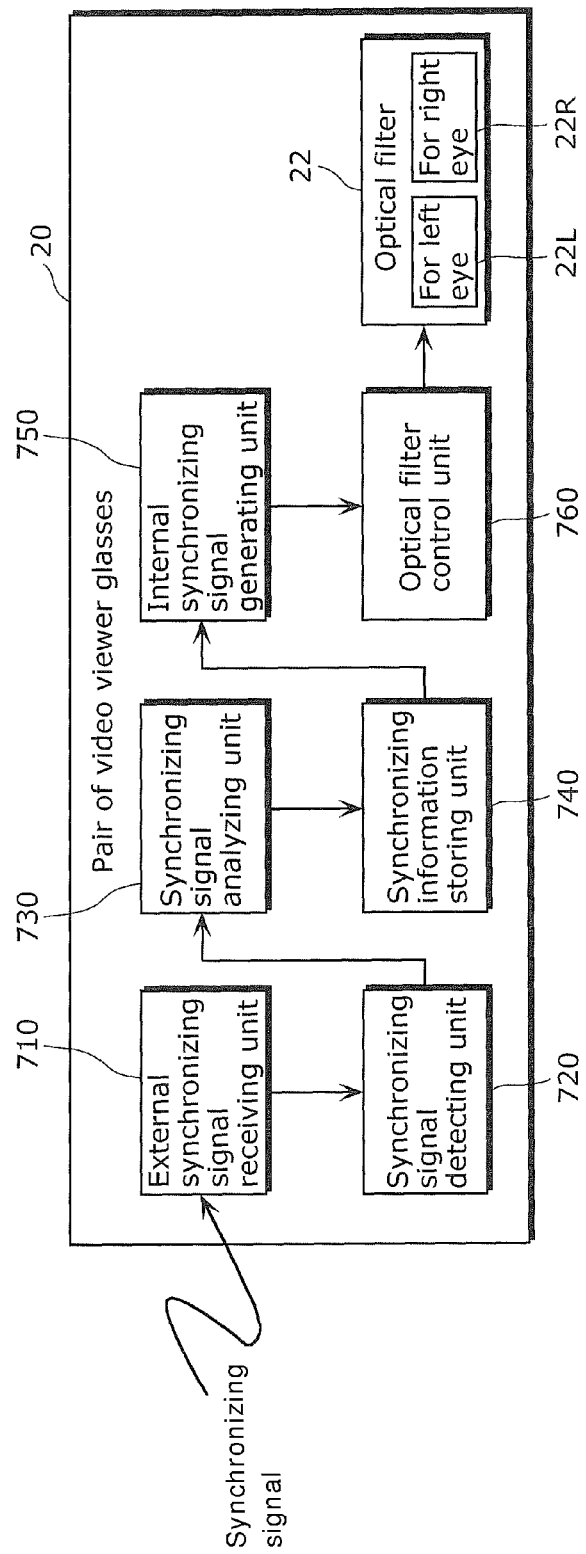

VIDEO SIGNAL PROCESSING APPARATUS, VIDEO DISPLAY APPARATUS, VIDEO SIGNAL PROCESSING METHOD, AND INTEGRATED CIRCUIT

BACKGROUND OF THE INVENTION (1) Field of the Invention

The present invention relates to video signal processing apparatuses, and in particular to video signal processing apparatuses which suppress crosstalk more effectively when displaying videos.

(2) Description of the Related Art

Three dimensional video display apparatuses which display three dimensional videos have been conventionally known (for example, see Patent Reference 1 (Japanese Laid-Open Patent Application Publication No. 2001-258052) and Patent Reference 2 Japanese Laid-Open Patent Application Publication No. 2000-134644). Each of these three dimensional display apparatuses is capable of displaying a three dimensional video, for example, by alternately displaying left-eye images and right-eye images between which parallax is present.

Furthermore, Patent Reference 1 discloses a technique of cancelling crosstalk between a right video and a left video. The crosstalk canceling is processing of subtracting a signal level corresponding to the amount of persistence of an immediately-preceding video signal from a signal level of a video signal to be displayed next.

In the case where the amount of persistence of the immediately-preceding video signal is large, the crosstalk-canceled signal may have a signal level of a negative value. In this case, conventional methods only allow display of a signal having a signal level of a value modified to 0. However, such modification inevitably changes the hue of the video signal to be displayed.

SUMMARY OF THE INVENTION

The present invention has been conceived in view of the aforementioned problem, and has an object to provide video signal processing apparatuses capable of executing more-effective crosstalk suppression and video display apparatuses provided with such a video signal processing apparatus.

A video signal processing apparatus according to an embodiment of the present invention is intended to process, using signals of a first image included in a video, signals of a second image that is an image immediately following the first image. Each of pixels of the first image and the second image is represented as a combination of at least a signal level of a first color component and a signal level of a second color component. The video signal processing apparatus includes: a crosstalk canceling unit configured to calculate, for each of at least the first color component and the second color component of each of the pixels, a crosstalk component that (i) is produced by the first image and (ii) affects the second image, and subtract the crosstalk component from a corresponding one of the signal levels of the co-located pixel of the second image, to generate a modified second image that includes pixels each represented as a combination of at least a signal level of a modified first color component and a signal level of a modified second color component; and a saturation modification processing unit configured to update, to a value of 0 or larger, the signal level of the modified first color component having a negative signal level from among the modified first color component and the modified second color component, and modify the signal level of the modified second color component, in accordance with the update.

As the embodiment, each of the pixels of the first image and the second image may be represented as a combination of a signal level of a red color component, a signal level of a green color component, and a signal level of a blue color component. The crosstalk canceling unit may be configured to calculate, for each of the red color component, the green color component, and the blue color component of each of the pixels, a crosstalk component that (i) is produced by the first image and (ii) affects the second image, and subtract the crosstalk component from a corresponding one of the signal levels of the co-located pixel of the second image, to generate a modified second image that includes pixels each represented as a combination of a signal level of a modified red color component, a signal level of a modified green color component, and a signal level of a modified blue color component. The saturation modification processing unit may be configured to extract a largest value component having a negative signal level and the largest absolute value from among the modified red color component, the modified green color component, and the modified blue color component, update, to 0, the signal level of the largest value component and add, to the signal levels of the other two color components, an addition value calculated using the absolute value of the signal level of the largest value component.

The structure is substantially intended to reduce image quality degradation due to residual crosstalk, by increasing brightness of the second image. In this way, it is possible to execute excellent crosstalk canceling and concurrently reducing hue change due to such residual crosstalk that cannot be completely cancelled by the crosstalk canceling unit. In the above descriptions, an exemplary case is given in which each of pixels is represented as a combination of a red color component, a green color component, and a blue color component. However, the present invention is not limited to this case. For example, any other color component(s) such as a yellow color component may be included instead of any one of these three color components or in addition to these.

In addition, the saturation modification processing unit may be configured to control an upper limit for the addition value, in accordance with characteristics of a predetermined area of an image immediately preceding the second image. In the case where the aforementioned processing is performed on an image having a large amount of residual crosstalk, brightness change may be too noticeable. To prevent this, it is possible to balance hue change and brightness change, by adaptively changing an addition value. Here, "a predetermined area" means a set of plural pixels, and such a predetermined area may be a part of an image or the whole image.

The video signal processing apparatus may further include an average brightness calculating unit configured to calculate an average brightness level of each of pixels of the immediately-preceding image. The saturation modification processing unit may be configured to lower the upper limit for the addition value as the average brightness level calculated by the average brightness calculating unit is higher.

The video signal processing apparatus may further include a residual crosstalk accumulating unit configured to accumulate a negative signal level selected from among signal levels of the pixels of the modified second image that corresponds to the immediately-preceding image processed by the crosstalk canceling unit. The saturation modification processing unit may be configured to lower the upper limit for the addition value as the accumulated value by the residual crosstalk accumulation unit is larger. Here, "a negative signal level" indicates an amount of residual crosstalk.

The video signal processing apparatus may further include a residual crosstalk accumulating unit configured to accumulate the number of pixels having a signal level equal to or lower than a predetermined value among the pixels of the modified second image that corresponds to the immediately-preceding image processed by the crosstalk canceling unit. The saturation modification processing unit may be configured to lower the upper limit for the addition value as the accumulated value by the residual crosstalk accumulation unit is larger. Here, "a signal level equal to or lower than a predetermined value" indicates that the amount of residual crosstalk is equal to or larger than a threshold value (the absolute value of the predetermined value). Here, the predetermined value is a negative value.

The saturation modification processing unit may be further configured to determine a smaller coefficient as the absolute value of the signal level of a largest value component is larger, and multiply the absolute value of the signal level of the largest value component with the coefficient to obtain the addition value.

In addition, each of the pixels of the first image and the second image may be represented as a combination of a signal level of a red color component, a signal level of a green color component, and a signal level of a blue color component. The saturation modification processing unit may be configured to decrease the addition value more significantly when the modified blue color component is the largest value component than when either the modified red color component or the modified green color component is the largest value component. This processing is performed in view of characteristics of a PDP display panel on which blue color components produce a smaller amount of persistence compared to red color components and green color components.

The video signal processing apparatus may be a three-dimensional video signal processing apparatus which alternately outputs a left-eye image and a right-eye image between which parallax is present. For example, the first image is one of the left-eye image and the right-eye image, and the second image is the other one of the left-eye image and the right-eye image. As a matter of course, the present invention is applicable to two dimensional video signals, in addition to three dimensional video signals.

The video signal processing apparatus may further include: an input signal modifying unit configured to modify the second image in accordance with characteristics of a predetermined area of an image immediately preceding the second image. In this way, it is possible to reduce the amount of crosstalk prior to processing by the crosstalk canceling unit. Here, "a predetermined area" means a set of plural pixels, and such a predetermined area may be a part of an image or the whole image.

A video display apparatus according to an embodiment of the present invention is intended to process, using signals of a first image included in a video, signals of a second image that is an image immediately following the first image, and displays the second image. Each of pixels of the first image and the second image is represented as a combination of at least a signal level of a first color component and a signal level of a second color component. The video display apparatus includes: a crosstalk canceling unit configured to calculate, for each of at least the first color component and the second color component of each of the pixels, a crosstalk component that (i) is produced by the first image and (ii) affects the second image, and subtract the crosstalk component from a corresponding one of the signal levels of the co-located pixel of the second image, to generate a modified second image that includes pixels each represented as a combination of at least a signal level of a modified first color component and a signal level of a modified second color component; a saturation modification processing unit configured to update, to a value of 0 or larger, the signal level of the modified first color component having a negative signal level from among the modified first color component and the modified second color component, and modify the signal level of the modified second color component, in accordance with the update; and a display unit configured to display the modified second image generated by the saturation modification processing unit.

In addition, the saturation modification processing unit may be configured to control an upper limit for the addition value, in accordance with characteristics of a predetermined area of an image immediately preceding the second image.

The video display apparatus may further include an average brightness calculating unit configured to calculate an average brightness level of each of pixels of the immediately-preceding image. The saturation modification processing unit may be configured to lower the upper limit for the addition value as the average brightness level calculated by the average brightness calculating unit is higher.

The video display apparatus may further include a residual crosstalk accumulating unit configured to accumulate a negative signal level selected from among signal levels of the pixels of the modified second image that corresponds to the immediately-preceding image processed by the crosstalk canceling unit. The saturation modification processing unit may be configured to lower the upper limit for the addition value as the accumulated value by the residual crosstalk accumulation unit is larger.

The saturation modification processing unit may be further configured to determine a smaller coefficient as the absolute value of the signal level of a largest value component is larger, and multiply the absolute value of the signal level of the largest value component with the coefficient to obtain the addition value.

In addition, each of the pixels of the first image and the second image may be represented as a combination of a signal level of a red color component, a signal level of a green color component, and a signal level of a blue color component. The saturation modification processing unit may be configured to decrease the addition value more significantly when the modified blue color component is the largest value component than when either the modified red color component or the modified green color component is the largest value component.

The video display apparatus may be a three-dimensional video signal processing apparatus which alternately outputs a left-eye image and a right-eye image between which parallax is present. For example, the first image is one of the left-eye image and the right-eye image, and the second image is the other one of the left-eye image and the right-eye image.

The video display apparatus may further include: an input signal modifying unit configured to modify the second image in accordance with characteristics of a predetermined area of an image immediately preceding the second image.

A video signal processing method according to an embodiment of the present invention is intended to process, using signals of a first image included in a video, signals of a second image that is an image immediately following the first image. Each of pixels of the first image and the second image is represented as a combination of at least a signal level of a first color component and a signal level of a second color component. The video signal processing method includes: calculating, for each of at least the first color component and the second color component of each of the pixels, a crosstalk component that (i) is produced by the first image and (ii)

affects the second image, and subtracting the crosstalk component from a corresponding one of the signal levels of the co-located pixel of the second image, to generate a modified second image that includes, pixels each represented as a combination of at least a signal level of a modified first color component and a signal level of a modified second color component; and updating, to a value of 0 or larger, the signal level of the modified first color component having a negative signal level from among the modified first color component and the modified second color component, and modifying the signal level of the modified second color component, in accordance with the update.

An integrated circuit according to an embodiment of the present invention is intended to process, using signals of a first image included in a video, signals of a second image that is an image immediately following the first image. Each of pixels of the first image and the second image is represented as a combination of at least a signal level of a first color component and a signal level of a second color component. The video signal processing apparatus includes: a crosstalk canceling unit configured to calculate, for each of at least the first color component and the second color component of each of the pixels, a crosstalk component that (i) is produced by the first image and (ii) affects the second image, and subtract the crosstalk component from a corresponding one of the signal levels of the co-located pixel of the second image, to generate a modified second image that includes pixels each represented as a combination of at least a signal level of a modified first color component and a signal level of a modified second color component; and a saturation modification processing unit configured to update, to a value of 0 or larger, the signal level of the modified first color component having a negative signal level from among the modified first color component and the modified second color component, and modify the signal level of the modified second color component, in accordance with the update.

A video signal processing apparatus according to another embodiment of the present invention alternately obtains images belonging to a first series that is displayed for one side of the left eye and right eye of a user and images belonging to a second series that is displayed for the other side, and processes the signals of the pixels of the images. Each of the pixels of the images is represented as a combination of a signal level of a red color component, a signal level of a green color component, and a signal level of a blue color component. The video signal processing apparatus includes: a difference detecting unit which detects the degree of difference between (i) the signal level of a particular pixel that is a pixel located at a predetermined position in the first image belonging to the first series and (ii) the signal level of the co-located pixel of the second image that immediately follows the first image within the first series, the co-located pixel being co-located with the particular pixel; crosstalk canceling unit which (i) calculates, for each of the red color component, the green color component, and the blue color component of each of the pixels, a crosstalk component included in the first image, (ii) subtracts the crosstalk component from a corresponding one of the signal levels of the pixels of the third image that belongs to the second series and is located between the first image and the second image, and (iii) outputs the result of the subtraction; a residual crosstalk detecting unit which outputs, as a residual crosstalk amount, the largest absolute value from among the absolute values of the signal levels having a negative signal level, from among the signal levels of the red color component, the green color component, and the blue color component of the co-located pixel of the third image, the signal levels being output from the crosstalk canceling unit; a modification amount adjusting unit which calculates a modification value, based on the residual crosstalk amount output from the residual crosstalk detecting unit, when the degree of difference detected by the difference detecting unit falls below a first threshold; and an input signal modifying unit which modifies each of the signal levels of the red color component, the green color component, and the blue color component of the co-located pixel of the second image according to the modification value calculated by the modification amount adjusting unit, and outputs the modified signal to the crosstalk canceling unit.

The video signal processing apparatus having the structure calculates the degree of difference between the signal level of the particular pixel of the first image (belonging to the first series) and the signal level of the co-located pixel of the second image (belonging, to the first series), and estimates the degree of difference between the signal level of the co-located pixel of the third image (belonging to the second series) and the signal level of the co-located pixel of the immediately following image (belonging to the second series). Next, the video signal processing apparatus calculates a residual crosstalk amount between the particular pixel of the first image and the co-located pixel of the third image, and thereby estimating a residual crosstalk amount between the co-located pixel of the second image and the co-located pixel of the image that immediately follows the second image within the second series. Next, the video signal processing apparatus subtracts a modification value corresponding to the residual crosstalk amount from the co-located pixel of the second image. Thereby, the video signal processing apparatus can suitably suppress the residual crosstalk. The modification processing is performed such that the ratio between the signal levels of the red, green, and blue color components is maintained, and therefore hue change can be minimized.

Furthermore, the video signal processing apparatus includes a scene change detecting unit which detects an amount of change between the scene of the first image and the scene of the image that belongs to the first series and located immediately preceding the first image. The modification amount adjusting unit may calculate a modification amount when a scene change amount detected by the scene change detecting unit falls below a second threshold value.

In this way, the video signal processing apparatus decides whether or not such modification processing should be performed, based on not only the degree of difference detected by the difference detecting unit in units of a pixel but also the scene change amount detected by the scene change detecting unit in units of a predetermined area. This makes it possible to estimate the tendency in temporal changes more precisely, and thereby achieving a more effective suppression of residual crosstalk.

Furthermore, the modification amount adjusting unit may control the upper limit for the modification amount, based on the characteristics of the predetermined area included in at least one of the first image and the third image. This makes it possible to limit the amount of subtraction from the signal level in each modification process, and thereby prevent noticeable brightness change.

The video signal processing apparatus further includes a residual crosstalk accumulating unit which accumulates the residual crosstalk amounts of the respective pixels of the third image which are output from the crosstalk canceling unit. The modification amount adjusting unit may lower the upper limit for the modification value as the accumulated value by the residual crosstalk accumulating unit is larger.

The video signal processing apparatus further includes an average brightness calculating unit which calculates the average brightness level of the pixels of the first image. The modification amount adjusting unit may control the upper limit for the modification value, according to the value of the average brightness level calculated by the average brightness calculating unit.

The modification amount adjusting unit may calculate the modification value by determining a smaller coefficient as the residual crosstalk amount of the third image output from the crosstalk canceling unit is larger, and calculate the modification value by multiplying the absolute value of the residual crosstalk amount with the coefficient. This method makes it possible to limit the amount of subtraction from the signal level in each modification process.

A video display apparatus according to another embodiment of the present invention alternately obtains images belonging to a first series that is displayed for one side of the left eye and right eye of a user and images belonging to a second series that is displayed for the other side, and displays the signals of the pixels of the images. Each of the pixels of the images is represented as a combination of a signal level of a red color component, a signal level of a green color component, and a signal level of a blue color component. The video display apparatus includes: a difference detecting unit which detects the degree of difference between (i) the signal level of a particular pixel that is a pixel located at a predetermined position in the first image belonging to the first series and (ii) the signal level of the co-located pixel of the second image that immediately follows the first image within the first series, the co-located pixel being co-located with the particular pixel; crosstalk canceling unit which calculates, for each of the red color component, the green color component, and the blue color component of each of the pixels, a crosstalk component included in the first image, subtracts the crosstalk component from a corresponding one of the signal levels of the pixels of the third image that belongs to the second series and is located between the first image and the second image, and outputs the result of the subtraction; a residual crosstalk detecting unit which outputs, as a residual crosstalk amount, the largest absolute value from among the absolute values of the signal levels having a negative signal level, from among the signal levels of the red color component, the green color component, and the blue color component of the co-located pixel of the third image, the signal levels being output from the crosstalk canceling unit; a modification amount adjusting unit which calculates a modification value, based on the residual crosstalk amount output from the residual crosstalk detecting unit, when the degree of difference detected by the difference detecting unit falls below a first threshold; an input signal modifying unit which modifies each of the signal levels of the red color component, the green color component, and the blue color component of the co-located pixel of the second image according to the modification value calculated by the modification amount adjusting unit, and outputs the modified signal to the crosstalk canceling unit; and a display unit which displays the second image modified by the input signal modifying unit and processed by the crosstalk canceling unit.

Furthermore, the video display apparatus includes a scene change detecting unit which detects the amounts of change between the scene of the first image and the scene of the image that belongs to the first series and located immediately preceding the first image. The modification amount adjusting unit may calculate a modification amount when a scene change amount detected by the scene change detecting unit falls below a second threshold value.

Furthermore, the modification amount adjusting unit may control the upper limit for the modification amount, based on the characteristics of the predetermined area included in at least one of the first image and the third image.

The video display apparatus further includes a residual crosstalk accumulating unit which accumulates the residual crosstalk amounts of the respective pixels of the third image which are output from the crosstalk canceling unit. The modification amount adjusting unit may lower the upper limit for the modification value as the accumulated value by the residual crosstalk accumulating unit is larger.

The video display apparatus further includes an average brightness calculating unit which calculates the average brightness level of the pixels of the first image. The modification amount adjusting unit may control the upper limit for the modification value, according to the value of the average brightness level calculated by the average brightness calculating unit.

The modification amount adjusting unit may calculate the modification value by determining a smaller coefficient as the residual crosstalk amount of the third image output from the crosstalk canceling unit is larger, and calculate the modification value by multiplying the absolute value of the residual crosstalk amount with the coefficient.

A video signal processing method according to another embodiment of the present invention is for alternately obtaining images belonging to a first series that is displayed for one side of the left eye and right eye of a user and images belonging to a second series that is displayed for the other side, and processing the signals of the pixels of the images. Each of the pixels of the images is represented as a combination of a signal level of a red color component, a signal level of a green color component, and a signal level of a blue color component. The video signal processing method includes: a difference detecting step of detecting the degree of difference between (i) the signal level of a particular pixel that is a pixel located at a predetermined position in the first image belonging to the first series and (ii) the signal level of the co-located pixel of the second image that immediately follows the first image within the first series, the co-located pixel being co-located with the particular pixel; a crosstalk canceling step of (i) calculating, for each of the red color component, the green color component, and the blue color component of each of the pixels, a crosstalk component included in the first image, (ii) subtracting the crosstalk component from a corresponding one of the signal levels of the pixels of the third image that belongs to the second series and is located between the first image and the second image, and (iii) outputting the crosstalk component; a residual crosstalk detecting step of outputting, as a residual crosstalk amount, the largest absolute value from among the absolute values of the signal levels having a negative signal level, from among the signal levels of the red color component, the green color component, and the blue color component of the co-located pixel of the third image, the signal levels being output in the canceling step; a modification amount adjusting step of calculating a modification value, based on the residual crosstalk amount output in the residual crosstalk detecting step, when the degree of difference detected in the residual crosstalk detecting step falls below a first threshold; and an input signal modifying step of modifying each of the signal levels of the red color component, the green color component, and the blue color component of the co-located pixel of the second image according to the modification value calculated in the modification amount adjusting step, and outputting the modified signal for the crosstalk canceling step.

An integrated circuit according to another embodiment of the present invention alternately obtains images belonging to a first series that is displayed for one side of the left eye and right eye of a user and images belonging to a second series that is displayed for the other side, and processes the signals of the pixels of the images. Each of the pixels of the images is represented as a combination of a signal level of a red color component, a signal level of a green color component, and a signal level of a blue color component. The integrated circuit includes: a difference detecting unit which detects the degree of difference between (i) the signal level of a particular pixel that is a pixel located at a predetermined position in the first image belonging to the first series and (ii) the signal level of the co-located pixel of the second image that immediately follows the first image within the first series, the co-located pixel being co-located with the particular pixel; crosstalk canceling unit which calculates, for each of the red color component, the green color component, and the blue color component of each of the pixels, a crosstalk component included in the first image, subtracts the crosstalk component from a corresponding one of the signal levels of the pixels of the third image that belongs to the second series and is located between the first image and the second image, and outputs the result of the subtraction; a residual crosstalk detecting unit which outputs, as a residual crosstalk amount, the largest absolute value from among the absolute values of the signal levels having a negative signal level, from among the signal levels of the red color component, the green color component, and the blue color component of the co-located pixel of the third image, the signal levels being output from the crosstalk canceling unit; a modification amount adjusting unit which calculates a modification value, based on the residual crosstalk amount output from the residual crosstalk detecting unit, when the degree of difference detected by the difference detecting unit falls below a first threshold; and an input signal modifying unit which modifies each of the signal levels of the red color component, the green color component, and the blue color component of the co-located pixel of the second image according to the modification value calculated by the modification amount adjusting unit, and outputs the modified signal to the crosstalk canceling unit.

According to the present invention, it is possible to provide more-suitable images by suppressing change in display images and residual crosstalk.

According to the present invention, it is possible to execute excellent crosstalk canceling with a reduction in hue change due to residual crosstalk that cannot be completely cancelled by the crosstalk canceling unit.

FURTHER INFORMATION ABOUT TECHNICAL BACKGROUND TO THIS APPLICATION

The disclosure of Japanese Patent Applications No. 2009-263395 filed on Nov. 18, 2009, No. 2009-291519 filed on Dec. 22, 2009, and No. 2010-253835 filed on Nov. 12, 2010, all including the specifications, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 29 is a graph showing the light emission amounts (brightness levels) of right-eye frames and left-eye frames input to the CT processing unit;

FIG. 35 is a functional block diagram of a residual crosstalk accumulating unit;

FIG. 36 is a functional block diagram of an Rch modification amount adjusting unit;

FIG. 40 is a functional block diagram of a pair of video viewer glasses according to an embodiment of the present invention.

DESCRIPTION OF THE PREFERRED EMBODIMENTS

Embodiments of the present invention are described below with reference to the drawings.

Figure 1:
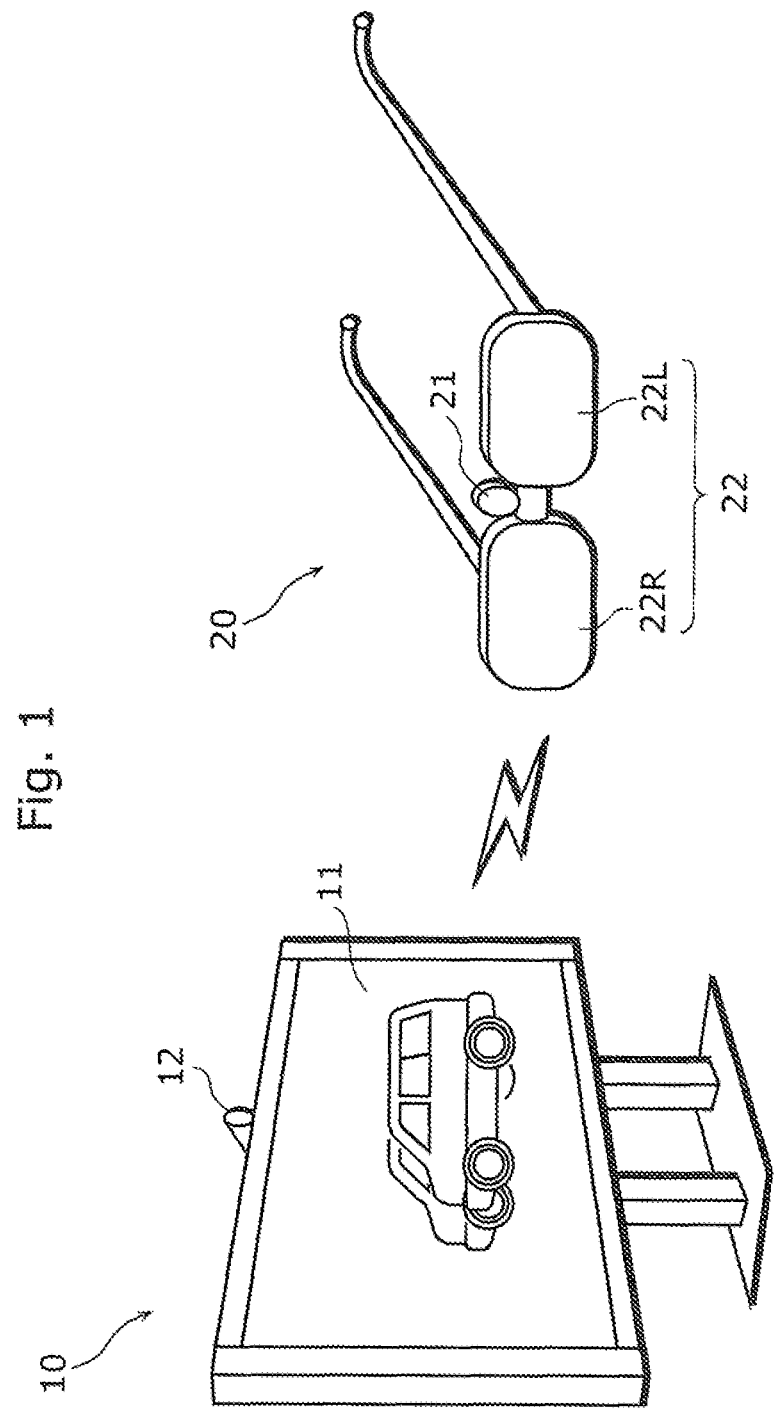
FIG. 1 is a diagram of a video display system according to an embodiment of the present invention.
Figure 2:
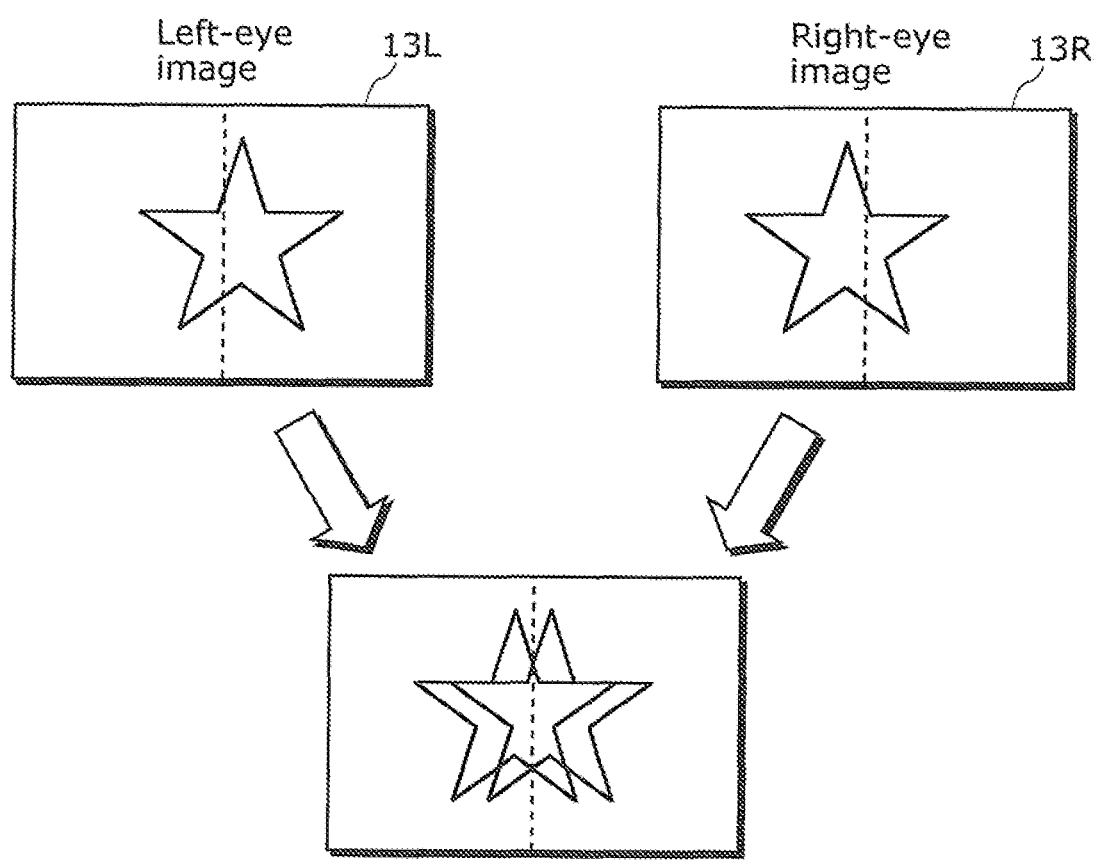
FIG. 2 is a diagram showing an example of a video displayed by a video display apparatus.

FIG. 1 shows a video display system according to an embodiment of the present invention and including a video display apparatus 10 and a pair of video viewer glasses 20 used to view a video to be displayed by the video display apparatus 10. FIG. 2 is a diagram showing an example of a video displayed by the video display apparatus 10. In an exemplary case given in this embodiment, a viewer wearing the pair of video viewer glasses 20 can view a video displayed by the video display apparatus 10 as a three dimensional video.

As shown in FIG. 1, the video display apparatus 10 includes a display panel (display unit) 11 and a synchronizing signal transmitting unit 12. The display panel 11 displays a video such as a three dimensional (3D) video on which predetermined processing has been performed. The synchronizing signal transmitting unit 12 transmits, to the pair of video viewer glasses 20, a synchronizing signal for synchronization with a video to be output on the display panel 11 of the video display apparatus 10.

As shown in FIG. 1, the pair of video viewer glasses 20 includes a synchronizing signal receiving unit 21, and a set of a left-eye optical filter 22L and a right-eye optical filter 22R (the set is referred to as an "optical filter 22" as a whole). The synchronizing signal receiving unit 21 receives a synchronizing signal from the synchronizing signal transmitting unit 12. The optical filters 22 perform predetermined optical processing on light incident to right and left eyes, based on the synchronizing signal received by the synchronizing signal receiving unit 21.

In the video display system described in this embodiment, for example, a left-eye image 13L and a right-eye image 13R between which parallax is present as shown in FIG. 2 are alternately displayed on the display panel 11 of the video display apparatus 10 in a cycle of 120 Hz etc. The pair of video viewer glasses 20 controls light incident to the left eye and light incident to the right eye using the left-eye optical filter 22L and the right-eye optical filter 22R of the pair of video viewer glasses 20, respectively, in synchronization with the video displayed on the display panel 11 of the video display apparatus 10.

Specifically, the pair of video viewer glasses 20 open or close each of the left-eye optical filter 22L and the right-eye optical filter 22R, in synchronization with the synchronizing signal from the video display apparatus 10. More specifically, when a left-eye image 13L is displayed on the display panel 11 of the video display apparatus 10, the left-eye optical filter 22L is in an opened state (in which light is passed), and the right-eye optical filter 22R is in a closed state (in which light is blocked). Likewise, when a right-eye image 13R is displayed on the display panel 11, the left-eye optical filter 22L is in a closed state, and the right-eye optical filter 22R is in an opened state.

The left-eye image 13L and the right-eye image 13R displayed on the video display apparatus 10 are mutually different by the degree corresponding to the parallax. The viewer virtually perceives the parallax from (i) the video that is currently being displayed by the video display apparatus 10 and viewed by the user using the right eye and (ii) the video that is currently being displayed by the video display apparatus 10 and viewed by the user using the left eye, with a feeling as if the videos were a single three dimensional video.

The above description has been given taking, as an example, the case where the display cycle of the left-eye image 13L and the right-eye image 13R is 120 Hz. However, a display cycle that can be used here is not limited to this. Another display cycle of 96 Hz, 100 Hz, 144 Hz, etc. is also possible. Plural cycles may be selectively used according to the types or the like of videos to be displayed.

Figure 3:
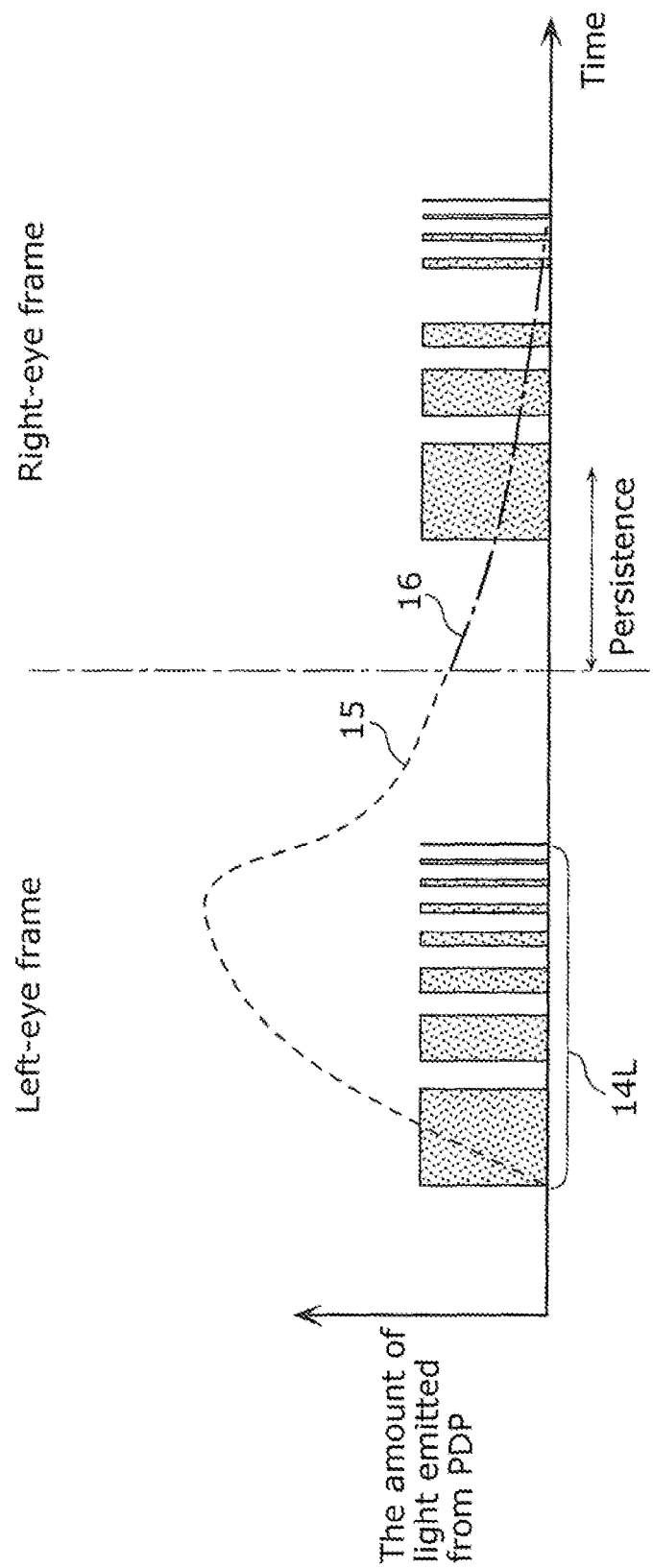
FIG. 3 shows an example of display by the video display apparatus.

FIG. 3 shows an example of a display operation performed by the video display apparatus 10 in the case of displaying a video by sub-field driving used for, for example, a PDP (Plasma Display Panel).

The video display apparatus 10 displays the left-eye image 13L (also referred to as a "left-eye frame") and the right-eye image 13R (also referred to as a "right-eye frame") on the display panel 11 alternately in time series. In this way, each frame (also referred to as a "picture" in the progressive scheme or a "field" in the interlace scheme) is displayed on the display panel 11 as a combination of plural sub-fields. In the example of FIG. 3, a left-eye frame is displayed as a combination of plural sub-fields 14L.

After a start of control for lighting the sub-fields (control for displaying video), there is a time delay before the pixel phosphors that receive applied voltages actually cause a discharge phenomenon, that is, produce luminescence. This time delay depends on response characteristics of the phosphors and the other causes. Thus, as indicated by the broken line 15 in FIG. 3, an actual light emitting state is made with a delay from a time point at which the control for lighting the sub-fields 14L is performed. In the case of extinction, that is, stopping the driving, there is exponential persistence time according to the light emission amount that depends on the characteristics of the phosphor. As shown in the dash-dot line 16 in FIG. 3, persistence of the left-eye frame may continue even after the completion of the control for lighting the sub-fields 14L and the completion of the display time of the left-eye frame.

As a result, the persistence of the left-eye frame remains in the display time of the next right-eye frame. When the viewer views this video, he/she perceives this video as an overlapped video that is produced in a ghost phenomenon because the video of the left-eye frame remains on the right-eye frame. This phenomenon is called crosstalk.

The above description has been given taking, as an example, the case where the sub-field scheme is used as the display driving method for a PDP. In the case of using other video display devices such as a liquid crystal display and an organic EL (Electro Luminescence) display, another display scheme may be used in a case in which persistence components appear as crosstalk.

Figure 4:
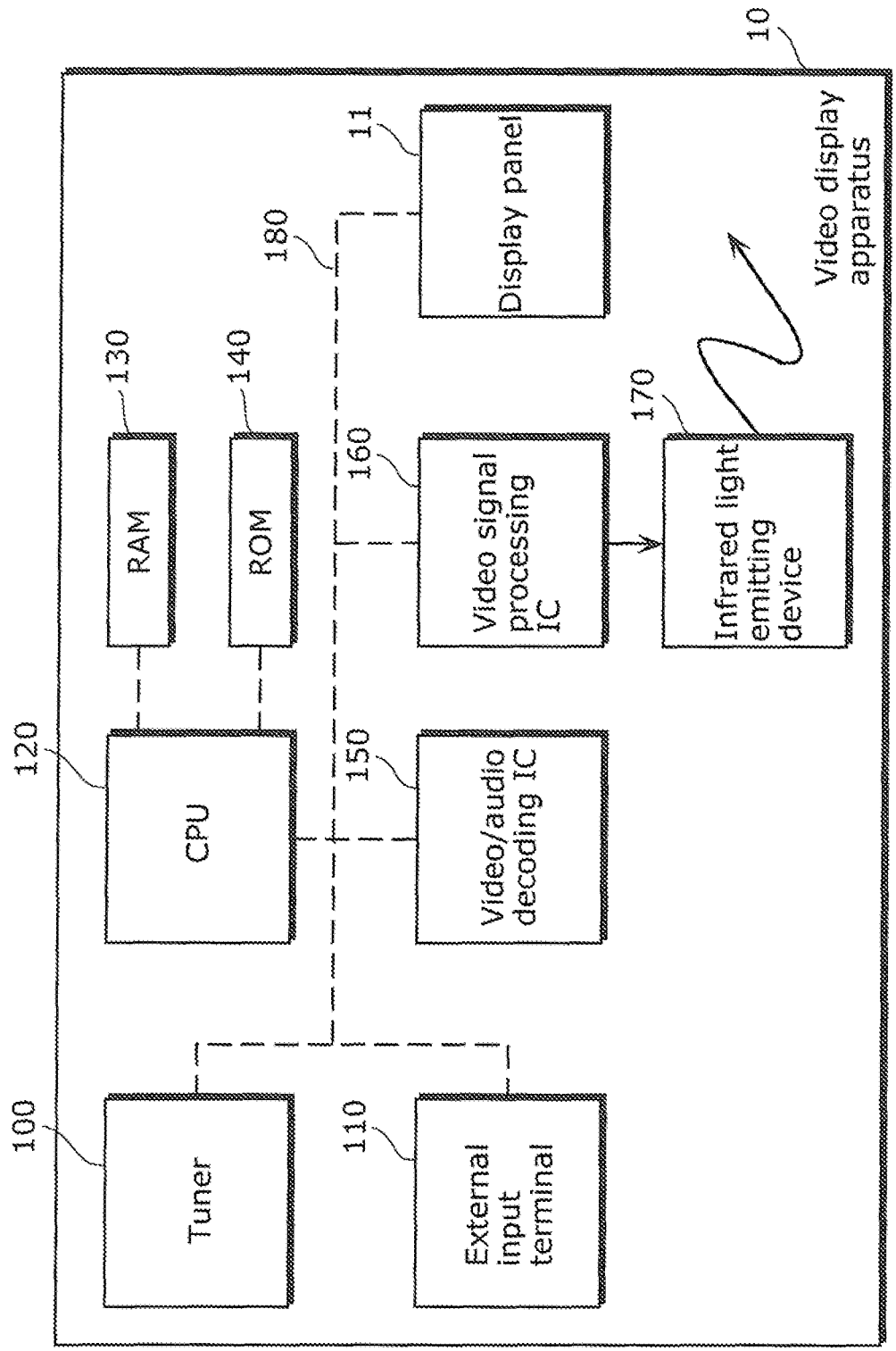
FIG. 4 is a diagram of a hardware structure of a video display apparatus according to an embodiment of the present invention.

FIG. 4 is a diagram showing a hardware structure of the video display apparatus 10 described in this embodiment. The video display apparatus 10 includes a tuner 100, an external input terminal 110, a CPU (Central Processing Unit) 120, an RAM (Random Access Memory) 130, a ROM (Read Only Memory) 140, a video/audio decoding IC (Integrated Circuit) 150, a video signal processing IC 160, an infrared light emitting device 170, a bus 180, and a display panel 11.

The tuner 100 demodulates a broadcast wave received by an antenna (not shown). The tuner 100 outputs the demodulated broadcast data (video data) to the video/audio decoding IC 150.

The external input terminal 110 is an interface which receives an input of the video data from the external apparatus connected to the apparatus according to the present invention through a wired or wireless communication or the like. The external input terminal 110 outputs the video data obtained from the external apparatus to the to video/audio decoding IC 150. Examples of such external apparatuses are not specifically limited, and may be not only optical disc reproduction apparatuses such as a DVD (Digital Versatile Disc) player and a BD (Blu-ray Disc) player, but also any other apparatuses for reading and outputting video data from various recording media such as an HDD (Hard Disk Drive), a magnetic tape, and a semiconductor memory.

This embodiment describes an example of obtaining video data from the tuner 100 and the external input terminal 110, but a method that can be used here is not limited to this one. Video data may be supplied using another method.

The CPU 120 controls the whole video display apparatus 10. The CPU 120 reads a control program from the ROM 140, temporally records, in the RAM 130, various kinds of parameters and the like required to execute the program, and executes the program. The CPU 120 controls the other main functional blocks connected via the bus 180.

The RAM 130 is a volatile information recording unit. Representatives include semiconductor memories such as a DRAM (Dynamic Random Access Memory). The RAM 130 is used as a medium for recording various kinds of parameters used when the CPU 120 executes the program, or a medium for temporally storing data used when the video/audio decoding IC 150 decodes video data.

The RAM 140 is a non-volatile information recording unit. Representatives include semiconductor memories such as a masked ROM and a flash memory. The ROM 140 can be used as a medium for recording the program executed by the CPU 120, a medium for recording various kinds of setting values for operations performed by the video display apparatus 10, or the like. The RAM 130A may be replaced with a non-volatile rewritable semiconductor memory such as a flash memory.

The video/audio decoding IC 150 decodes video data and audio data that are input from the tuner 100 or the external input terminal 110 described above. More specifically, the video/audio decoding IC 150 decodes the data recorded according to a predetermined method into data having a format that can be handled by each of the following functional blocks. Representatives of such a predetermined method include MPEG (Moving Picture Experts Group)-2, MPEG-4, H.264, and JPEG (joint Photographics Experts Group).

The video signal processing IC 160 performs predetermined signal processing on each of images which have been decoded by the video/audio decoding IC 150 and have video data to be corrected. Here, for example, the signal processing involves: a color conversion process of enhancing the color representation of a video when the video is displayed on the display panel 11; a frame rate conversion process of converting the frames of decoded video data into frames having an increased frame rate with an aim to achieve finer representation of motions in the video (changes between frames); a synchronizing signal generation process of generating a synchronizing signal for allowing viewing of a three dimensional video; and an image conversion process of modifying a display video signal according to display characteristics and the like of the display panel 11. The processing performed by the video signal processing IC 160 will be described in detail later.

The display panel 11 displays a video signal processed by the video signal processing IC 160. Display schemes used for the display panel 11 are not specifically limited. For example, it is possible to employ a PDP, an LCD (Liquid Crystal Display), a CRT (Cathode Ray Tube), an SED (Surface-conduction Electron-emitter Display), or the like.

The infrared light emitting device 170 outputs a synchronizing signal generated by the video signal processing IC 160 to the pair of video viewer glasses 20. This embodiment describes an example of an infrared light communication, but the present invention is not limited to this example. Other possible examples include an example in which a synchronizing signal is transmitted to the pair of video viewer glasses 20, using another method such as a wireless communication and an ultrasonic communication.

The bus 180 plays a role of connecting the above-described respective structural elements and the like. With the bus 180, the CPU 120 can control the respective functional blocks in an integrated manner, that is, control the video display apparatus 10 effectively.

Figure 5:
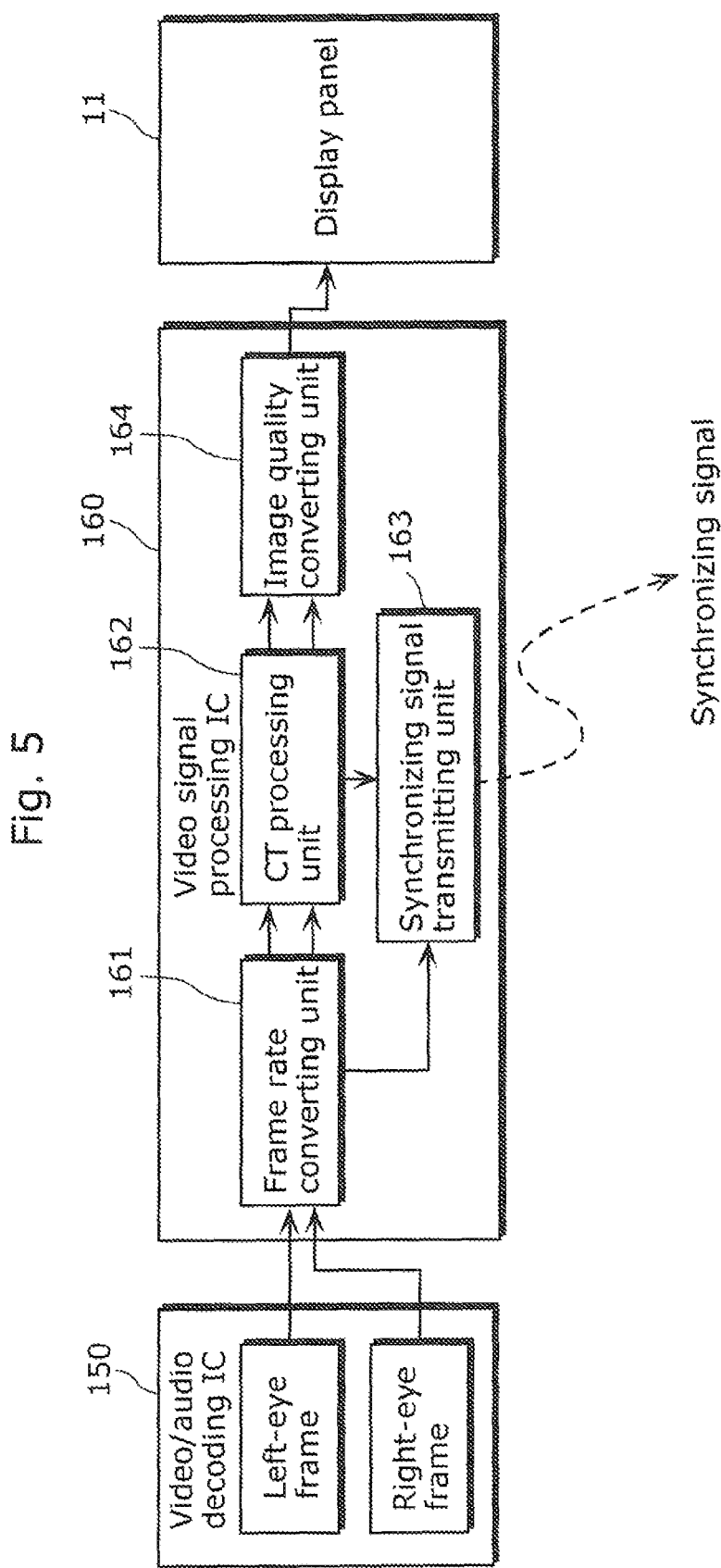
FIG. 5 is a functional block diagram of a video display apparatus according to an embodiment of the present invention.

The video signal processing executed by the video signal processing IC 160 as shown in FIG. 4 is described with reference to the functional block diagram shown as FIG. 5. The video/audio decoding IC 150 decodes both of a left-eye frame and a right-eye frame. The left-eye frame and right-eye frame decoded by the video/audio decoding IC 150 are output to the video signal processing IC 160.

The video signal processing IC 160 includes a frame rate converting unit 161, a CT (Crosstalk) processing unit 162, a synchronizing signal transmitting unit 163, and an image quality converting unit 164.

Figure 6:
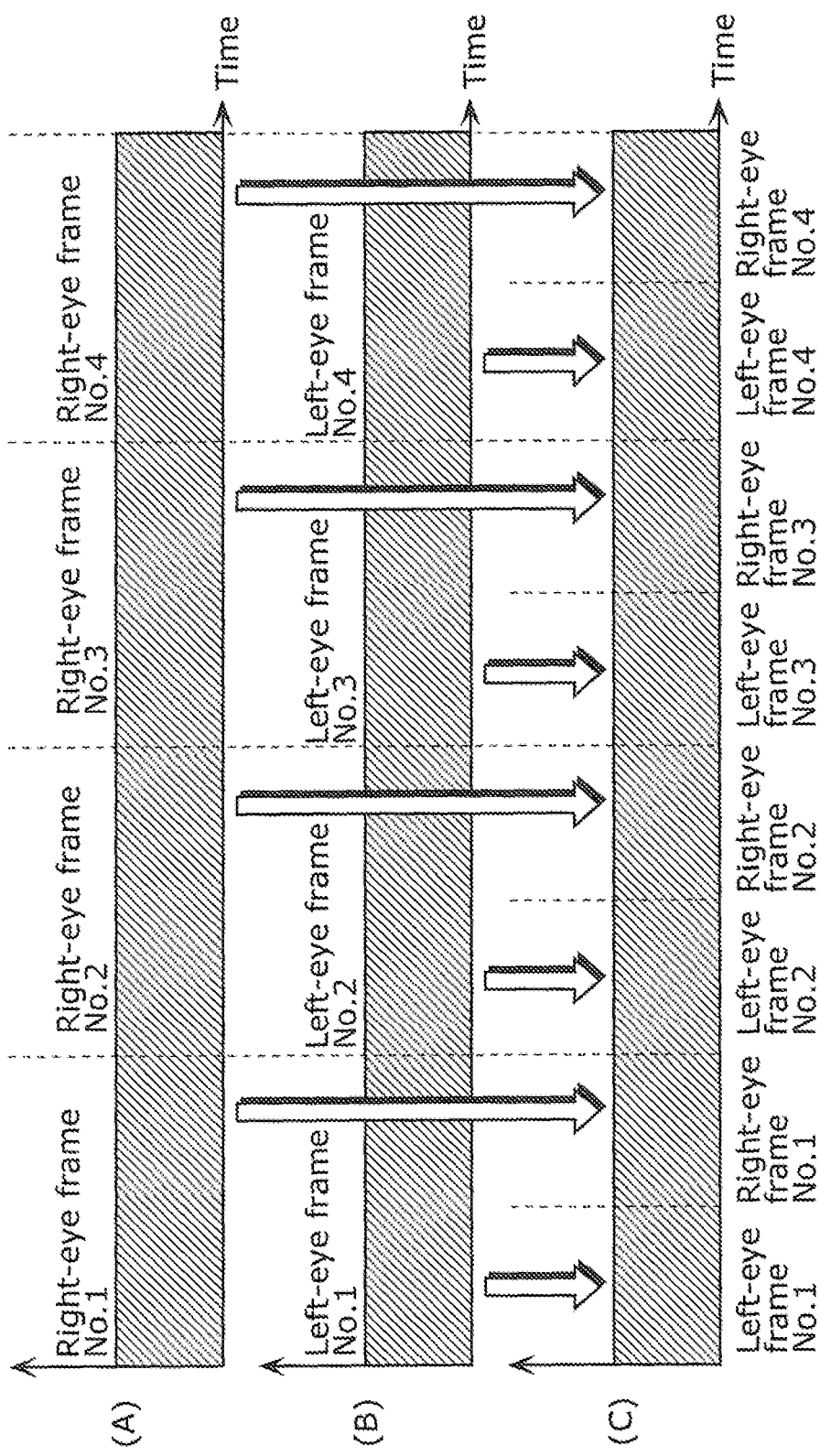
FIG. 6 is a diagram showing an example of a frame rate conversion.

The frame rate converting unit 161 executes frame rate conversion for doubling the frame rate of the left-eye frame and right-eye frame decoded by the video/audio decoding IC 150. FIG. 6 is a diagram showing an example of frame rate conversion.

The frame rate conversion is signal processing for doubling the frame rates of the right-eye frame signal ((A) in FIG. 6) and left-eye frame signal ((B) in FIG. 6) to be input so that both the right and left frames are logically represented within a time period corresponding to the original frame rate of each of the frames. More specifically, this signal processing is possible by doubling the processing amount per unit time for the data of frames. In order to double the processing amount per unit time, there is a need to double the operation speed of the operation clock for the part of the video signal processing IC 160, or a need to take a measure such as parallelization of the processes performed inside the video signal processing IC 160.

This makes it possible to generate, from the right and left video signals, a video signal that can be represented within the time period corresponding to the original frame rate. As shown in (C) in FIG. 6, what is output from the frame rate converting unit 161 may be a video signal having a format for alternately including a left-eye frame and a right-eye frame, or may be video signals each of which has a format for doubling a frame rate (clock signal) and independently outputting a corresponding one of the right and left videos, according to the input format.

The CT processing unit 162 performs signal processing for suppressing persistence (that leads to crosstalk) that appear when the left-eye frame and the right-eye frame are alternately displayed on the display panel 11. The CT processing unit 162 will be described in detail later.

The synchronizing signal transmitting unit 163 executes the synchronizing signal generation processing for generating a synchronizing signal. More specifically, the synchronizing signal transmitting unit 163 transmits, to the pair of video viewer glasses 20, the synchronizing signal for synchronization with the right and left video frames, based on the frame rates obtained by the frame rate converting unit 161, using the infrared light emitting device 170. The pair of video viewer glasses 20 controls the left-eye optical filter 22L and the right-eye optical filter 22R based on this synchronizing signal, and thereby allowing the viewer to view a 3D video or the like.

Such a synchronizing signal can be transmitted according to one of various transmission schemes such as (i) an optical communication using an infrared light or the like, (ii) a wireless communication using a wireless remote controller (ZigBee etc.), Bluetooth, or the like, and (iii) a wired communication using a cable. In short, the method may be any one of methods for transmitting synchronizing information between the video display apparatus 10 and the pair of video viewer glasses 20. This embodiment describes a case of transmission using an infrared light as mentioned above.

The image quality converting unit 164 executes image conversion processing of modifying a display video signal according to display characteristics and the like of the display panel 11. The video display apparatus 10 performs various kinds of video signal processing such as modifying the brightness of the display video based on the APL (Average Picture Level), converting the color range of an input signal into a color range of the display device, and precisely adjusting color information of the input video according to the display characteristics of the display panel 11.

As described above, the video signal processing IC 160 performs the various kinds of processing on the decoded video signal, and outputs the modified video signal on the display panel 11. This makes it possible to display a more suitable video.

The following describes the details of the structure of the CT processing unit 162 and operations performed by the CT processing unit 162 shown in FIG. 6.

Embodiment 1

Figure 7:
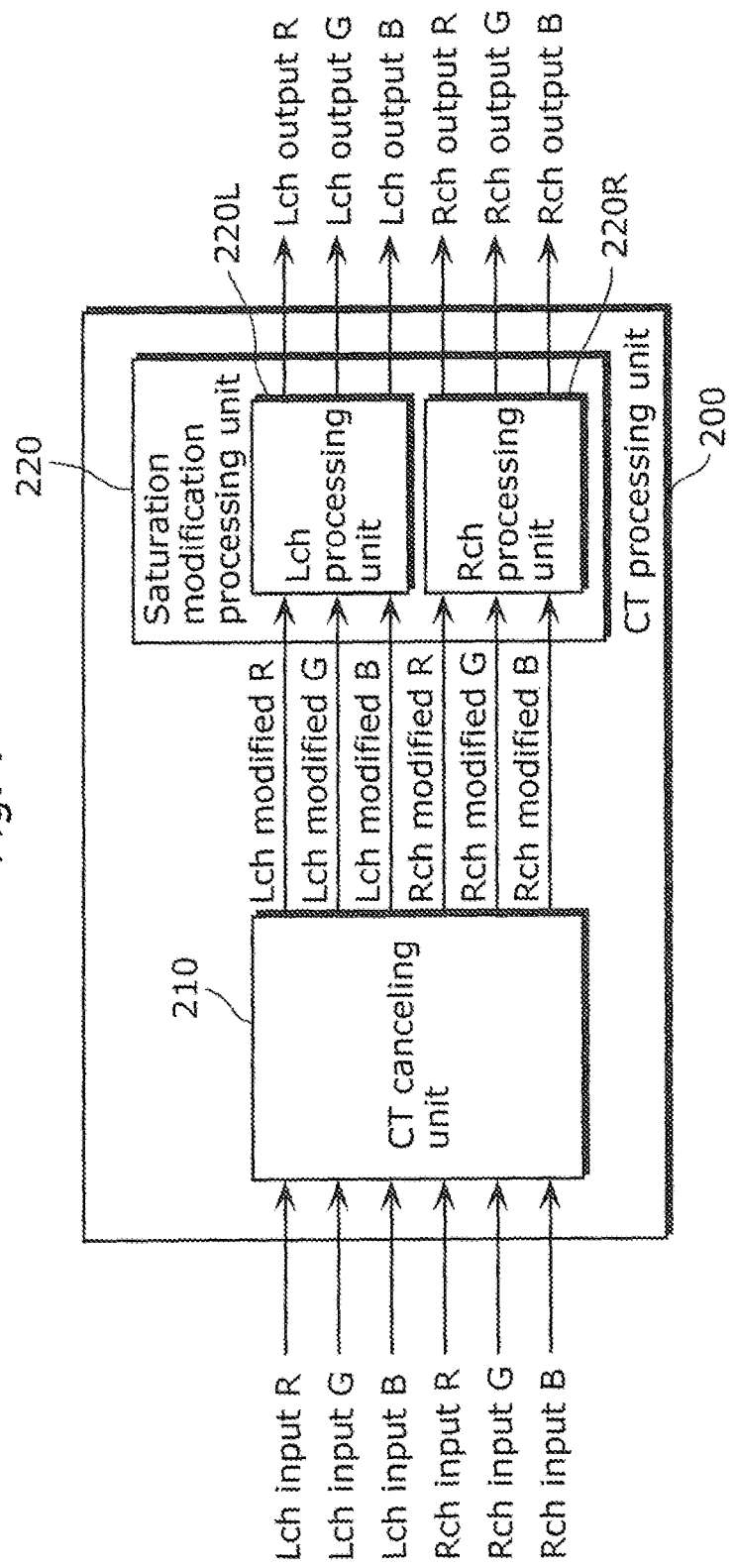
FIG. 7 is a functional block diagram of a CT processing unit according to Embodiment 1.

FIG. 7 is a functional block diagram of a CT processing unit (video signal processing apparatus) 200 according to Embodiment 1. As shown in FIG. 7, the CT processing unit 200 according to Embodiment 1 includes a CT canceling unit 210, and a saturation modification processing unit 220. The CT processing unit 200 executes processing of suppressing crosstalk produced between two adjacent images.

Into the CT canceling unit 210, a left-eye frame and a right-eye frame that are temporally adjacent to each other are alternately input. Each of the pixels of the input left-eye frame is represented as a combination of the signal level of an input red color component (Lch input R), the signal level of an input green color component (Lch input G), and the signal level of an input blue color component (Lch input B). Likewise, each of the pixels of the input right-eye frame is represented as a combination of the signal level of an input red color component (Rch input R), the signal level of an input green color component (Rch input G), and the signal level of an input blue color component (Rch input B). In the following descriptions, an exemplary case is given in which each of pixels is represented as a combination of a red color component, a green color component, and a blue color component. However, the present invention is not limited to this case. For example, any other color component(s) such as a yellow color component may be included instead of any one of these three color components or in addition to these.

The CT canceling unit 210 calculates crosstalk components from a current image to be processed and the immediately-preceding image, and executes processing of modifying the current image using the crosstalk components. Here, crosstalk components indicate residual signal levels of the immediately-preceding image at the time point when the current image is displayed.

More specifically, the CT canceling unit 210 obtains the input left-eye frame and the input right-eye frame that is immediately preceding the input left-eye frame, and calculates crosstalk components of the input right-eye frame, for the respective Rch input R, Rch input G, and Rch input B of each of the pixels. Next, the CT canceling unit 210 subtracts the crosstalk components from the respective signal levels of the pixels of the input left-eye frame to generate a modified left-eye frame represented as combinations of a modified red color component (Lch modified R), a modified green color component (Lch modified G), and a modified blue color component (Lch modified B). Likewise, the CT canceling unit 210 generates a modified right-eye frame represented as combinations of a modified red color component (Rch modified R), a modified green color component (Rch modified G), and a modified blue color component (Rch modified B), from the input right-eye frame and the immediately-preceding input left-eye frame.

The saturation modification processing unit 220 executes processing of modifying the saturation of each of the right and left images modified by the CT canceling unit 210. Here, processing on the modified left-eye frame is executed by the Lch processing unit 220L, and processing on the modified right-eye frame is executed by the Rch processing unit 220R.

More specifically, the Lch processing unit 220L extracts the largest value component having a negative signal level value and the largest absolute value from among the Lch modified R, Lch modified G, and Lch modified B. Next, the Lch processing unit 220L sets the signal level of the largest value component to 0, and adds an addition value that is calculated using the absolute value of the signal level of the largest value component to each of the signal levels of the other two components. Through this processing, an output left-eye frame represented as combinations of an output red component (Lch output R), an output green component (Lch output G), and an output blue component (Lch output B) is generated and output by the Lch processing unit 220L.

Likewise, the Rch processing unit 220R extracts the largest value component having a negative signal level value and the largest absolute value from among the Rch modified R, Rch modified G, and Rch modified B. Next, the Lch processing unit 220L sets the signal level of the largest value component to 0, and adds an addition value that is calculated using the absolute value of the signal level of the largest value component to each of the signal levels of the other two components. Through this processing, an output right-eye frame represented as combinations of an output red component (Rch output R), an output green component (Rch output G), and an output blue component (Rch output B) is generated and output by the Rch processing unit 220R.

Figure 8:
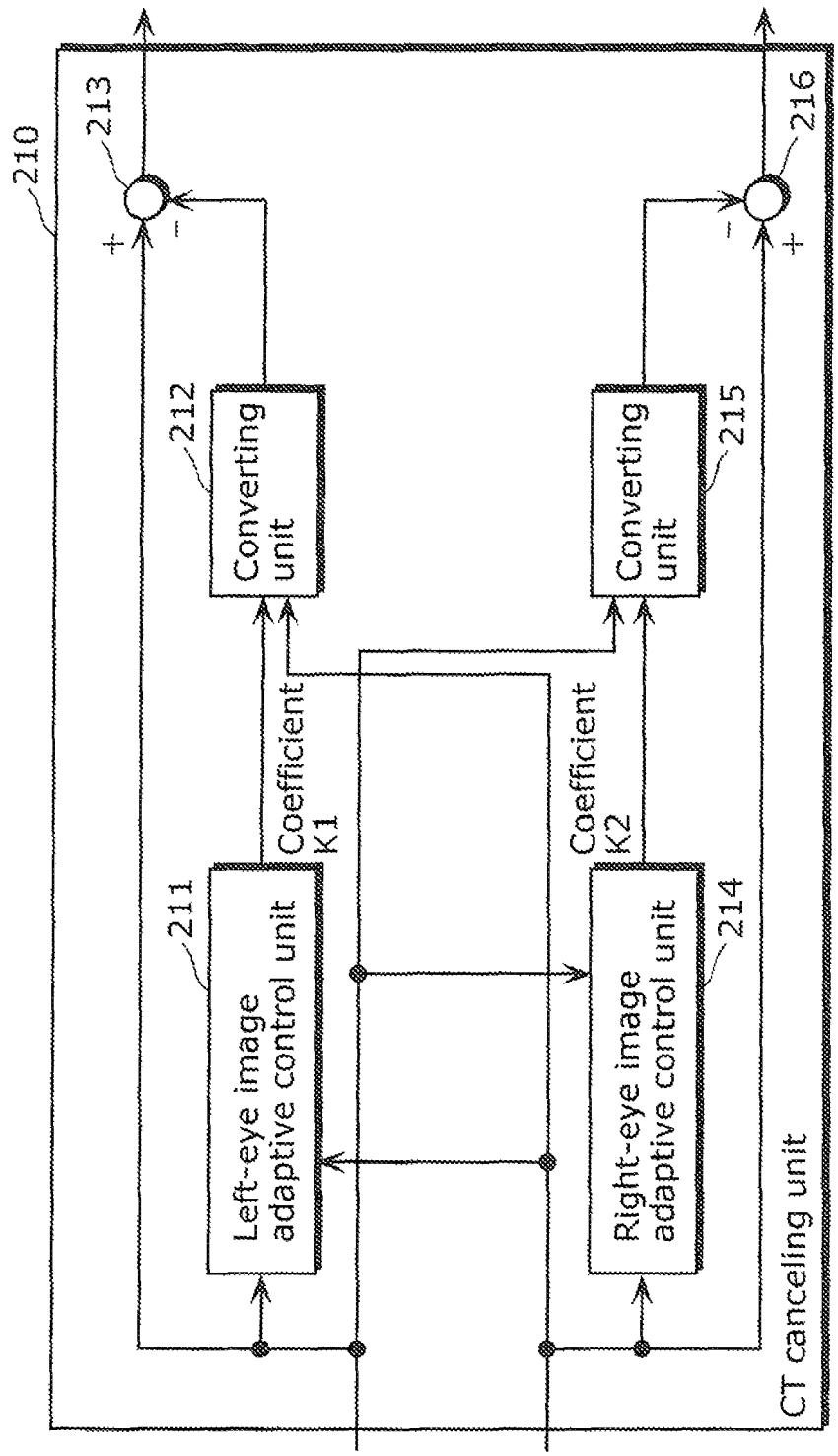
FIG. 8 is a detailed functional block diagram of the CT canceling unit.

FIG. 8 is a detailed functional block diagram of the CT canceling unit 210. As shown in FIG. 8, the CT canceling unit 210 includes a left-eye image adaptive control unit 211, a right-eye image adaptive control unit 214, converting units 212 and 215, and mixing units 213 and 216.

The left-eye image adaptive control unit 211 calculates, from the input left-eye frame and the immediately-preceding input right-eye frame, a coefficient K1 that is a multiplier to the input right-eye frame. The right-eye image adaptive control unit 214 calculates, from the input right-eye frame and the immediately-preceding input left-eye frame, a coefficient K2 that is a multiplier to the input left-eye frame, in a reverse manner to the calculation by the left-eye image adaptive control unit 211. Methods of determining such coefficients K1 and K2 will be described later.

The converting unit 212 performs a predetermined conversion on the input right-eye frame, based on the coefficient K1 determined by the left-eye image adaptive control unit 211. For example, in the case where the coefficient K1 is a persistence rate (the rate of persistence at the time when the immediately-following input left-eye frame is displayed) of the input right-eye frame, the predetermined conversion performed here is to multiply the input right-eye frame with the coefficient K1.

The mixing unit 213 mixes the input left-eye frame and the input right-eye frame which has been subjected to conversion by the converting unit 212. As an example of such synthesis, it is only necessary to subtract, from the signal level of the input left-eye frame, the signal level of the input right-eye frame subjected to the conversion by the converting unit 212. The mixing unit 213 outputs the mixed signals in form of a modified left-eye frame. This modified left-eye frame is obtained by compensating the amount of persistence produced by the immediately-preceding output right-eye frame.

Each of the aforementioned processes is executed for each of the red, green, and blue color components of each pixel of an image. More specifically, the left-eye image adaptive control unit 211 calculates the coefficient K1R for a red color component, the coefficient K1G for a green color component, and the coefficient K1B for a blue color component. The converting unit 212 multiplies the Rch input R, the Rch input G, and the Rch input B of each pixel of the input right-eye frame, with the coefficient K1R, the coefficient K1G, the coefficient K1B, respectively. Next, the mixing unit 213 generates a modified left-eye frame by subtracting the signal levels of the Rch input R, Rch input G, and Rch input B of each pixel of the input right-eye frame output from the converting unit 212, from the signal levels of the Lch input R, Lch input G, and Lch input B of a corresponding one of the pixels of the input left-eye frame.

It is to be noted that crosstalk canceling on the input right-eye frame is executed by the right-eye image adaptive control unit 214, converting unit 215, and mixing unit 216 in a manner similar (symmetrical) to the crosstalk canceling on the input left-eye frame.

Figure 9:
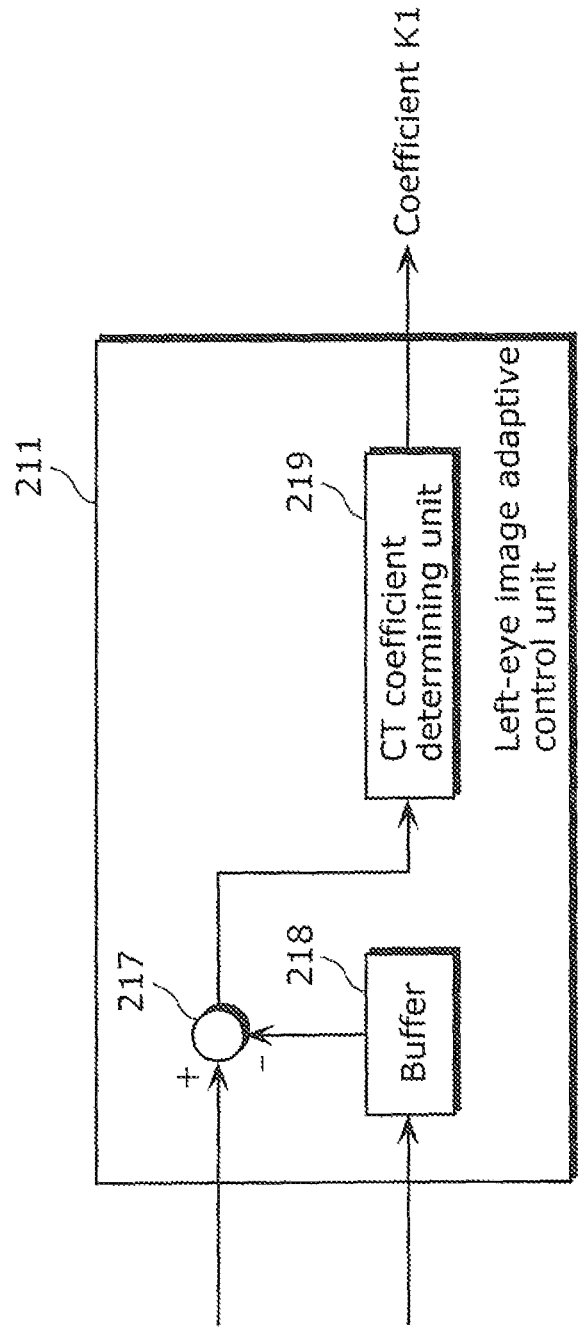
FIG. 9 is a diagram showing an example of a structure of a left-eye image adaptive control unit.

FIG. 9 is a diagram showing an example of a structure of the left-eye image adaptive control unit 211. As shown in FIG. 9, the left-eye image adaptive control unit 211 includes a signal comparing unit 217, a buffer 218, a CT (Crosstalk) coefficient determining unit 219.

The signal comparing unit 217 calculates a signal level ratio between the input left-eye frame and the input right-eye frame. For example, it is possible to use, as such a signal level ratio, a difference video signal obtained by subtracting a CT-producing video signal (the immediately-preceding input right-eye frame) which produces crosstalk, from a CT-receiving video signal (the input left-eye frame) which is affected by the crosstalk. The calculated signal level ratio is output to the CT coefficient determining unit 219. The buffer 218 functions as a delay which temporarily holds the input right-eye frame that is displayed immediately before.

The CT coefficient determining unit 219 calculates the coefficient K1 that is a multiplier to the input right-eye frame, based on the signal level ratio calculated by the signal comparing unit 217. The method of determining such a coefficient K1 is not specifically limited. For example, it is also good to determine a smaller coefficient value K1 as a signal level ratio is larger.

Figure 10:
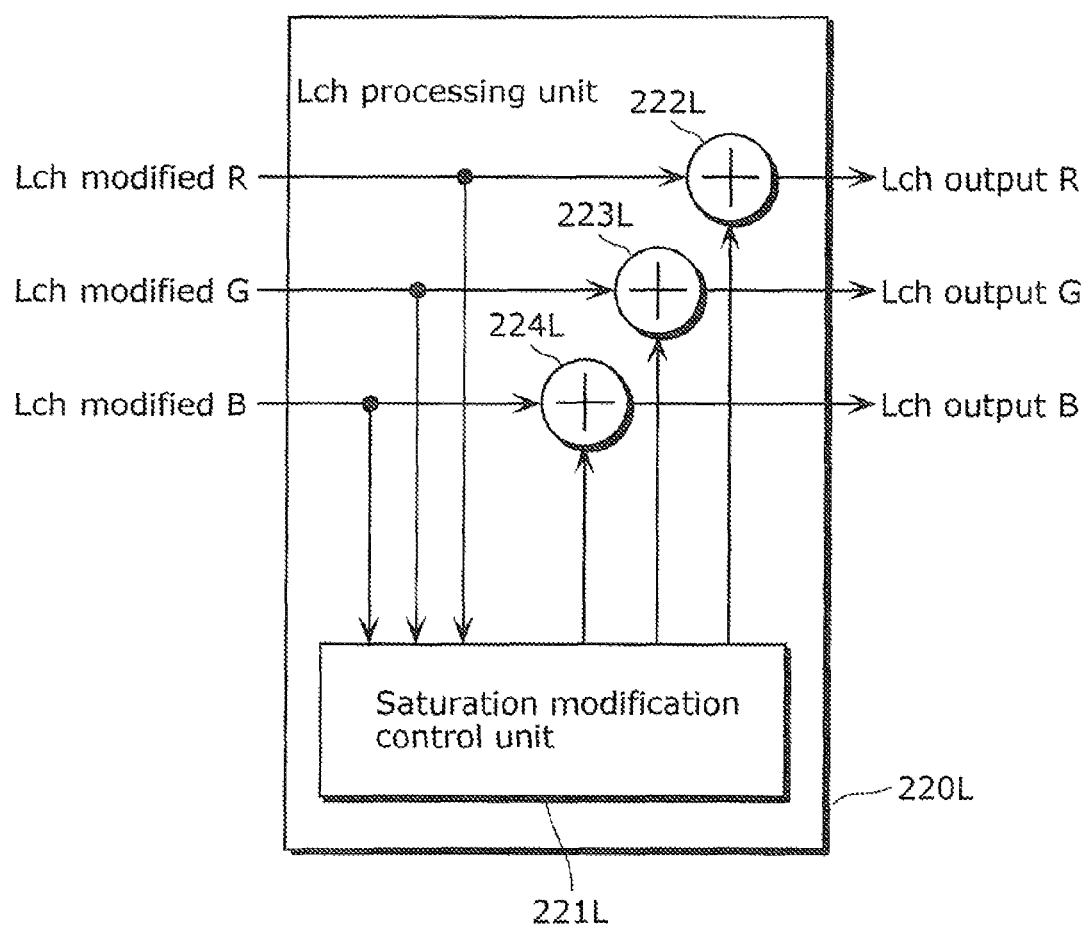
FIG. 10 is a detailed functional block diagram of an Lch processing unit shown in FIG. 7.

FIG. 10 is a detailed functional block diagram of the Lch processing unit 220L of the saturation modification processing unit 220 shown in FIG. 7. As shown in FIG. 10, the Lch processing unit 220L includes a saturation modification control unit 221L, and three mixing units 222L, 223L, and 224L. It is to be noted that the Rch processing unit 220R has the same structure as that of the Lch processing unit 220L, and thus the same description thereof is not repeated here.

More specifically, the saturation modification control unit 221L extracts the largest value component having a negative signal level value and the largest absolute value from among the input Lch modified R, Lch modified G, and Lch modified B. For example, when the Lch modified R is the largest value component, the mixing unit 222L sets the signal level of the Lch modified R to 0, and outputs it as an Lch output R. The mixing unit 223L adds an addition value that is calculated using the absolute value of the signal level of the Lch modified R to the signal level of the Lch modified G, and outputs it as an Lch output G. Likewise, the mixing unit 224 adds the addition value to the signal level of the Lch modified B, and outputs it as an Lch output B.

Figure 11:
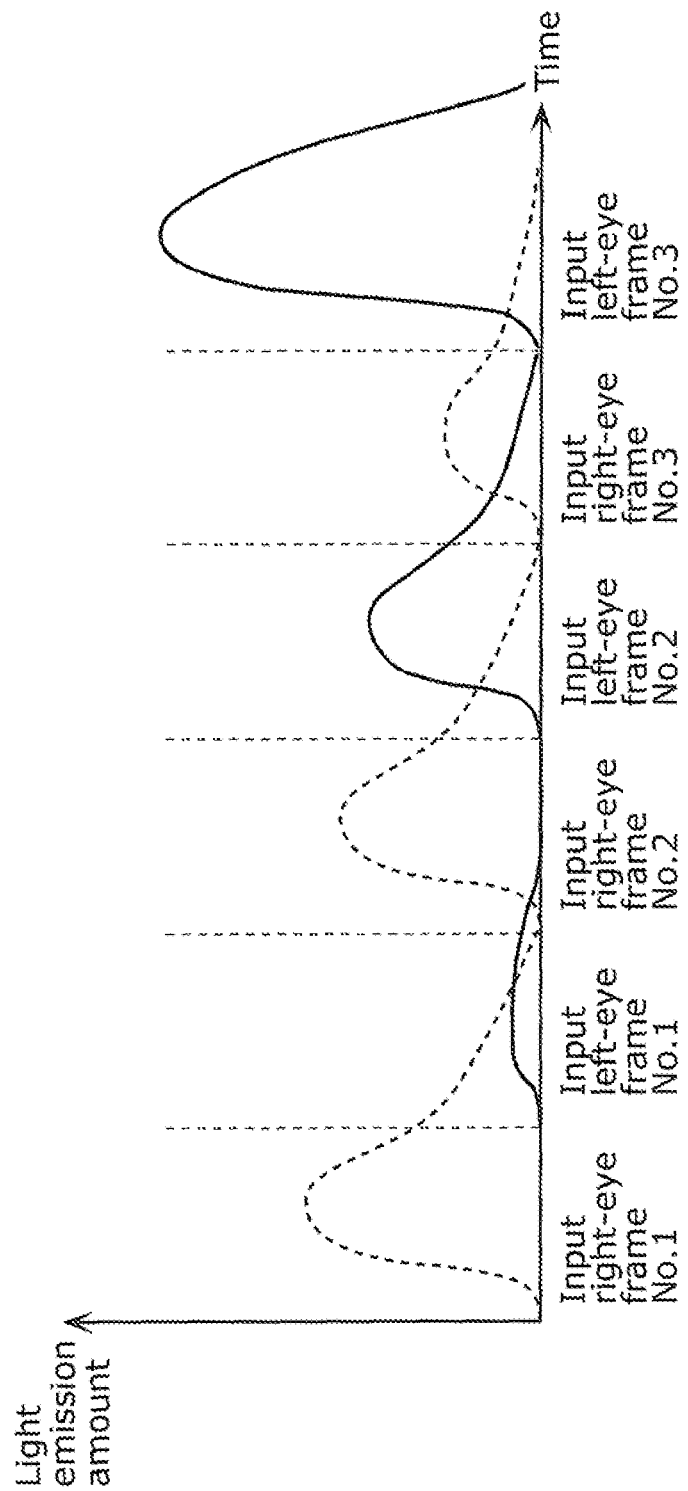
FIG. 11 is a graph showing the light emission amounts (brightness levels) of right-eye frames and left-eye frames input to the CT processing unit.
Figure 12:
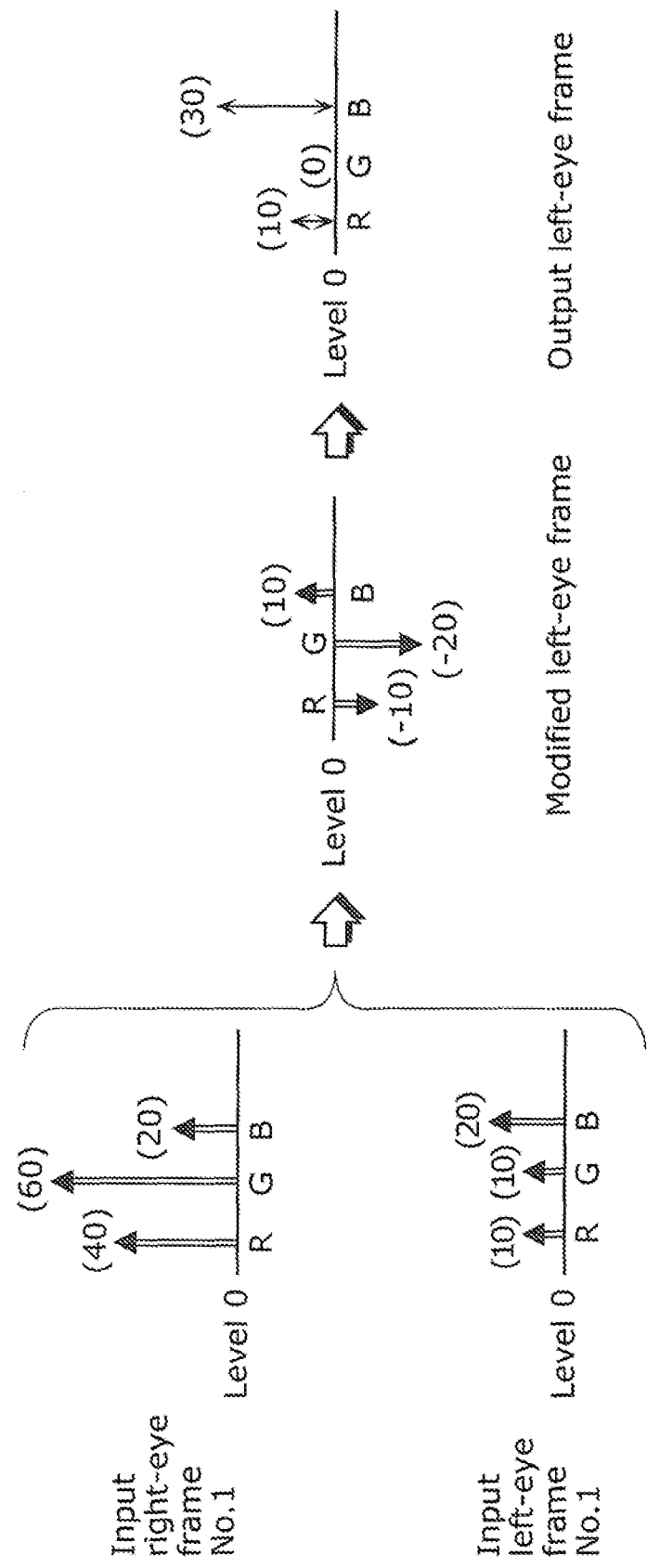
FIG. 12 is a diagram showing signal levels of red, green, and blue color components in the process performed by the CT processing unit.
Figure 13:
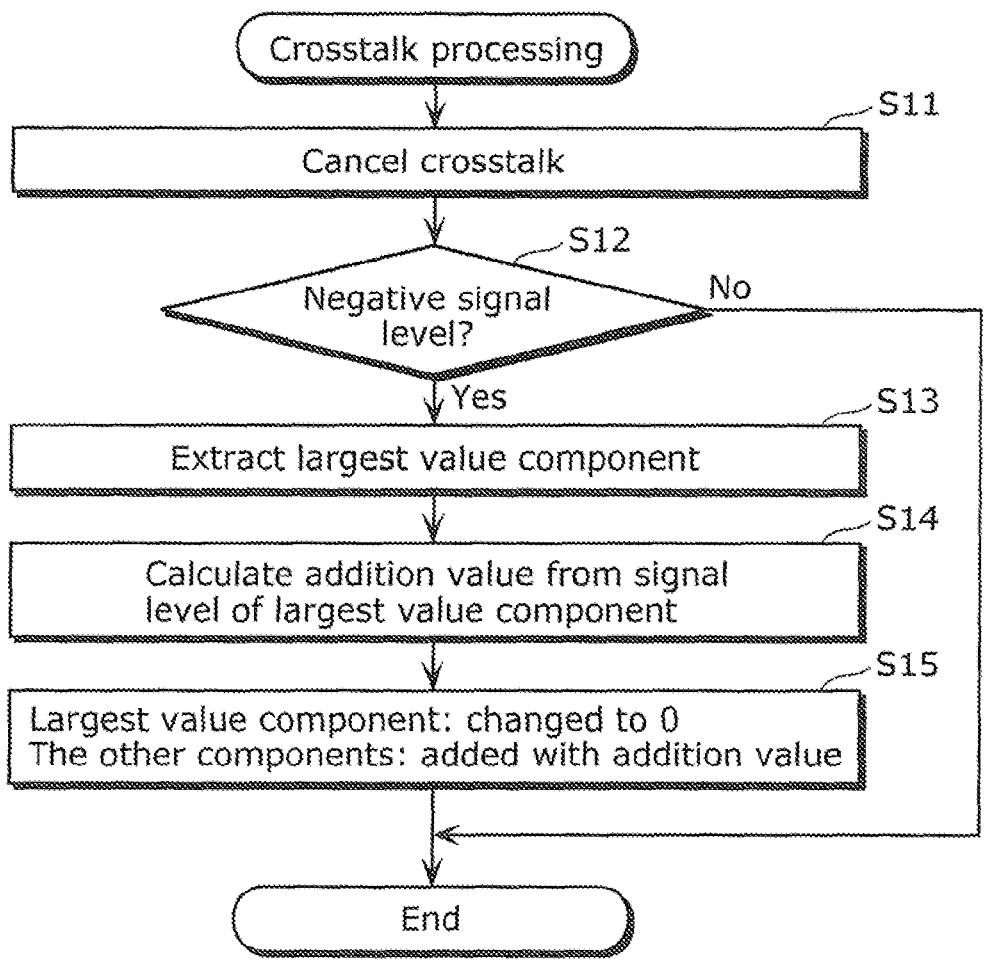
FIG. 13 is a flowchart showing operations performed by the CT processing unit.

Next, operations performed by the CT processing unit 200 having the aforementioned structure are described with reference to FIGS. 11 to 13. FIG. 11 is a graph showing the light emission amounts (brightness levels) of a right-eye frame and a left-eye frame input to the CT processing unit 200. FIG. 12 is a diagram showing signal levels of red, green, and blue color components in the process performed by the CT processing unit 200. FIG. 13 is a flowchart showing operations performed by the CT processing unit 200.

First, as shown in FIG. 11, the right-eye frame and the left-eye frame are alternately input to the CT processing unit 200. The following describes processing in the case where the input right-eye frame No. 1 is a CT-producing video signal, and the input left-eye frame No. 1 is a CT-receiving video signal.

For example, as shown in FIG. 12, it is assumed that the signal levels of the Rch input R, Rch input G, and Rch input B of a pixel in the input right-eye frame No. 1 are 40, 60, and 20, respectively. Whereas, it is assumed that the signal levels of the Lch input R, Lch input G, and Lch input B of a corresponding pixel in the input left-eye frame No. 1 are 10, 10, and 20, respectively.

In the above case, the CT canceling unit 210 of the CT processing unit 200 subtracts the crosstalk components of the input right-eye frame No. 1 from the input left-eye frame No. 1 to obtain a modified left-eye frame (S11). For example, in the case where the coefficient K1 determined by the CT coefficient determining unit 219 is 0.5 (the same value is determined for each of red, green, and blue color components), the crosstalk component of the red color component is 20, the crosstalk component of the green color component is 30, and the crosstalk component of the blue color component is 10. These values are subtracted from the signal levels of the respective color components of the input left-eye frame No. 1. As a result, the signal level of the Lch modified R is −10, the signal level of the Lch modified G is −20, and the signal level of the Lch modified B is 10.

In the case where the signal level has a positive value (Lch modified B) in the modified left-eye frame, the brightness level (the light emission amount) of the left-eye frame displayed on the display panel 11 exceeds the crosstalk component of the immediately-preceding right-eye frame. In this case, it is only necessary to display (produce luminescence), on the display panel 11, only the brightness level (10) corresponding to the difference between the actual brightness level (blue component=20) and the crosstalk component (10).

In the opposite case where the signal levels have negative values (Lch modified R and Lch modified G) in the modified left-eye frame, the brightness levels of the left-eye frame displayed on the display panel 11 are below the crosstalk components of the immediately-preceding right-eye frame. In this case, brightness levels (red color component=20, and green color component=30) exceeding the brightness levels (red color component=10, and green color component=10) that should be displayed are to be displayed on the display panel 11 without further producing luminescence on the display panel 11. Here, the difference values (red color component=10, and green color component=20) between the brightness levels that should be displayed and the signal levels that are actually displayed are called "residual crosstalk amounts".

A large amount of residual crosstalk results in a significant difference between the hue of the left-eye frame that is actually displayed on the display panel 11 and the original hue of the left-eye frame. To prevent this, the saturation modification control unit 221L executes the following processing for reducing the hue difference due to residual crosstalk.

Next, the saturation modification control unit 221L of the CT processing unit 200 checks whether or not at least one of the Lch modified R, Lch modified G, and Lch modified B output from the CT canceling unit 210 is a component having a negative signal level (S12). In the case where no such component having a negative signal level is included (No in S12), the Lch processing unit 220L outputs the signal levels of the Lch modified R, Lch modified G, and Lch modified B as the signal levels of the Lch output R, Lch output G, and Lch output B as they are.

When there is a component having a negative signal level (Yes in S12), the saturation modification control unit 221L extracts the largest value component having the largest absolute value (S13). In the example of FIG. 12, the Lch modified G is the largest value component.

Next, the saturation modification control unit 221L calculates an addition value from the signal level of the Lch modified G that is the largest value component (S14). The addition value in Embodiment 1 is the absolute value of the signal level of the largest value component. Accordingly, the addition value here is 20.

Next, the mixing units 222L, 223L, and 224L modify the signal levels of the Lch modified R, Lch modified G, and Lch modified B, and output these as the Lch output R, Lch output G, and Lch output B, respectively (S15). More specifically, the mixing unit 223L sets, to 0, the output level of the Lch modified G that is the largest value component, and outputs it as the Lch output G. Whereas, the mixing unit 222L adds an addition value (20) to the signal level (−10) of the Lch modified R, and outputs it as the Lch output R having a signal level of 10. Likewise, the mixing unit 224L adds an addition value (20) to the signal level (10) of the Lch modified B, and outputs it as the Lch output B having a signal level of 30.

Here, the Lch output R (10), Lch output G (0), and Lch output B (30) correspond to the light emission amounts at the time when the left-eye frame is displayed on the display panel 11. The user visually perceives the brightness levels added with the residual crosstalk components R(10), G(20), and B(0), that are, a signal level of 20, a signal level of 20, and a signal level of 30.

In the case where the above-described addition is not made, a negative signal level is clipped to 0 and is output, and thus R (0), G (0), and B (10) are output. However, with the addition of residual crosstalk components R (10), G (20), and B (0), the user visually perceives these brightness levels as the red color component having a signal level of 10, the green color component having a signal level of 20, and the blue color component having a signal level of 10. In this case, the component G and component R (especially the component G) are inevitably too strong in hue.

In the opposite case where the modification value is added, the user visually perceives the hue of the left-eye frame as being substantially the same as that of the original left-eye frame with a feeling of a slight increase in brightness (that is, becoming brighter). In this way, it is possible to perform image processing with a reduction in hue change.

Embodiment 2

Figure 14:
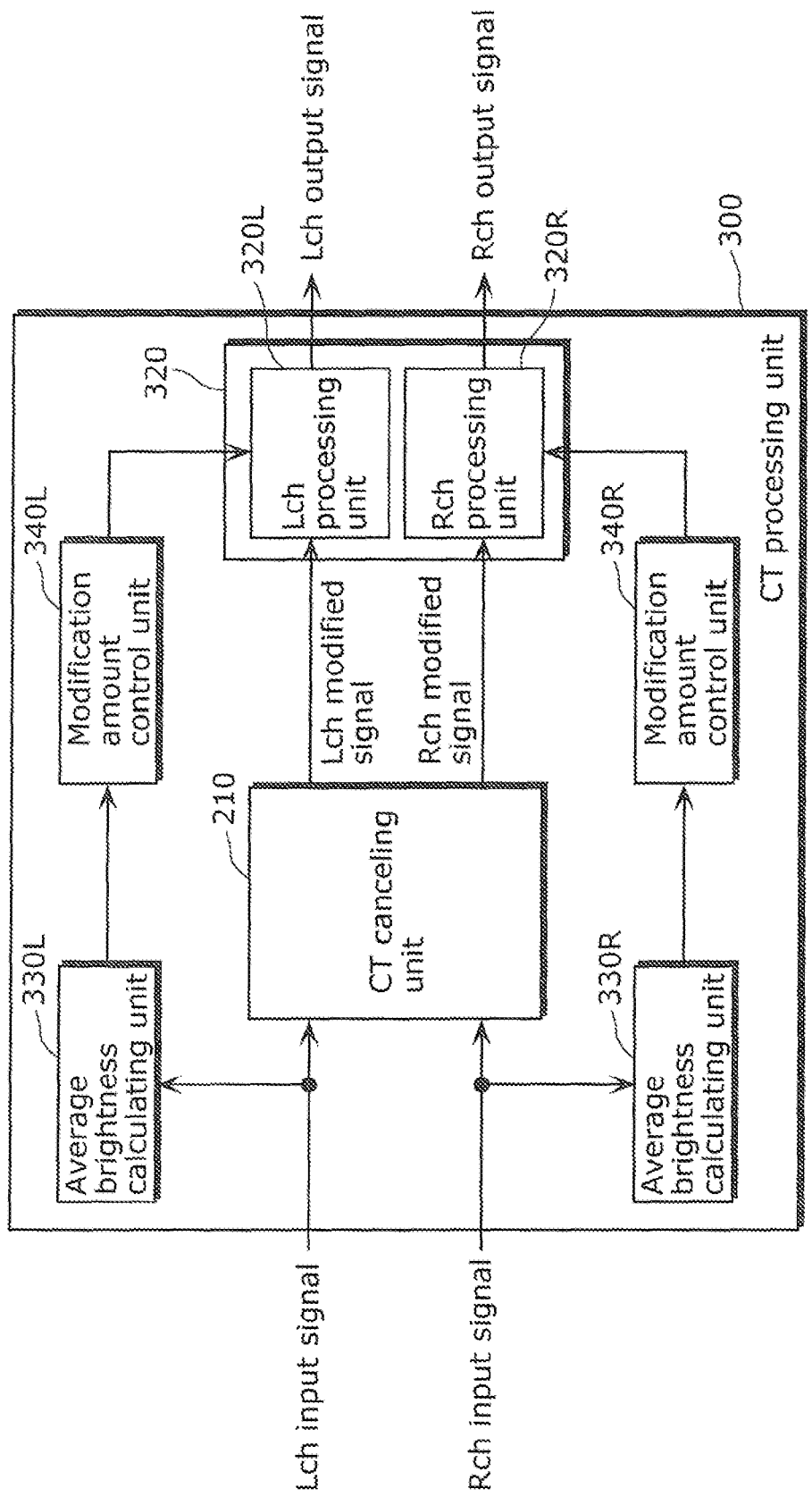
FIG. 14 is a functional block diagram of a CT processing unit according to Embodiment 2.
Figure 15:
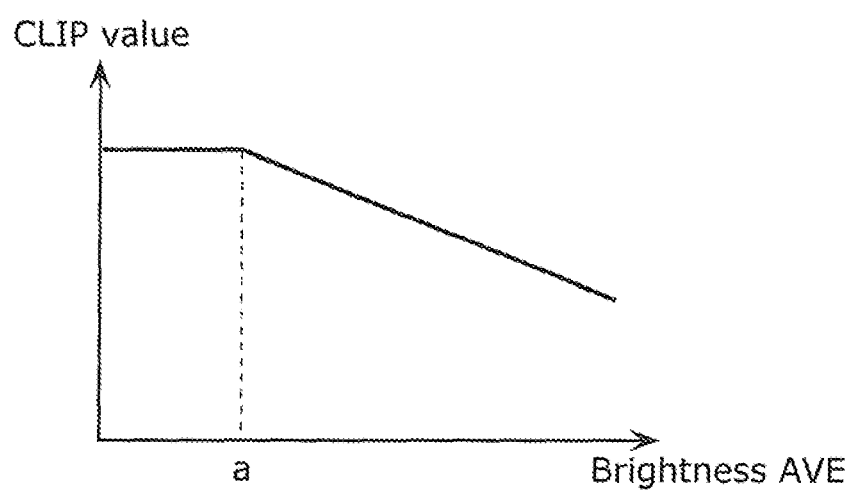
FIG. 15 is a graph showing relationships between average brightness levels and CLIP values.

Next, a CT processing unit 300 according to Embodiment 2 of the present invention is described with reference to FIG. 14 and FIG. 15. FIG. 14 is a functional block diagram of the CT processing unit 300 according to Embodiment 2. FIG. 15 is a graph showing relationships between average brightness levels and CLIP values. The same structural elements as those of the CT processing unit 200 in Embodiment 1 are assigned with the same reference numerals, and detailed descriptions thereof are not repeated here. In addition, functional blocks assigned with a reference numeral including L at the end execute processing on a left-eye frame, and functional blocks assigned with a reference numeral including R at the end execute, on a right-eye frame, substantially the same (symmetrical) processing as the processing performed on the left-eye frame. Therefore, the processing on the left-eye side is focused in the following descriptions.

As shown in FIG. 14, the CT processing unit 300 according to Embodiment 2 includes: a CT canceling unit 210; a saturation modification processing unit 320 including an Lch processing unit 320L and an Rch processing unit 320R; average brightness calculating units 330L and 330R; and modification amount control units 340L and 340R. In FIG. 14, an Lch input R, an Lch input G, and an Lch input B are called as an Lch input signal as a whole. This is true of the other signals.

The average brightness calculating unit 330L obtains the Lch input signal, and calculates the average brightness level of the input left-eye frame in units of a frame (or a predetermined segment area). The calculation method is not specifically limited. For example, it is only necessary to calculate an arithmetic average of the brightness levels of all the pixels of the input left-eye frame.

The modification amount control unit 340L determines a CLIP value, based on the average brightness level calculated by the average brightness calculating unit 330L. The CLIP value is an absolute value for determining the largest value of the addition value that is determined by the saturation modification processing unit 320. The average brightness level used to calculate the CLIP value is an average brightness level of the left-eye frame immediately-preceding the left-eye frame that is currently being processed by the CT processing unit 300.

The method of calculating such a CLIP value is not specifically limited. For example, the CLIP value is set to be smaller (the absolute value is made smaller) as the average brightness level is higher. More specifically, as shown in FIG. 15, it is only necessary that the CLIP value is fixed (at the maximum) in the case where the average brightness level (denoted as "Brightness AVE") is not higher than a predetermined threshold value a, and otherwise, it is only necessary that the absolute value of the CLIP value is set to be smaller as the average brightness level is higher.

The Lch processing unit 320L adds an addition value to the signal level of each of the red, green, and blue color components of the Lch modification signals to generate Lch output signals. Here, the method of calculating such an addition value is different from the method in Embodiment 1. The method of calculating the addition value according to Embodiment 2 is described with reference to FIG. 12.

First, the Lch processing unit 320L obtains a CLIP value from the modification amount control unit 340L. In this example, the CLIP value is assumed to be an absolute value of 15. Next, the saturation modification control unit 221L modifies the signal levels of the respective red, green, and blue color components using the CLIP value, prior to extraction of the largest value component. More specifically, the saturation modification control unit 221L replaces, with a negative value of the CLIP value, the signal level of a negative value whose absolute value is larger than the CLIP value from among the signal levels of the components. In this example, the absolute value of the signal level (−20) of the Lch modified G is larger than the CLIP value, and thus the signal level of the Lch modified G is replaced with −15.

Next, the saturation modification control unit 221L extracts the largest value component (the component having the signal level that is a negative value and the largest absolute value), using the signal level modified based on the CLIP value. In this example, the signal levels of the red, green, and blue color components are −10, −15, and 10, respectively, and thus the green color component is the largest value component. Next, the saturation modification control unit 221L determines, as the addition value (15), the absolute value of the signal level of the largest value component modified based on the CLIP value.

Subsequently, the mixing units 222L, 223L, and 224L modify the signal levels of the Lch modified R, Lch modified G, and Lch modified B, respectively. More specifically, the mixing unit 223L sets, to 0, the signal level of the Lch modified G that is the largest value component. The mixing units 222L and 224L add the addition value to the signal levels of the Lch modified R and Lch modified B. The signal levels of the Lch output R, Lch output R and Lch output R are set to 5, 0, and 25, respectively. The user visually perceives the brightness levels added with the residual crosstalk components R(10), G(20), and B(0), that are, a signal level of 15, a signal level of 20, and a signal level of 25. In this case, although the hue of the component G is slightly strong, hue differences are reduced compared to a case in which no addition processing is performed. This modification processing based on the CLIP value is performed only to extract the largest value component. The mixing units 222L, 223L, and 224L execute the processing using the signal levels unmodified based on the CLIP value.

The addition value (15) in Embodiment 2 is smaller than the addition value (20) in Embodiment 1. More specifically, the upper limit for the addition value is limited to the absolute value of the CLIP value. In other words, the Lch processing unit 320L defines the upper limit for the addition value, according to the characteristics (average brightness level) of the immediately-preceding Lch input signal.

The left-eye frame displayed on the display panel 11 has a slight change in hue compared to the original left-eye frame, and has a change in brightness which is smaller than those in Embodiment 1.

The addition amount in Embodiment 1 increases as the residual crosstalk amount increases. A large addition amount makes the hue closer to the original colors, and increases the brightness excessively, resulting in degradation in the appearance. To prevent this, this embodiment is intended to balance the hue change amount and the brightness change amount by adaptively changing the value of the CLIP value.

Here, an image having a high average brightness level is an image that is bright as a whole. Thus, the image receives a relatively small (unnoticeable) residual crosstalk due to persistence. In contrast, an image having a low average brightness level is an image that is dark as a whole. Thus, the image receives a relatively large residual crosstalk due to persistence. In view of enhancement in hue, it is good to decrease the upper limit for the addition value, that is, the absolute value of the CLIP value more significantly as the average brightness level increases as shown in FIG. 15.

In contrast to the case in FIG. 15, in view of the drawback of such increase in brightness, it is also good to increase the absolute value of the CLIP value more significantly as the average brightness level increases. A brightness change in an image having a high average brightness level (a bright image) is relatively unnoticeable, and thus it is possible to set a high upper limit for the addition value in order to reduce hue change to the minimum. In contrast, a brightness change in an image having a low average brightness level (a dark image) is noticeable, and thus the upper limit for the addition value is set lower in order to reduce brightness change at the cost of some hue change.

Since a small CLIP value does not reduce hue change so much, and a large CLIP value changes brightness excessively, the CLIP value is suitably adjusted based on parameters such as the average brightness in this way. Different setting methods are conceivable as in the above examples, and such setting methods are selectively used depending on the most-desired effect.

Furthermore, the modification amount control unit 340L calculates the CLIP value, using the average brightness level of the left-eye frame immediately-preceding the left-eye frame that is currently being processed by the CT processing unit 300. This utilizes the characteristics that temporally adjacent two left-eye frames are similar to each other. In short, the CT processing unit 300 in Embodiment 2 is more suitable for processing on video with little motions.

Embodiment 3

Next, a CT processing unit 400 according to Embodiment 3 of the present invention is described with reference to FIG.

Figure 16:
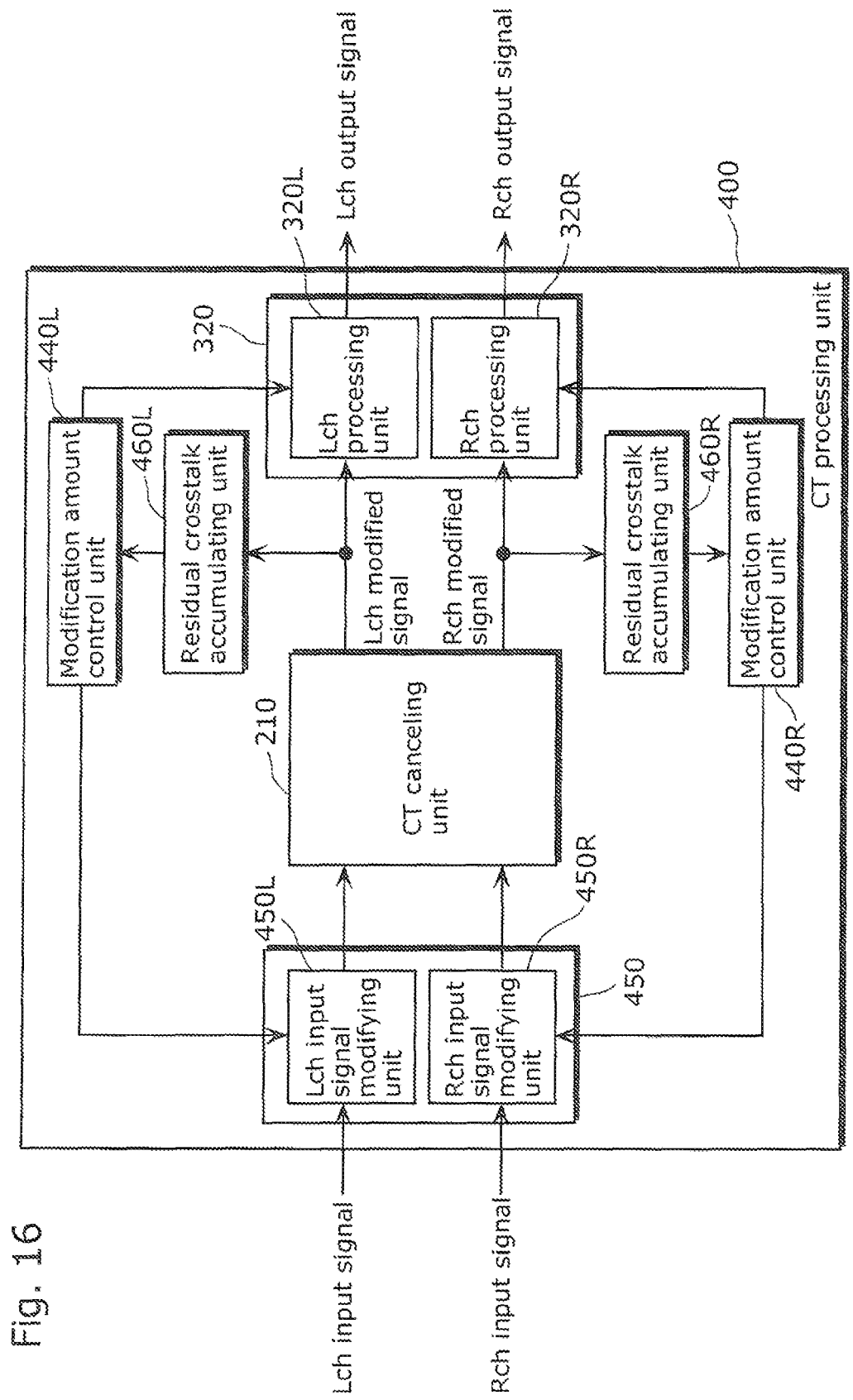
FIG. 16 is a functional block diagram of a CT processing unit according to Embodiment 3.
Figure 17A:
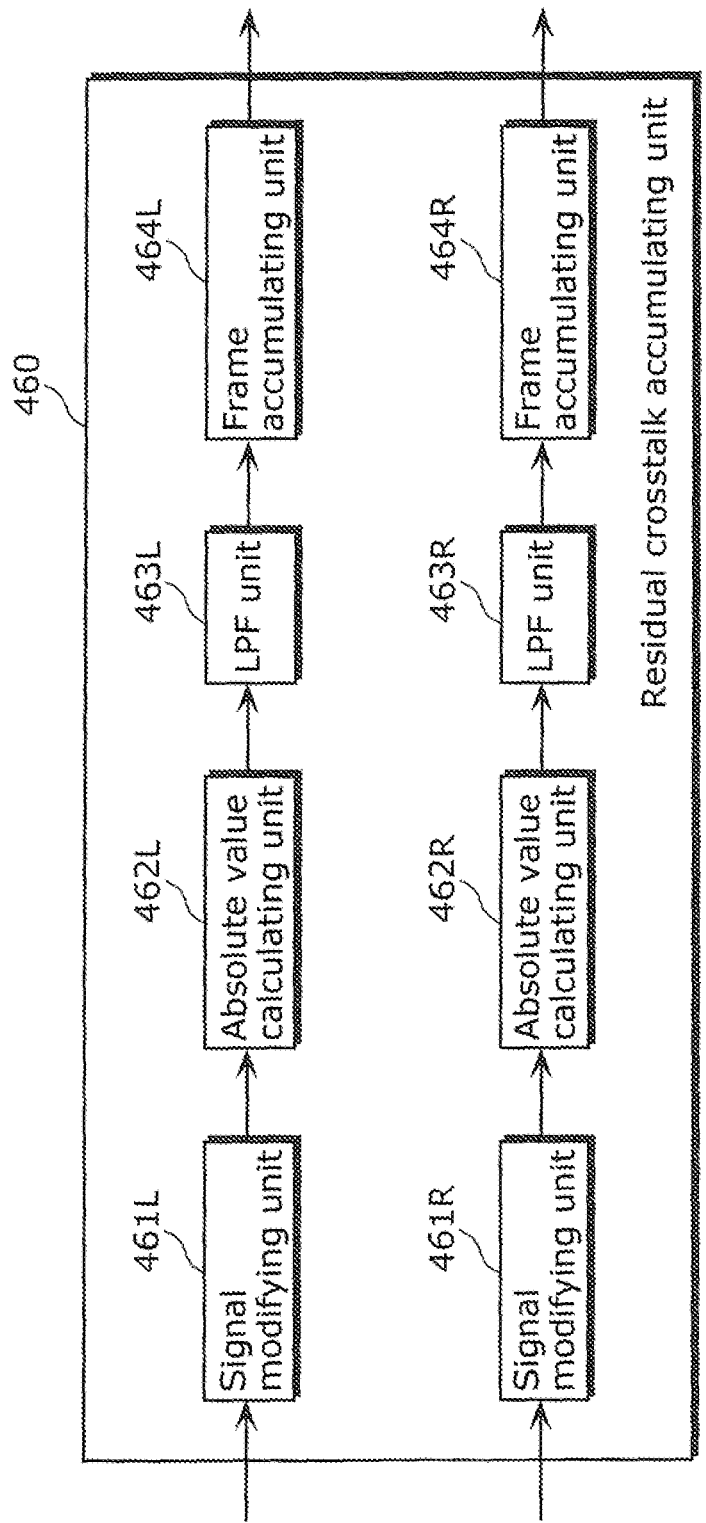
FIG. 17A is an exemplary functional block diagram of a residual crosstalk accumulating unit.
Figure 17B:
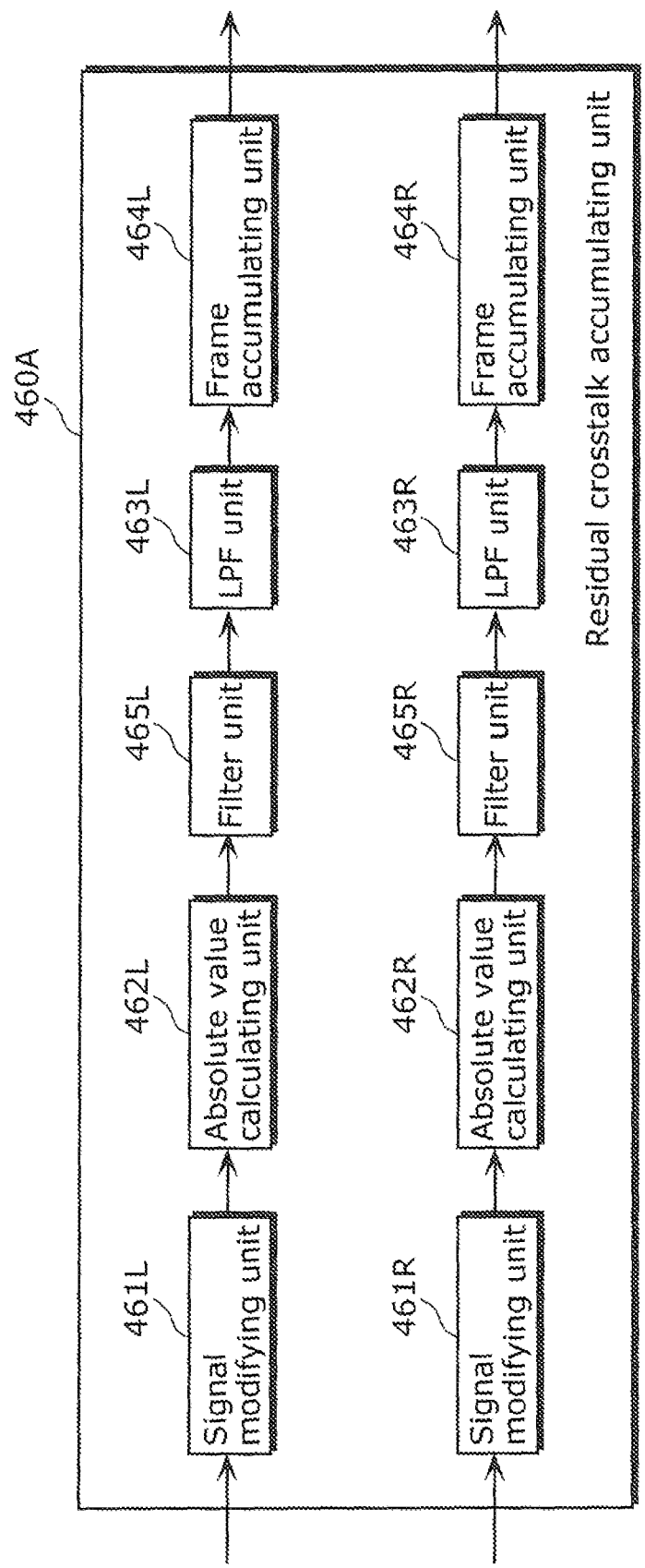
FIG. 17B is another exemplary functional block diagram of a residual crosstalk accumulating unit.
Figure 17C:
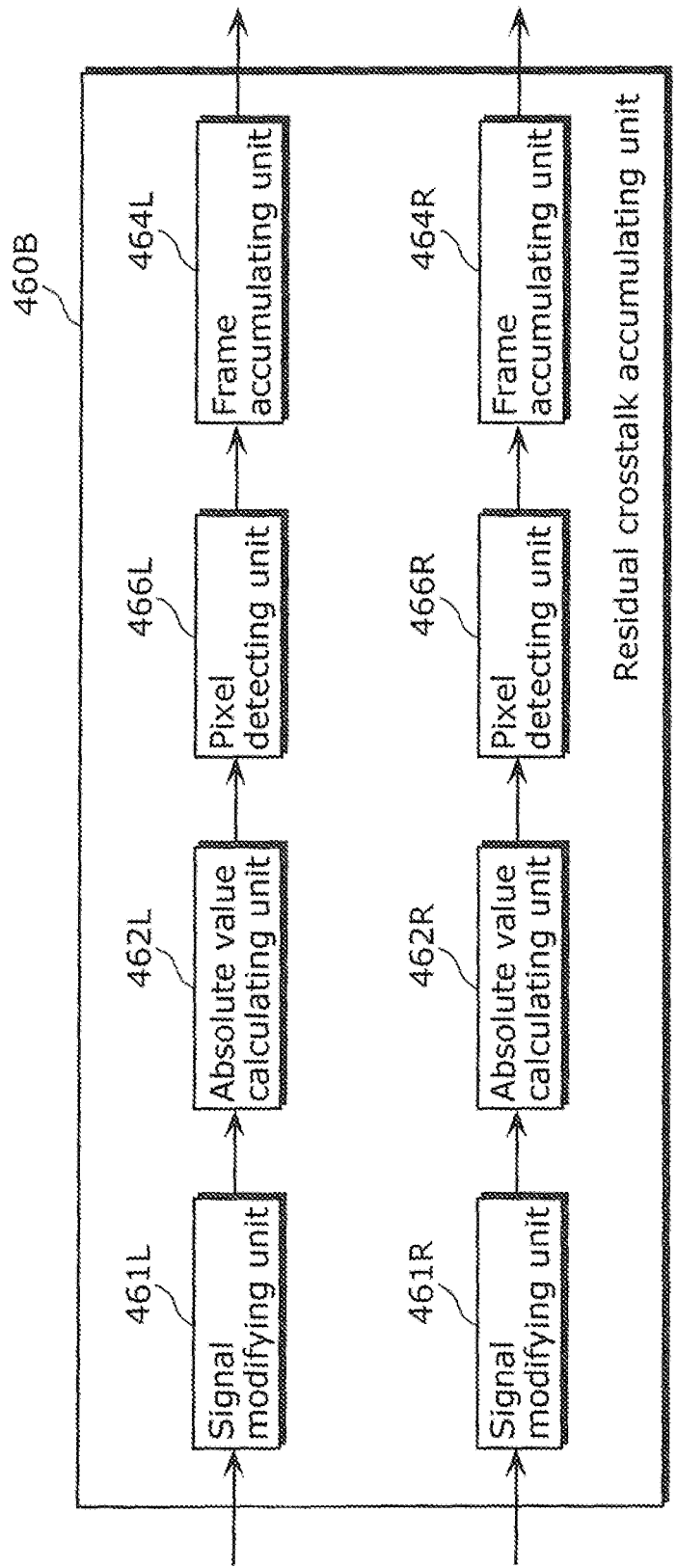
FIG. 17C is still another exemplary functional block diagram of a residual crosstalk accumulating unit.
Figure 18:
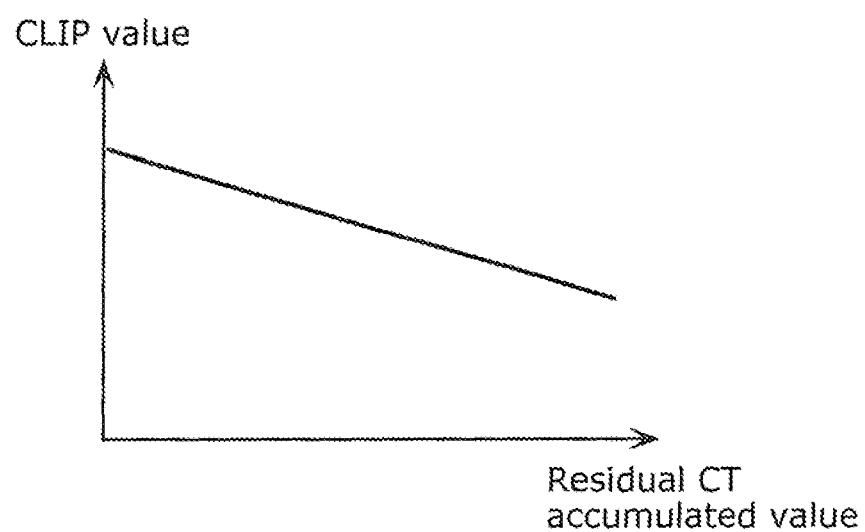
FIG. 18 is a graph showing relationships between residual crosstalk accumulated values and CLIP values.

16 to FIG. 18. FIG. 16 is a functional block diagram of the CT processing unit 400 according to Embodiment 3. Each of FIG. 17A to 17C is a functional block diagram of a corresponding one of residual crosstalk accumulating units 460A and 460B. FIG. 18 is a graph showing relationships between residual crosstalk accumulated values (values obtained by accumulating residual crosstalk amounts) and CLIP values. The same structural elements as those of the CT processing units 200 and 300 in Embodiments 1 and 2 are assigned with the same reference numerals, and detailed descriptions thereof are not repeated here. In addition, functional blocks assigned with a reference numeral including L at the end execute processing on a left-eye frame, and functional blocks assigned with a reference numeral including L at the end execute, on a right-eye frame, substantially the same (symmetrical) processing as the processing performed on the left-eye frame. Therefore, the processing on the left-eye side is focused in the following descriptions.

As shown in FIG. 16, the CT processing unit 400 according to Embodiment 3 includes: a CT canceling unit 210; a saturation modification processing unit 320 including an Lch processing unit 320L and an Rch processing unit 320R; modification amount control units 440L and 440R; an input signal modifying unit 450 including an Lch input signal modifying unit 450L and an Rch input signal modifying unit 450R; and residual crosstalk accumulating units 460L and 460R (denoted as a "residual crosstalk accumulating unit 460 as a whole). In FIG. 16, an Lch input R, an Lch input G, and an Lch input B are called as an Lch input signal as a whole. This is true of the other signals.

The residual crosstalk accumulating unit 460L obtains the Lch modified signal, and calculates the residual crosstalk accumulated value of the left-eye frame in units of a frame (or a predetermined segment area). Detailed structures of the residual crosstalk accumulating units 460, 460A, and 460B are described with reference to FIG. 17A to FIG. 17C.

As shown in FIG. 17A, the corresponding residual crosstalk accumulating unit 460 includes signal modifying units 461L and 461R; absolute value calculating units 462L and 462R; LPF (Low Path Filter) units 463L and 463R; and frame accumulating units 464L and 464R. The corresponding residual crosstalk accumulating unit 460 is intended to execute processing on a left-eye frame and processing on a right-eye frame independently. Thus, processing on one side (left-eye frame) is described here.

The signal modifying unit 461L detects the signal level of the Lch modified signal that is output from the CT canceling unit 210, and modifies the signal level as necessary. More specifically, the signal modifying unit 461L modifies the signal level of the signal to 0 and outputs the signal having the modified signal level when the signal level of the Lch modified signal to be input is 0 or more, that is, the signal level shows a positive value. In contrast, when the signal level is not higher than 0, that is, the signal level shows a negative value, the signal modifying unit 461L outputs the signal having the value without such modification. In this way, only a signal having a negative value (that is, including residual crosstalk) from among the Lch modified signals processed by the CT canceling unit 210 is extracted by the signal modifying unit 461L.

The absolute value calculating unit 462L calculates the absolute value of the signal modified by the signal modifying unit 461L. The LPF unit 463L reduces the change rate of the value calculated by the absolute value calculating unit 462L. The LPF unit 463L is intended to perform LPF processing in order to decimate signals sequentially output from the absolute value calculating unit 462L in frame accumulation processing. The frame accumulating unit 464L accumulates signals output from the LPF unit 463L in units of a frame (or a predetermined segment area).

In other words, the output signals from the residual crosstalk accumulating unit 460L correspond to an accumulated value (an estimated value) of residual crosstalk included in an Lch modified signal corresponding to a frame. The processing may be executed for each of the red, green, and blue color components. All the values may be accumulated without distinguishing such color components. FIG. 17B is a functional block diagram of the residual crosstalk accumulating unit 460A, which is a variation of FIG. 17A. The residual crosstalk accumulating unit 460A shown in FIG. 17B is different from the residual crosstalk accumulating unit 460 shown in FIG. 17A in that the residual crosstalk accumulating unit 460A includes filter units 465L and 465R between the absolute value calculating units 462L and 462R and the LPF units 463L and 463R. The difference from the residual crosstalk accumulating unit 460 shown in FIG. 17A is described below. Only processing on one side (a left-eye frame) is described. The filter unit 465L compares the value (signal level) calculated by the absolute value calculating unit 462L with a predefined maximum value and minimum value. The filter unit 465L outputs the maximum value when the signal level exceeds the maximum value, and outputs 0 when the signal level is below the minimum level. When the signal level is between the maximum value and the minimum value, the filter unit 465L outputs the raw signal level. Clipping a signal level below the predetermined minimum value to 0 corresponds to ignoring the pixel having a minute residual crosstalk. This makes it possible to skip detection of image (exclude the image from targets of modification processing) which includes a large number of pixels with such a minute residual crosstalk amount. Clipping a signal level exceeding the predetermined maximum value to the maximum value corresponds to reducing the influence of the pixel having an extremely large residual crosstalk amount. FIG. 17C is a functional block diagram of the residual crosstalk accumulating unit 460B, which is a variation of FIG. 17A. The residual crosstalk accumulating unit 460B shown in FIG. 17C is different from the residual crosstalk accumulating unit 460 in that the residual crosstalk accumulating unit 460B includes pixel detecting units 466L and 466R instead of the LPF units 463L and 463R. The difference from the residual crosstalk accumulating unit 460 shown in FIG. 17A is described below. Only processing on one side (a left-eye frame) is described. The pixel detecting unit 466L compares the value (signal level) calculated by the absolute value calculating unit 462L with a predetermined threshold (the minimum value), and outputs 1 when the signal level is equal to or higher than the threshold value, and outputs 0 when the signal level is not higher than the threshold value. The residual crosstalk accumulating unit 460B outputs the number of pixels (a pixel area) each having a residual crosstalk amount equal to or larger than the threshold value (that is, having the signal level which is input to the residual crosstalk accumulating unit 460B is equal to or less than the predetermined threshold value).

The modification amount control unit 440L determines a CLIP value, based on the residual crosstalk accumulated amount calculated by the residual crosstalk accumulating unit 460. Next, the modification amount control unit 440L outputs the determined CLIP value to the Lch processing unit 320L. As in Embodiment 2, the residual crosstalk accumulated value used to calculate the CLIP value is the residual crosstalk accumulated value of the left-eye frame immediately preceding the left-eye frame that is currently being processed by the CT processing unit 400.

As in Embodiment 2, the Lch processing unit 320L calculates an addition value based on the CLIP value obtained from the modification amount control unit 440L. In other words, the Lch processing unit 320L defines the upper limit for the addition value, depending on the characteristics of the Lch modified signal (residual crosstalk accumulated value).

The method of calculating the CLIP value is not specifically limited. For example, as shown in FIG. 18, it is only necessary that the absolute value of the CLIP value is set to be smaller as the residual crosstalk accumulated value is larger. A large residual crosstalk accumulated value is set when a current frame includes an area in which residual crosstalk amount is large to some extent or when the frame is dark as a whole, in consideration of the relationship with the immediately-preceding right-eye frame. FIG. 11 shows the following example cases: residual crosstalk accumulated value is large when there are many pixels having the conditions that are the same as in the case of the input left-eye frame No. 1; and residual crosstalk accumulated value is small when there are many pixels having the conditions that are the same as in the case of the input left-eye frame No. 3.

A brightness change in an image having a large residual crosstalk accumulated value (a dark image) is noticeable, and thus it is desirable that the upper limit for the addition value is set lower in order to reduce brightness change at the cost of some hue change. A brightness change in an image having a small residual crosstalk accumulated value (a bright image) is unnoticeable, and thus it is desirable that the upper limit for the addition value is set higher in order to reduce hue change to the minimum.

The Lch input signal modifying unit 450L modifies the Lch input signal and outputs the modified one to the CT canceling unit 210. Typically, the Lch input signal modifying unit 450L increases the brightness (black level) of the Lch input signal, or executes processing of modifying the dark part side y of the gradation characteristics. In other words, the Lch input signal modifying unit 450L adds the same value to each of the signal levels of the red, green, and blue color components, or modifies the gradation characteristics of the dark part side in the same manner as mentioned above. In this way, it is possible to reduce the residual crosstalk amount of the Lch input signal.

The value added by the Lch input signal modifying unit 450L is calculated by the modification amount control unit 440L. In the exemplary case of modifying brightness, it is only necessary that a larger value is added as the residual crosstalk accumulated value of the immediately-preceding left-eye frame is larger. In other words, the brightness of an image having a large residual crosstalk accumulated value is added with a relatively large value in advance. It is possible to reduce the amount of residual crosstalk that remains uncanceled, by modifying the brightness or the gradation characteristics of the dark part side prior to the canceling processing by the CT canceling unit 210.

On the other hand, in the case of an image having a small residual crosstalk accumulated value, it is possible to effectively suppress occurrence of residual crosstalk and concurrently reduce change in brightness by adding a small value to the image. Although an example of modifying brightness is shown here, it is possible to achieve the same advantageous effect by controlling the y characteristics of the dark part side of a video.

Embodiment 4

Figure 19:
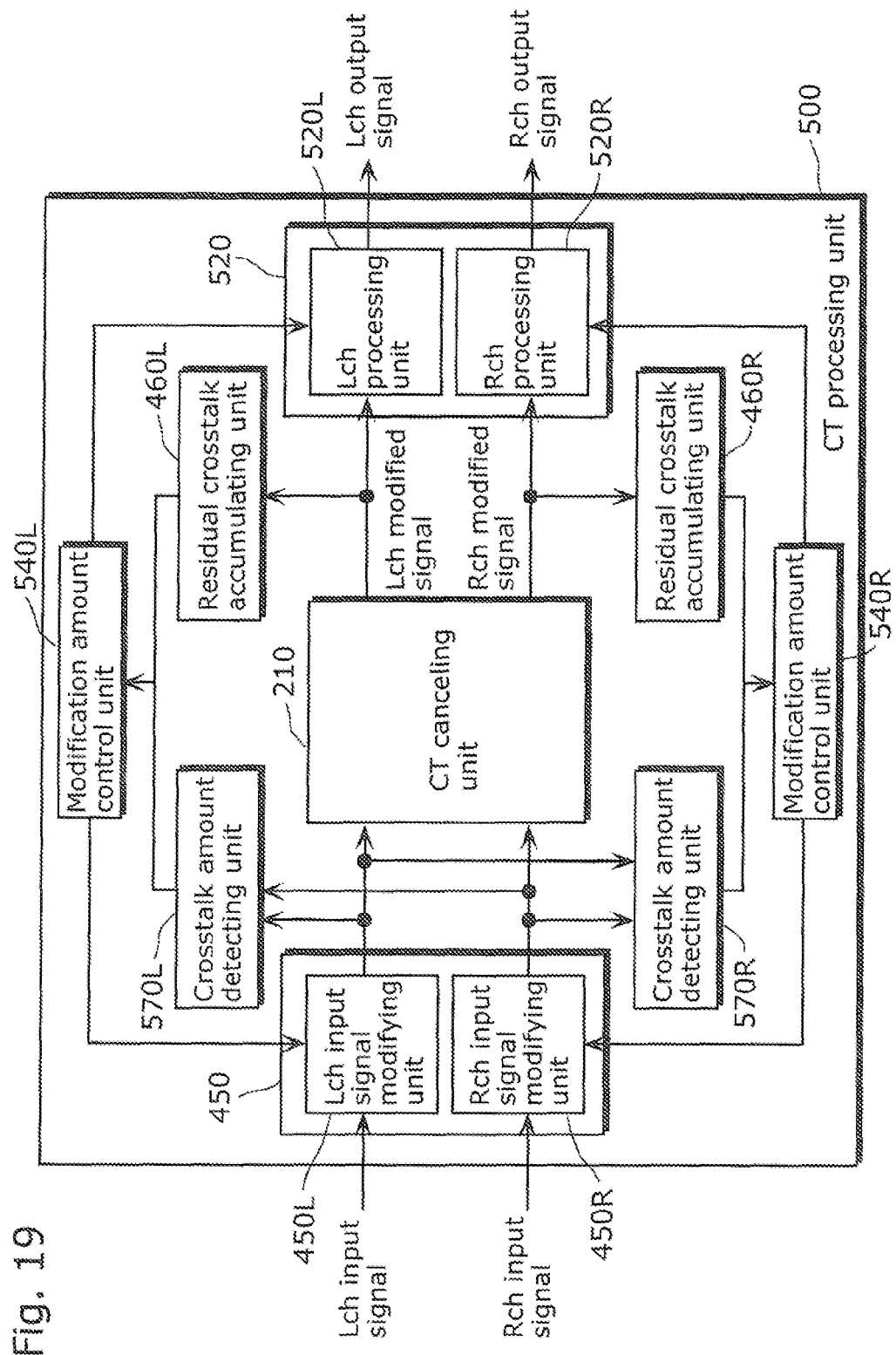
FIG. 19 is a functional block diagram of a CT processing unit according to Embodiment 4.
Figure 20:
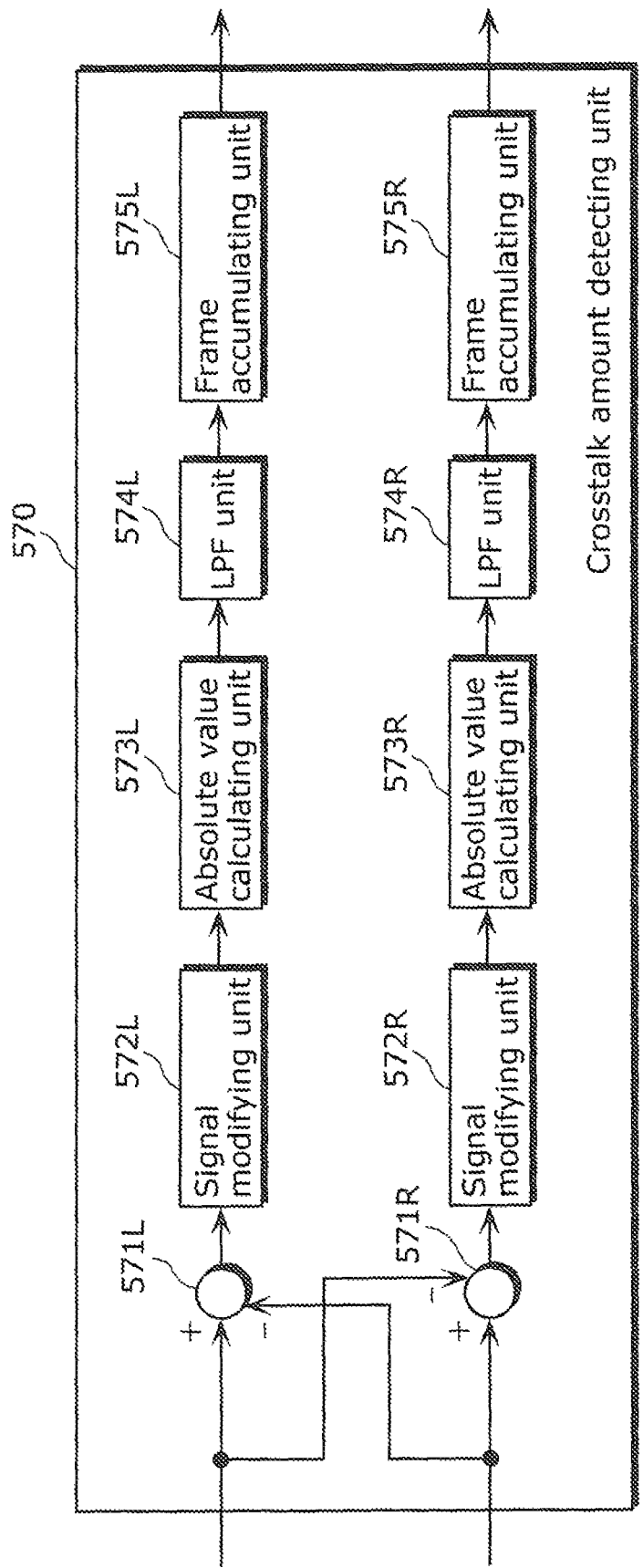
FIG. 20 is a functional block diagram of a crosstalk amount detecting unit.
Figure 21:
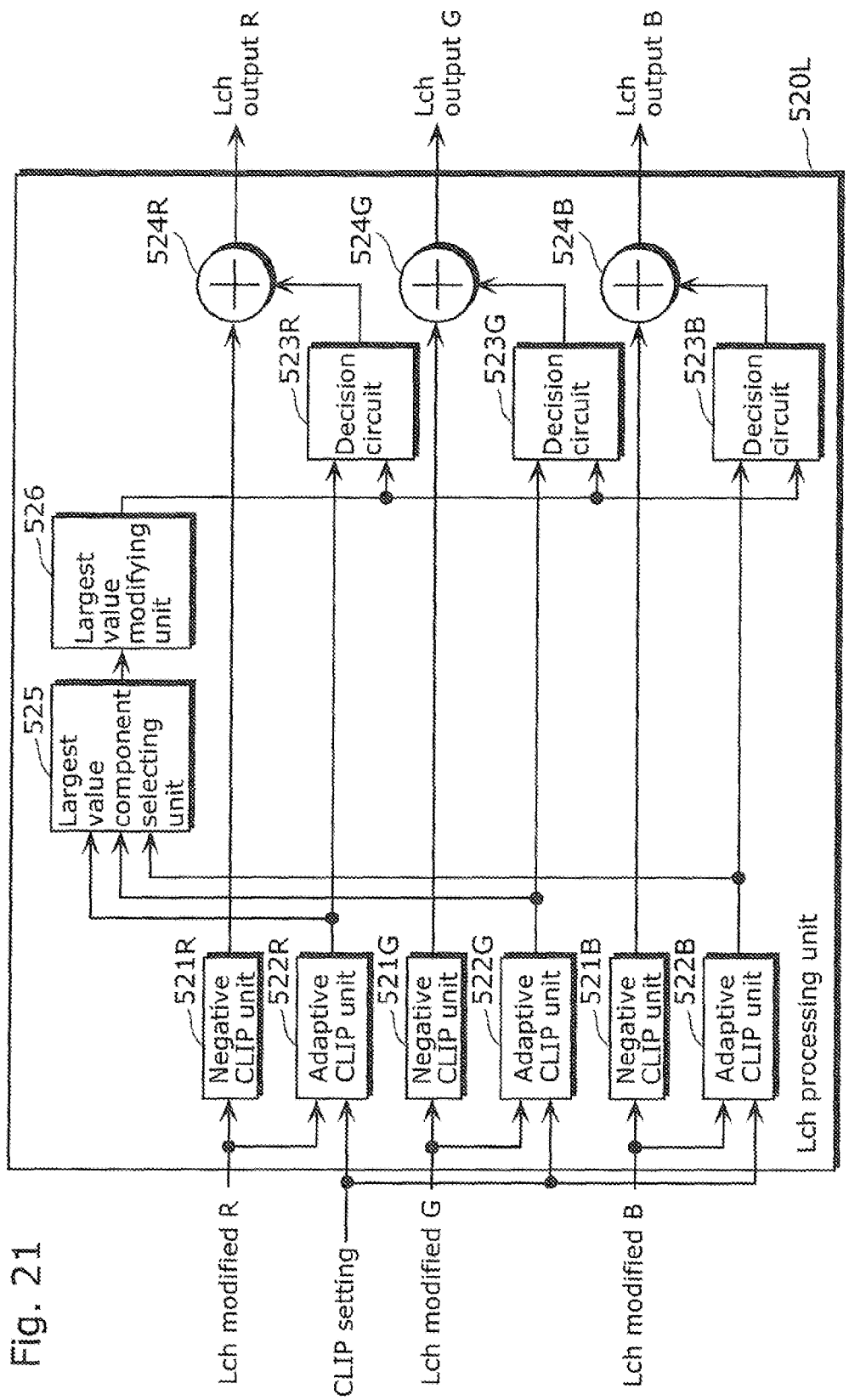
FIG. 21 is a functional block diagram of an Lch processing unit.
Figure 22:
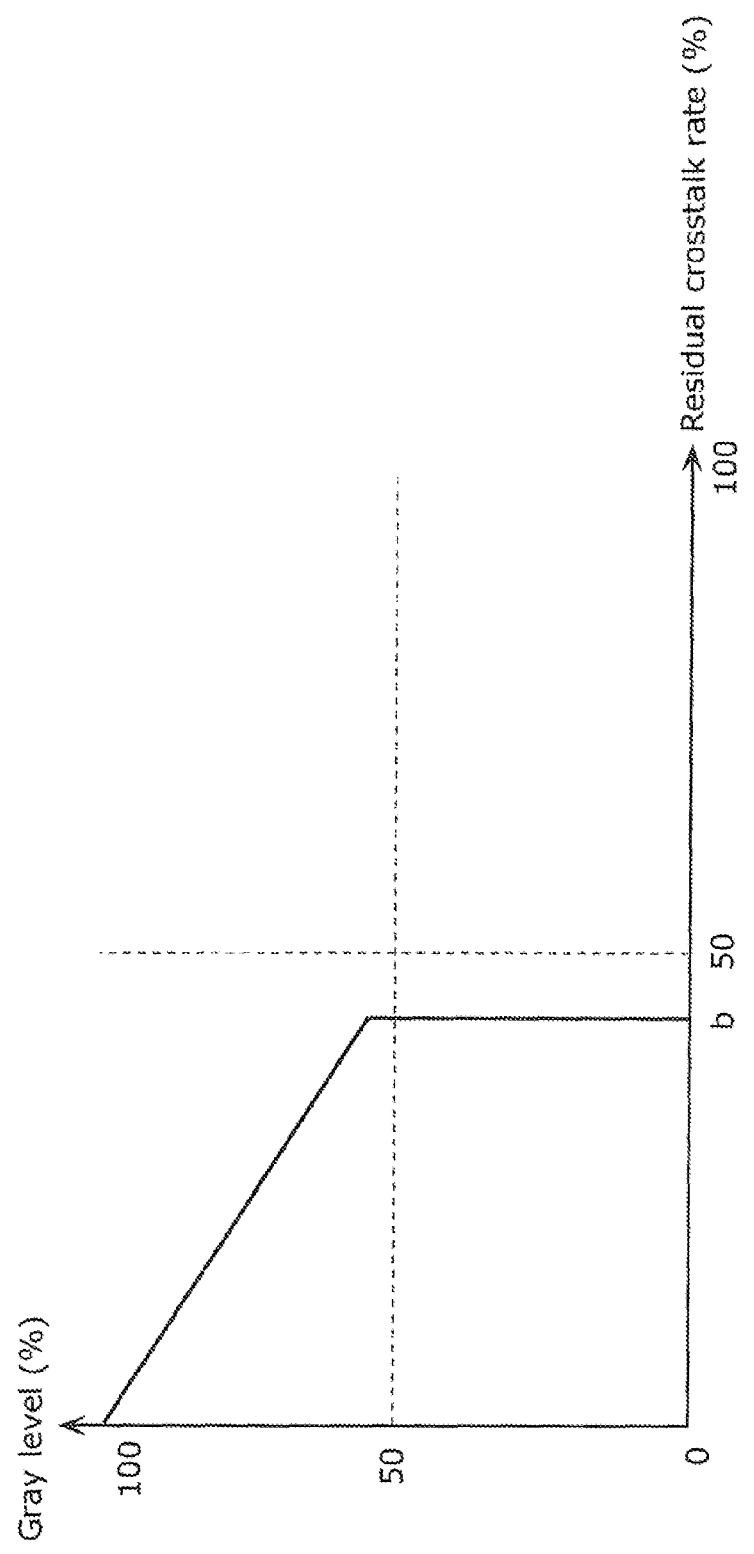
FIG. 22 is a graph showing relationships between residual crosstalk rates and gray levels.

Next, a CT processing unit 500 according to Embodiment 4 of the present invention is described with reference to FIG. 19 to FIG. 22. FIG. 19 is a functional block diagram of the CT processing unit 500 according to Embodiment 4. FIG. 20 is a functional block diagram of a crosstalk amount detecting unit 570. FIG. 21 is a detailed functional block diagram of an Lch processing unit shown in FIG. 520L. FIG. 22 is a graph showing relationships between residual crosstalk rates and gray levels. The same structural elements as those of the CT processing units 200, 300, and 400 in Embodiments 1 to 3 are assigned with the same reference numerals, and detailed descriptions thereof are not repeated here. In addition, functional blocks assigned with a reference numeral including L at the end execute processing on a left-eye frame, and functional blocks assigned with a reference numeral including L at the end execute, on a right-eye frame, substantially the same (symmetrical) processing as the processing performed on the left-eye frame. Therefore, the processing on the left-eye side is focused in the following descriptions.

As shown in FIG. 19, the CT processing unit 500 according to Embodiment 4 includes: a CT canceling unit 210; a saturation modification processing unit 520 including an Lch processing unit 520L and an Rch processing unit 520R; modification amount control units 540L and 540R; input signal modifying units 450 including an Lch input signal modifying unit 450L and an Rch input signal modifying unit 450R; residual crosstalk accumulating units 460L and 460R; and crosstalk amount detecting units 570L and 570R (denoted as "crosstalk amount detecting units 570" as a whole). In FIG. 19, an Lch input R, an Lch input G, and an Lch input B are called as an Lch input signal as a whole. This is true of the other signals.

The crosstalk amount detecting unit 570L obtains the Lch input signal, and calculates the crosstalk amounts of a left-eye frame in units of a frame. A detailed structure of the crosstalk amount detecting unit 570 is described with reference to FIG. 20.

As shown in FIG. 20, the crosstalk amount detecting unit 570 includes: signal level ratio calculating units 571L and 571R; signal modifying units 572L and 572R; absolute value calculating units 573L and 573R; LPF units 574L and 574R; and frame accumulating units 575L and 575R. The crosstalk amount detecting unit 570 is intended to execute processing on a left-eye frame and processing on a right-eye frame independently.

The crosstalk amount detecting unit 570 shown in FIG. 20 is different from the residual crosstalk accumulating unit 460 shown in FIG. 17A in that the crosstalk amount detecting unit 570 receives both the Lch input signal and the Rch input signal, and further includes the signal level ratio calculating units 571L and 571R before the signal modifying units 572L and 572R.

The signal level ratio calculating unit 571L calculates the signal level ratio between the Lch input signal and the Rch input signal. More specifically, the signal level ratio calculating unit 571L subtracts the signal level of the immediately-preceding Rch input signal from the signal level of the Lch input signal. Likewise, the signal level ratio calculating unit 571R subtracts the signal level of the immediately-preceding Lch input signal from the signal level of the Rch input signal.

In other words, the value calculated by the crosstalk amount detecting unit 570L is a value correlated to the crosstalk amount that can appear on the left-eye frame due to influence of the immediately-preceding right-eye frame. Embodiment 3 shows an example of obtaining an Lch input signal and an Rch input signal that have been modified by the input signal modifying units 450, and calculating the residual crosstalk amount. However, the method is not limited thereto.

It is also good to obtain an Lch input signal and an Rch input signal unmodified by the input signal modifying units 450 instead.

The modification amount control unit 540L calculates a CLIP value and a value that is added by the Lch input signal modifying unit 450L, based on one or both of the residual crosstalk accumulated value calculated by the residual crosstalk accumulating unit 460L and the crosstalk amount calculated by the crosstalk amount detecting unit 570L. The calculation method using the residual crosstalk accumulated value is as described in Embodiment 3, and thus the same description is not repeated here.

For example, it is only necessary for the modification amount control unit 540L to decrease the CLIP value as the crosstalk amount increases. This prevents a noticeable change in one of hue and brightness. Alternatively, the modification amount control unit 540L may increase a value that is added by the Lch input signal modifying unit 450L as the crosstalk amount increases. This makes it possible to cancel crosstalk in the CT canceling unit 210 to some extent, and thereby reducing residual crosstalk that remains uncanceled.

As in Embodiments 2 and 3, the Lch processing unit 520L calculates an addition value based on the CLIP value obtained from the modification amount control unit 540L. In other words, the Lch processing unit 520L calculates the addition value, based on the characteristics of the Lch input signal (a value correlated to the crosstalk amount) and the characteristics of the Lch modified signal (a residual crosstalk accumulated value).

Next, details of the Lch processing unit 520L are described with to reference to FIG. 21 and FIG. 22. As shown in FIG. 21, the Lch processing unit 520L includes: negative CLIP units 521R, 521G, and 521B; adaptive CLIP units 522R, 522G, and 522B; decision circuits 523R, 523G, and 523B; mixing units 524R, 524G, and 524B; a largest value component selecting unit 525; and a largest value modifying unit 526.

The negative CLIP units 521R, 521G, and 521B obtain an Lch modified R, an Lch modified G, and an Lch modified B, respectively. The negative CLIP units 521R, 521G, and 521B output a signal having, a positive value as it is, set a signal having a negative value to 0, and output 0. For example, assuming that a modified left-eye frame shown in FIG. 12 is input, the negative CLIP units 521R and 521G output 0, and the negative CLIP unit 521B outputs 10.

Each of the adaptive CLIP units 522R, 522G, and 522B extracts only an input signal having a negative value from among the corresponding input signal, calculates the absolute value of the extracted input signal, obtains a corresponding one of CLIP values shown as absolute values from the modification amount control unit 540L, and modifies the signal level of the Lch modified signal. For example, when the CLIP value is an absolute value of 15, the adaptive CLIP units 522R, 522G, and 522B output 10, 15, and 0, respectively.

The largest value component selecting unit 525 selects the largest value component, based on the signal level obtained by changing a negative signal that may be output from adaptive CLIP units 522R, 522G, or 522R into an absolute value, and adding the CLIP value to the signal level. In the above example, the green color component is the largest value component. Next, the largest value component selecting unit 525 outputs the absolute value of 15 that is the signal level of the largest value component.

The largest value modifying unit 526 calculates an addition value by modifying the value output from the largest value component selecting unit 525. More specifically, the addition value is calculated by multiplying the absolute value of the signal level of the largest value component with a predetermined coefficient (gray level). For example, when the gray level is 0.8, the addition value is 12.

The method of determining the gray level is described with reference to FIG. 22.

As shown in FIG. 22, the largest value modifying unit 526 decreases the gray level as the residual crosstalk rate increases. This makes it possible to prevent a noticeable brightness change. Furthermore, the largest value modifying unit 526 sets the gray level to 0 when the residual crosstalk rate reaches a predetermined threshold value b (for example, 45%). The residual crosstalk rate is equal to or higher than the threshold value b when the signal level of the left-eye frame is extremely small compared to the signal level of the immediately-preceding right-eye frame, and therefore it is anymore impossible to suppress the residual crosstalk by means of processing by the Lch processing unit 520L.

A residual crosstalk rate is a value obtained by using, as the denominator, the maximum value (255 in the case of 8-bit representation) for the signal level, and using, as the numerator, the absolute value of the signal level of a residual crosstalk component. Accordingly, a large residual crosstalk rate shows that the absolute value of the signal level of the residual crosstalk component is large.

The largest value modifying unit 526 may execute processing of decreasing the gray level more significantly when the output of the adaptive CLIP unit 522B is the largest value component than when either the Lch modified R or the Lch modified G is the largest value component. This is based on the characteristics of the display panel 11 on which the blue color components produce a small amount of persistence compared to the red color component and the green color component. The fact that the blue color component having a small persistence has the largest residual crosstalk shows that the L and R input signals are in a relationship in which only the crosstalk amount of the blue color component is extremely large. In this case, the drawback due to the brightness increase is more serious if the same saturation modification as those performed on the green color component and red color component is performed on the blue color component. For this reason, the aforementioned processing is performed.

The decision circuits 523R, 523G, and 523B calculate values that should be added by the mixing units 524R, 524G, and 524B to the signals that are output from the negative CLIP units 521R, 521G, and 521B, based on the signals output from the adaptive CLIP units 522R, 522G, and 522B and the addition value output from the largest value modifying unit 526.

First, when a current color component is the largest value component, 0 is output as a fixed value. Accordingly, in the exemplary case of FIG. 12, the decision circuit 523G outputs 0 because the largest value component is G. The mixing unit 524G adds the signal level (0) output from the negative CLIP unit 521G and the addition value (0) output from the decision circuit 523G, and outputs an Lch output G having a signal level of 0.

Next, when the signal level of the current color component is a negative value, the mixing unit 524R outputs, as the addition value, the difference from the largest value component (or a clipped value, if clipped). Accordingly, the decision circuit 523R outputs the difference (2) between (i) the signal level (12) of the largest value component G clipped and modified by the gray level and (ii) the signal level (10) output from the adaptive CLIP unit 522R. The mixing unit 524R adds the signal level (0) output from the negative CLIP unit 521R and the addition value (2) output from the decision circuit 523R, and outputs an Lch output R having a signal level of 2.

Otherwise, when the signal level of the current color component is a positive value, the mixing unit 524B outputs the addition value obtained from the largest value modifying unit 526 as it is. Accordingly, the decision circuit 523B outputs 12. The mixing unit 524B adds the signal level (10) output from the negative CLIP unit 521B and the addition value (12) output from the decision circuit 523B, and outputs an Lch output B having a signal level of 22.

Embodiment 5

Figure 23:
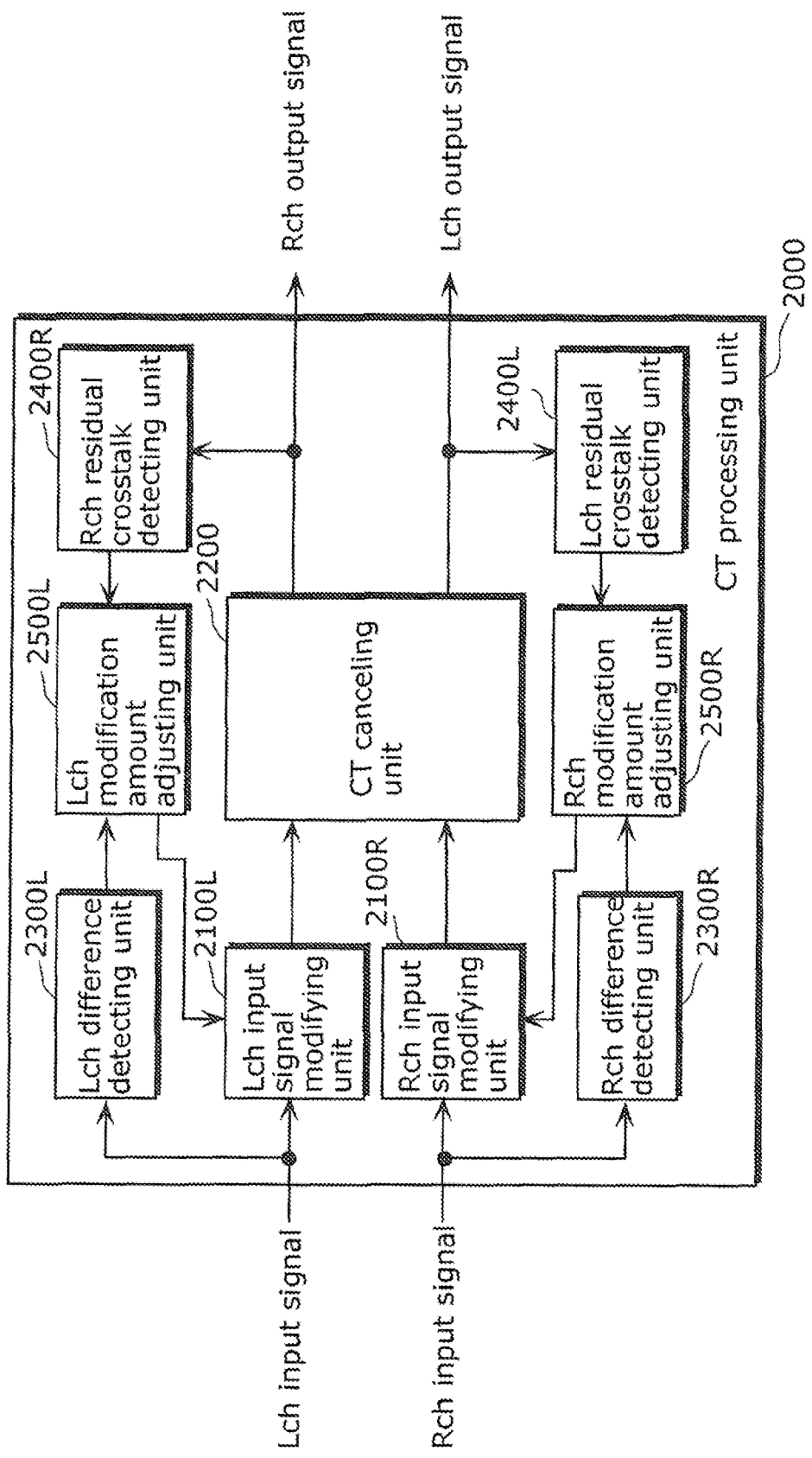
FIG. 23 is a functional block diagram of a CT processing unit according to Embodiment 5.

FIG. 23 is a functional block diagram of a CT processing unit (video signal processing apparatus) 2000 according to Embodiment 5. As shown in FIG. 23, the CT processing unit 2000 according to Embodiment 5 includes: an Lch input signal modifying unit 2100L; an Rch input signal modifying unit 2100R; a CT canceling unit 2200; an Lch difference detecting unit 2300L; an Rch difference detecting unit 2300R; an Lch residual crosstalk detecting unit 2400L; an Rch residual crosstalk detecting unit 2400R; an Lch modification amount adjusting unit 2500L; and an Rch modification amount adjusting unit 2500R. The CT processing unit 2000 executes processing of suppressing crosstalk that appear between two adjacent images.

The CT canceling unit 2200 alternately receives an input left-eye frame (Lch input signal) and an input right-eye frame (Rch input signal) that are temporally adjacent to each other. Each of the pixels of the Lch input signal is represented as a combination of the signal level of an input red color component (Lch input R), the signal level of an input green color component (Lch input G), and the signal level of an input blue color component (Lch input B). Likewise, each of the pixels of the Rch input signal is represented as a combination of the signal level of an input red color component (Rch input R), the signal level of an input green color component (Rch input G), and the signal level of an input blue color component (Rch input B).

The Lch input signal modifying unit 2100R modifies the Rch input signal, and outputs the modified one to the CT canceling unit 2200. More specifically, the Rch input signal modifying unit 2100R performs modification such that the signal levels of the Rch input R, Rch input G, and Rch input B are reduced according to the modification values and the hue is maintained. Examples of such processing include decreasing the signal contrast according to the modification values. The modification values are obtained from the Rch modification amount adjusting unit 2500R. Operations performed by the Lch input signal modifying unit 2100L are the same, and thus descriptions thereof are not repeated here.

The CT canceling unit 2200 calculates crosstalk component from the image immediately preceding a current image to be processed, and executes processing of modifying the current image using the crosstalk component. Signals that are processed by the CT canceling unit 2200 are the Lch input signal modified by the Lch input signal modifying unit 2100L and the Rch input signal modified by the Rch input signal modifying unit 2100R.

More specifically, the CT canceling unit 2200 obtains the Lch input signal and the Rch input signal immediately preceding the Lch input signal, and calculates crosstalk components of the Rch input signal for each of the Rch input R, Rch input G, and Rch input B of each of the pixels of the Rch input signal. Next, the CT canceling unit 2200 subtracts the crosstalk components from the signal levels of pixels in the Lch input signal to generate an output left-eye frame (Lch output signal) that is represented as a combination of the signal levels of the output red color component (Lch output R), the output green color component (Lch output G), and the output blue color component (Lch output B). Likewise, the CT canceling unit 2200 generates an output right-eye frame (Rch output signal) represented as a combination of the signal levels of the output red color component (Rch output R), the output green color component (Rch output G), and the output blue color component (Rch output B), based on the Rch input signal and the immediately-preceding Lch input signal.

Figure 24:
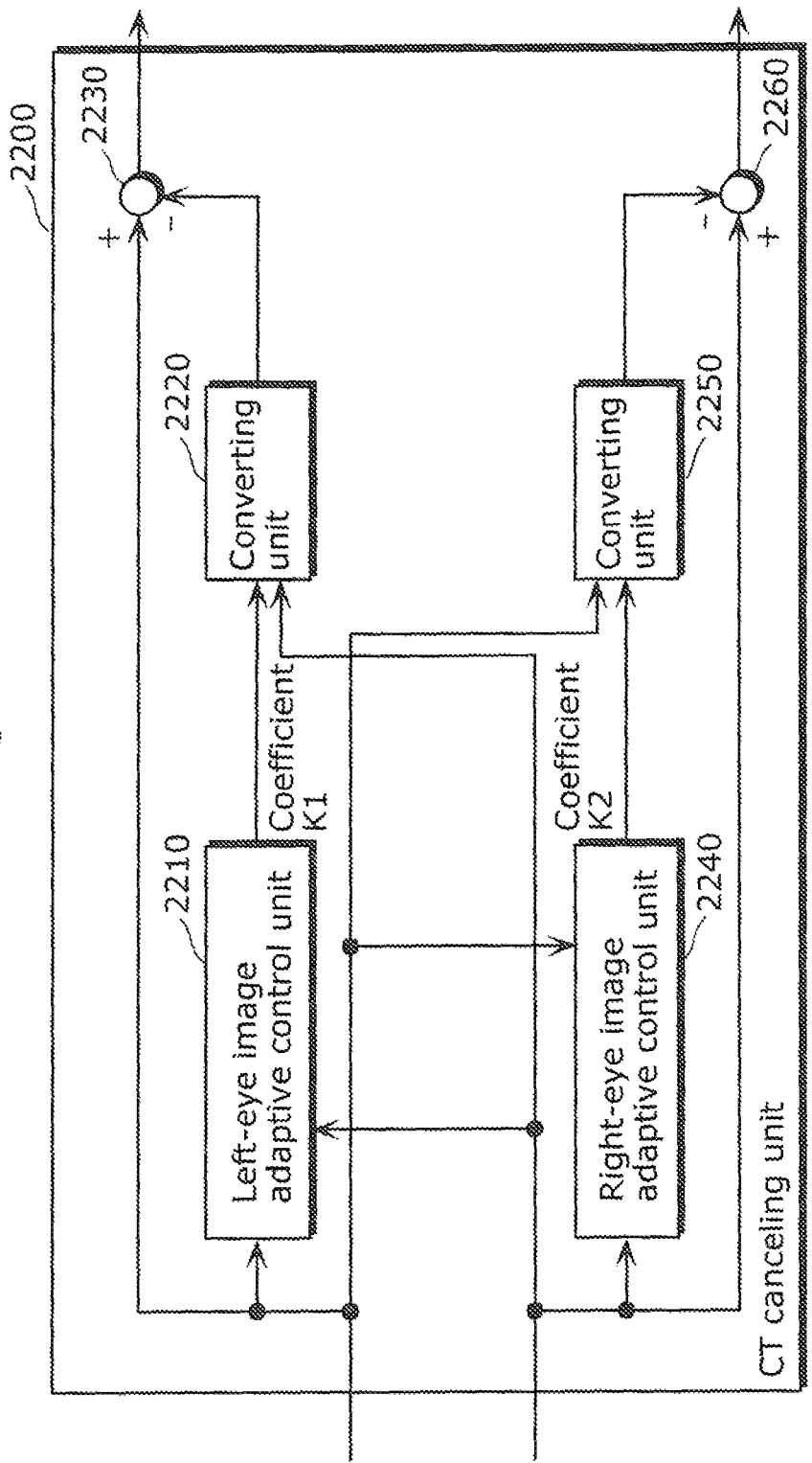
FIG. 24 is a detailed functional block diagram of the CT canceling unit.

FIG. 24 is a detailed functional block diagram of the CT canceling unit 2200. As shown in FIG. 24, the CT canceling unit 2200 includes a left-eye image adaptive control unit 2210, a right-eye image adaptive control unit 2240, converting units 2220 and 2250, and mixing units 2230 and 2260.

The left-eye image adaptive control unit 2210 calculates a coefficient K1 that is a multiplier to the Rch input signal, based on the Lch input signal and the immediately-preceding Rch input signal. A method of determining such a coefficient K1 will be described later.

The converting unit 2220 performs a predetermined conversion on the Rch input signal, based on the coefficient K1 determined by the left-eye image adaptive control unit 2210. Here is an example case where the coefficient K1 is persistence rate of the Rch input signal (the rate of persistence at the time when the immediately-following Lch input signal is displayed). In this case, the predetermined conversion is to multiply the Rch input signal with the coefficient K1.

The mixing unit 2230 mixes the Lch input signal and the Rch input signal converted by the converting unit 2220. As an example of such mixing is to subtract, from the signal level of the Lch input signal, the signal level of the Rch input signal converted by the converting unit 2220. The mixing unit 2230 outputs the mixed signal as an Lch output signal. This Lch output signal is obtained by compensating the amount of persistence produced by the immediately-preceding Rch output signal.

Each of the aforementioned processes is executed for each of the red, green, and blue color components of each pixel of an image. In other words, the left-eye image adaptive control unit 2210 calculates the coefficient K1R for a red color component, the coefficient K1G for a green color component, and the coefficient K1B for a blue color component. The converting unit 2220 multiplies the Rch input R, the Rch input G, and the Rch input B of each pixel of the Rch input signal, with the coefficient K1R, the coefficient K1G, the coefficient K1B, respectively. The mixing unit 2230 generates the Lch output signal by subtracting the signal levels of the Rch input R, Rch input G, and Rch input B of the pixels which constitute the Rch input signal output from the converting unit 2220, from the signal levels of the corresponding Lch input R, Lch input G, and Lch input B of the pixels which constitute the Lch input signal.

The crosstalk canceling on the Rch input signal is performed by the right-eye image adaptive control unit 2240, the converting unit 2250, and the mixing unit 226 in a manner similar (symmetrical) to the processing on the Lch input signal.

Figure 25:
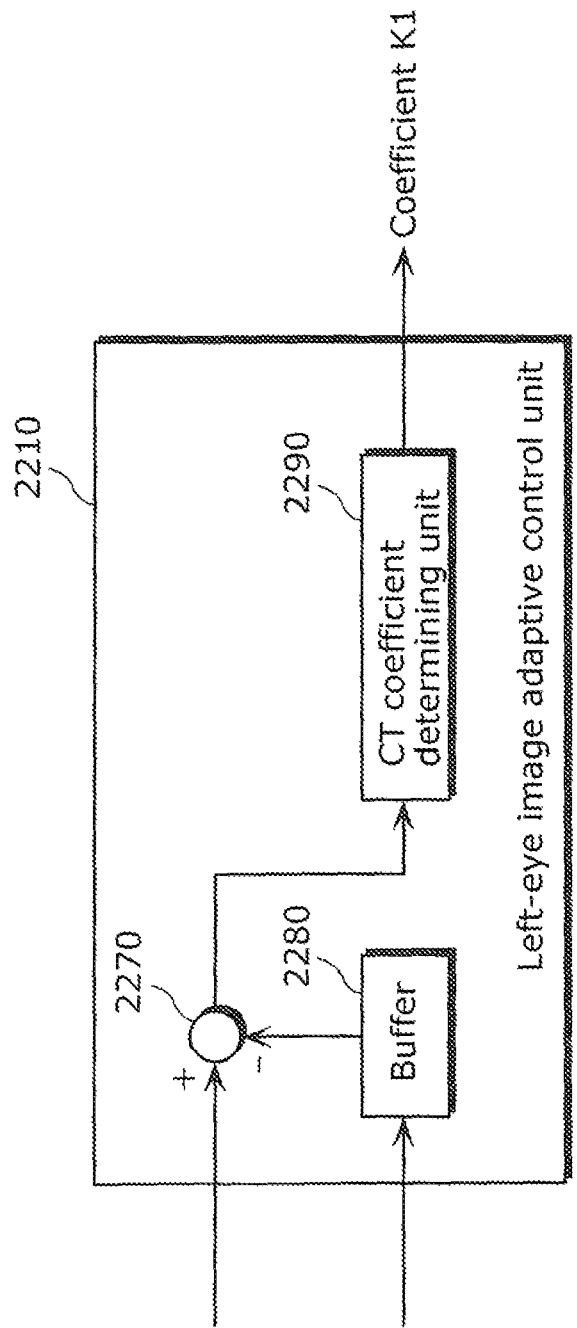
FIG. 25 is a diagram showing an example of a structure of a left-eye image adaptive control unit.

FIG. 25 is a diagram showing an example of a structure of a left-eye image adaptive control unit 2210. As shown in FIG. 25, the left-eye image adaptive control unit 2210 includes a signal comparing unit 2270, a buffer 2280, a CT (Crosstalk) coefficient determining unit 2290.

The signal comparing unit 2270 calculates the signal level ratio between the Lch input signal and the immediately-preceding Rch input signal. Examples of such a signal level ratio includes a difference video signal obtained by subtracting a CT-producing video signal (the immediately-preceding Rch input signal) that produces crosstalk from a CT-receiving video signal (Lch input signal) affected by the crosstalk. The calculated signal level ratio is output to the CT coefficient determining unit 2290. The buffer 2280 functions as a delay which temporarily holds the Rch input signal that is displayed immediately before.

The CT coefficient determining unit 2290 calculates the coefficient K1 that is a multiplier to the Rch input signal, based on the signal level ratio calculated by the signal comparing unit 2270. The method of determining such a coefficient K1 is not specifically limited. For example, it is also good to set a smaller coefficient value K1 as a signal level ratio increases.

Figure 26:
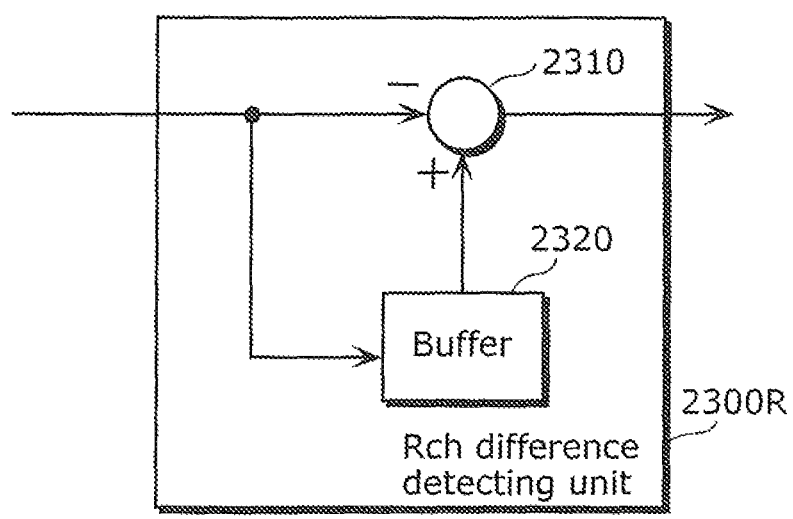
FIG. 26 is a functional block diagram of an Rch difference detecting unit.

FIG. 26 is a functional block diagram of an Rch difference detecting unit 2300R. As shown in FIG. 26, the Rch difference detecting unit 2300R includes a mixing unit 2310, and a buffer 2320. The Rch difference detecting unit 2300R sequentially obtains Rch input signals, and detects the degrees of difference between the signal levels of the pixels of temporally adjacent two Rch input signals (that is, the signal levels of the pixels of a first Rch input signal and the signal levels of the pixels of a second Rch input signal that is immediately after the first Rch input signal).

More specifically, the mixing unit 2310 subtracts each of the signal levels of the pixels of the second Rch input signal from a corresponding one of the signal levels of the pixels of the first Rch input signal. The buffer 2320 temporarily holds the obtained Rch input signal, and outputs the signal to the mixing unit 2310 as the first Rch input signal. Operations performed by the Lch difference detecting unit 2300L are the same, and thus descriptions thereof are not repeated here.

The Lch residual crosstalk detecting unit 2400L detects residual crosstalk amounts of the Lch output signal that is output from the CT canceling unit 2200, and outputs the detected residual crosstalk amounts. More specifically, the Lch residual crosstalk detecting unit 2400L outputs the largest absolute value from among the absolute values of the signal levels having a negative signal level which are of the Lch output R, Lch output G, and Lch output B of the Lch output signal. Operations performed by the Rch residual crosstalk detecting unit 2400R are the same, and thus descriptions thereof are not repeated here.

Figure 27:
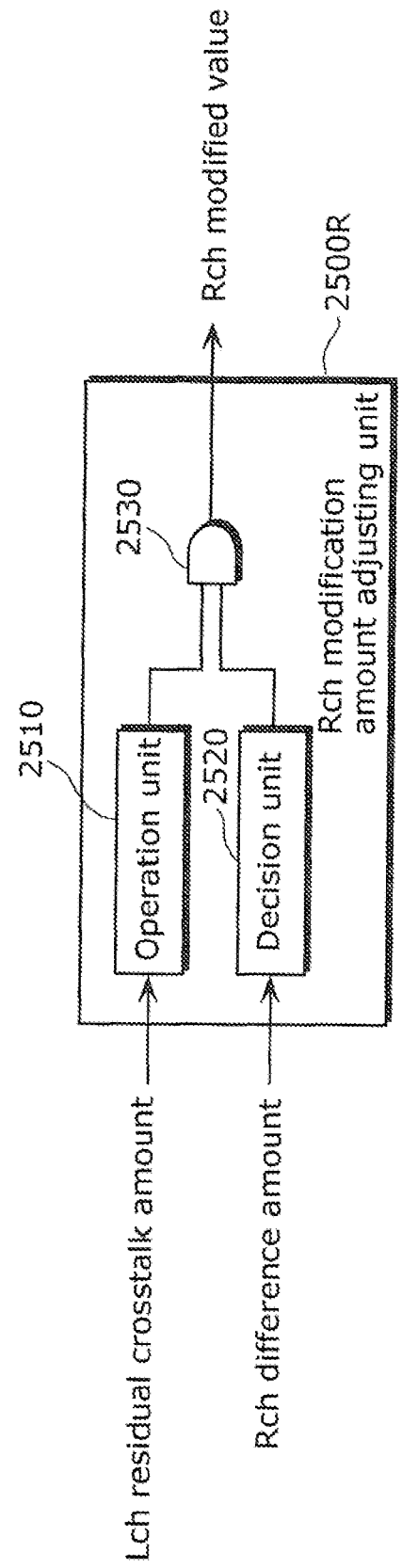
FIG. 27 is a functional block diagram of an Rch modification amount adjusting unit.

FIG. 27 is a functional block diagram of an Rch modification amount adjusting unit 2500R. As shown in FIG. 27, the Rch modification amount adjusting unit 2500R includes an operation unit 2510, a decision unit 2520, and a modification value output unit 2530.

The operation unit 2510 obtains the residual crosstalk amounts of the Lch output signal from the Lch residual crosstalk detecting unit 2400L. Next, the operation unit 2510 calculates the modification values based on the obtained residual crosstalk amounts. The modification values calculated by the operation unit 2510 are arbitrary values within a range up to the residual crosstalk amount. The method of calculating such modification values are not limited, but desirably, the modification values increase as the residual crosstalk amounts increase.

Figures 28A, 28B:
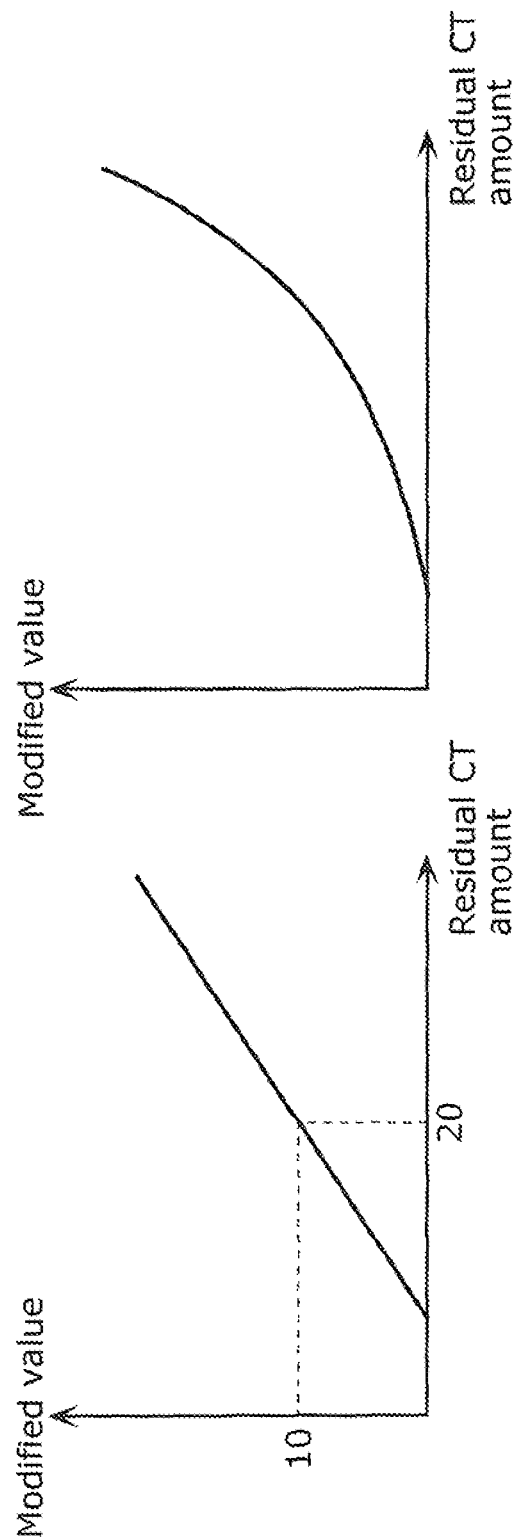
FIG. 28A is a graph showing an example of relationships between residual CT amounts and modification values.
FIG. 28B is a graph showing another example of relationships between residual CT amounts and modification values.

FIG. 28 is a graph showing the relationships between the residual crosstalk amounts ("residual CT amounts") and the modification values. As an example, as shown in FIG. 28A, it is also good to linearly increase the modification values with increase in the residual CT amounts. As another example, as shown in FIG. 28B, it is also good to exponentially increase the modification values with increase in the residual CT amounts. In the examples of FIGS. 28A and 28B, the modification amount is set to 0 when the residual CT amount is not larger than a predetermined threshold value.

Methods of calculating such modification values are not limited to the above method. For example, it is also good to always employ the raw residual crosstalk amounts as modification values. Alternatively, it is also good to set smaller modification values within the range up to the residual crosstalk amount as an Rch difference degree that is input to the decision unit 2520 increase (become closer to a first threshold value).

The decision unit 2520 obtains an Rch difference degree from the Rch difference detecting unit 2300R. The Rch difference degree is the degree of difference between the signal level of the Rch input signal that is subjected to processing performed by the Rch input signal modifying unit 2100R and the signal level of the immediately-preceding Rch input signal. The decision unit 2520 decides whether or not modification processing is executed by the Rch input signal modifying unit 2100R, based on the obtained Rch is difference degree. More specifically, such modification needs to be executed only when an Rch difference degree falls below the first threshold value.

In the case where the decision unit 2520 decides to execute modification processing, the modification value output unit 2530 outputs the modification value calculated by the operation unit 2510 to the Rch input signal modifying unit 2100R. In the opposite case where the decision unit 2520 decides not to execute modification processing, it is only necessary that the modification value output unit 2530 outputs 0 etc. The Rch modification amount adjusting unit 2500R shown in FIG. 27 determines Rch modification values, based on Lch residual crosstalk amounts (residual crosstalk is crosstalk that still remains in an Lch output signal even after crosstalk canceling is performed on the Lch output signal). However, the present invention is not limited to this, and it is also good to determine Rch modification values, based on the amount of crosstalk included in the Lch input signal. At this time, the decision unit 2520 does not always need to perform the processing of deciding whether or not to execute modification processing based on Rch difference degrees; that is, such modification processing can be skipped.

Figure 30:
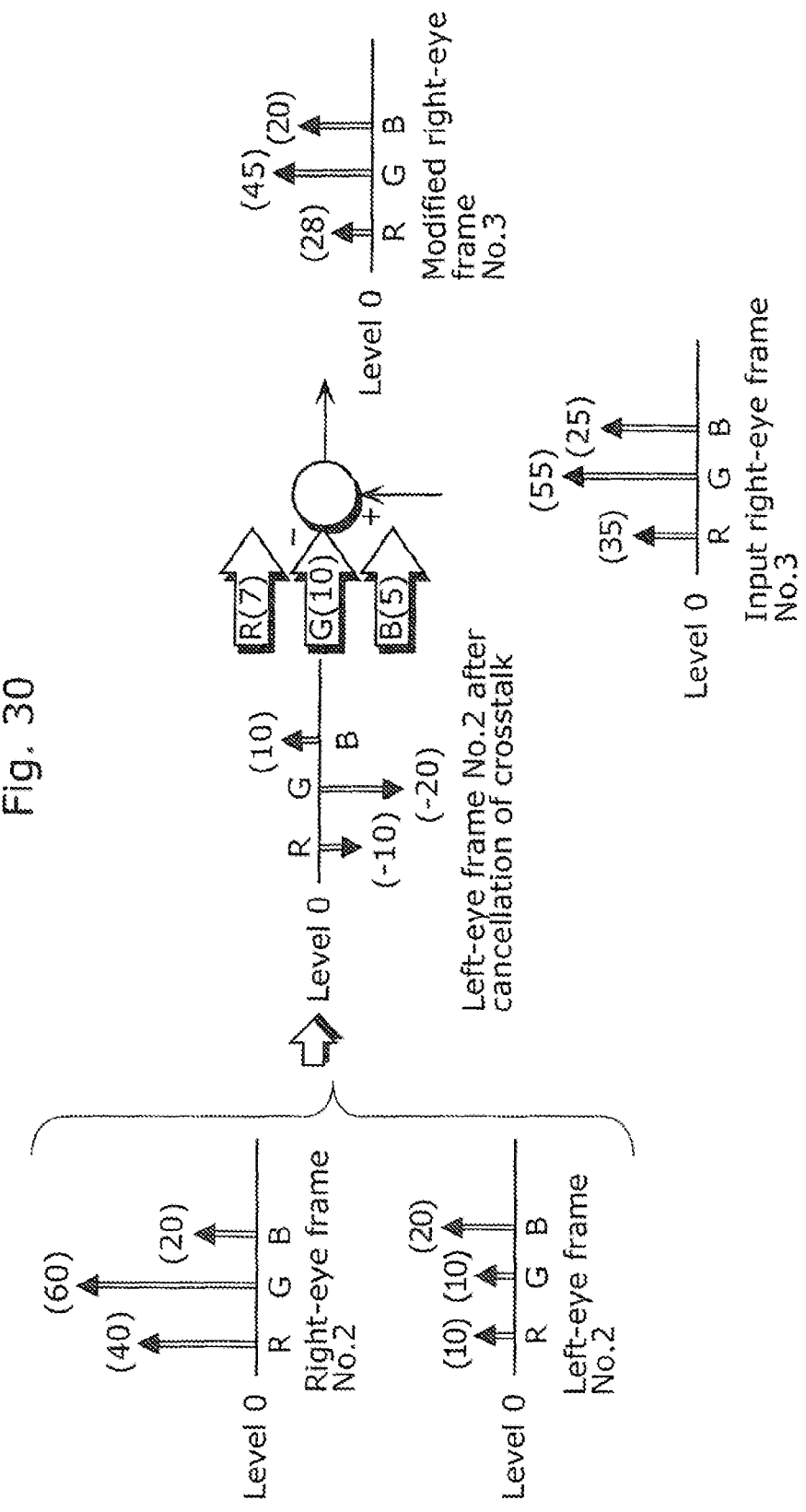
FIG. 30 is a diagram showing signal levels of red, green, and blue color components in the process performed by the CT processing unit.
Figure 31:
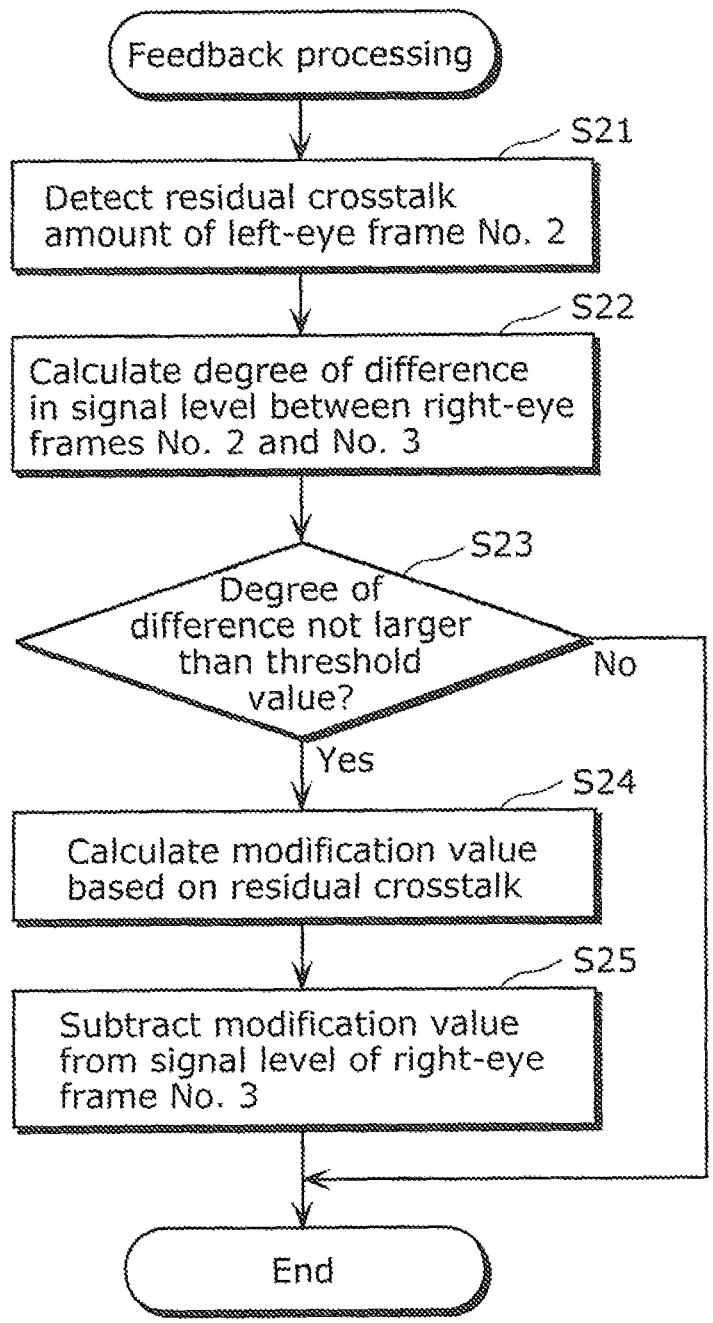
FIG. 31 is a flowchart showing operations performed by the CT processing unit.

Next, operations performed by the CT processing unit 2000 having the aforementioned structure are described with reference to FIGS. 29 to 31. FIG. 29 is a graph showing the light emission amounts (brightness levels) of right-eye frames (No. 1 to No. 3) and left-eye frames (No. 1 to No. 3) that are input to the CT processing unit 2000. FIG. 30 is a diagram showing signal levels of red, green, and blue color components in the process performed by the CT processing unit 2000. FIG. 31 is a flowchart showing operations performed by the CT processing unit 2000.

As shown in FIG. 29, the CT processing unit 2000 alternately receives inputs of right-eye frames No. 1 to No. 3 belonging to a first series (that is displayed for a user's right eye) and inputs of left-eye frames No. 1 to No. 3 belonging to a second series (that is displayed for a user's left eye). The following describes only the processing that is required to enable the Rch input signal modifying unit 2100R to perform modification processing on the right-eye frame No. 3.

The CT processing unit 2000 obtains the input right-eye frame No. 2, performs signal processing thereon, and outputs it as an output right-eye frame No. 2. At this time, the signal levels of the pixels of the input right-eye frame No. 2 are held in the buffer 2280 of the left-eye image adaptive control unit 2210 and the buffer 2320 of the Rch difference detecting unit 2300R. In the following descriptions that are given with reference to FIG. 30, a pixel located at a predetermined position (hereinafter referred to as a "particular pixel") in the input right-eye frame No. 2 held in the buffer 2280 and 2320 includes the Lch input R, the Lch input G, and the Lch input B having signal levels of, for example, 40, 60, and 20, respectively.

Next, the CT processing unit 2000 obtains the input left-eye frame No. 2, and performs signal processing thereon. In the following descriptions that are given with reference to FIG. 30, the co-located pixel in the input left-eye frame No. 2 that is input to the CT canceling unit 2200 (in other words, that is output from the Lch input signal modifying unit 2100L) includes the Lch input R, the Lch input G, and the Lch input B having signal levels of, for example, 10, 10, and 20, respectively. It is to be noted that a "co-located pixel" in this Specification is referred to as the pixel co-located with the particular pixel in an image associated with the current image (in this case, the associated image is the "input right-eye frame No. 2").

The CT canceling unit 2200 removes crosstalk of the input left-eye frame No. 2 obtained this time, using the input right-eye frame No. 2 held in the buffer 2280. For example, in the case where the coefficient K1 determined by the CT coefficient determining unit 2290 is 0.5, the crosstalk component of the red color component is 20, the crosstalk component of the green color component is 30, and the crosstalk component of the blue color component is 10. These values are subtracted from the signal level of the co-located pixel in the input left-eye frame No. 2. As a result, as shown in FIG. 30, the co-located pixel of the output left-eye frame No. 2 include the Lch output R, the Lch output G, and the Lch output B having signal levels of −10, −20, and 10, respectively. In this case, light emission control is performed assuming that the Lch output R and the Lch output G are 0 because the display panel 11 is not capable of controlling emission of light according to a negative signal.

In the case where the signal level is a positive value (Lch output B) in the output left-eye frame No. 2, the brightness level (the light emission amount) of the left-eye frame No. 2 that should be displayed on the display panel 11 exceeds the crosstalk component of the immediately-preceding right-eye frame No. 2. In this case, it is only necessary to display (produce luminescence), on the display panel 11, only the brightness level (10) corresponding to the difference between the actual brightness level (blue component=20) and the crosstalk component (10).

In the opposite case where the signal levels are negative values (Lch output R and Lch output G) in the output left-eye frame No. 2, the brightness levels of the left-eye frame No. 2 displayed on the display panel 11 are below the crosstalk components of the immediately-preceding right-eye frame No. 2. In this case, brightness levels (red color component=20, and green color component=30) exceeding the brightness levels (red color component=10, and green color component=10) that should be displayed are displayed on the display panel 11 without further producing luminescence on the display panel 11. Here, the difference values (red color component=10, and green color component=20) between the brightness levels that should be displayed and the signal levels that are actually displayed are called "residual crosstalk amounts".

The following descriptions are given with reference to the flowchart in FIG. 31. The Lch residual crosstalk detecting unit 2400L obtains the output left-eye frame No. 2, and calculates the residual crosstalk amount (S21). In this case, the residual crosstalk amount of a co-located pixel in the output left-eye frame No. 2 is 20. The calculated residual crosstalk amount is output to the Rch modification amount adjusting unit 2500R.

Next, the CT canceling unit 2200 obtains the input right-eye frame No. 3, and calculates the difference degree for the signal level of the co-located pixel (S22). More specifically, the Rch difference detecting unit 2300R detects the degree of difference between the signal levels by subtracting the signal level of the co-located pixel of the newly-input right-eye frame No. 3 from the signal level of the particular pixel of the input right-eye frame No. 2 held in the buffer 2320. The value is output to the Rch modification amount adjusting unit 2500R as the Rch difference degree. Each Rch difference degree may be one of: the largest difference degree value among the difference degree values of red, green, and blue color components; the average difference degree value of the three color components; and the value obtained by adding these three difference degree values.

Next, the decision unit 2520 of the Rch modification amount adjusting unit 2500R decides whether or not the obtained Rch difference degree is not higher than the first threshold value (S23). When it is determined that the Rch difference degree is equal to or larger than the first threshold value (No in S23), the Rch input signal modifying unit 2100R outputs the input right-eye frame No. 3 to the CT canceling unit 2200 without any modification.

When it is determined that the Rch difference degree is not higher than the first threshold value (Yes in S23), the operation unit 2510 calculates the modification value, based on the obtained residual crosstalk amount (S24). In this example, it is assumed that the modification value (10) is calculated with respect to the obtained residual crosstalk amount (20) shown in FIG. 28A. The calculated modification value is output to the Rch input signal modifying unit 2100R as an Rch modified value.

Next, the Rch input signal modifying unit 2100R performs modification according to the modified value obtained from the signal level of the co-located pixel in the input right-eye frame No. 3 (S25). For example, in the case where the co-located pixel of the input right-eye frame No. 3 includes the Rch input R, Rch input G, and Rch input B having signal levels of 35, 55, and 25, respectively, as shown in FIG. 30, 45 is obtained, as a modified signal level for the Rch input G having the largest residual crosstalk amount, by subtracting a modification value 10 from the signal level of the Rch input G. Furthermore, the signal levels of the other channels are modified to have the same contrast reduction rate as that of the Rch input G. In other words, in this example, the signal levels of the Rch input R and Rch input B are modified to 28 and 20, respectively, by subtracting the signal levels of the Rch input R and Rch input B by approximately 20%. As a result, the Rch input R, Rch input G, and Rch input B have the modified signal levels of 28, 45, and 20, respectively. The modified input right-eye frame No. 3 is output to the CT canceling unit 2200.

As described above, it is also good to provide every component with substantially the same signal level reduction rate, using, as a reference, the component having the largest residual crosstalk amount. This modification is a mere example, and thus modification is not limited to this. For example, it is also good to simply subtract the same value (in the above case, the value is "10") from each of the R, G, and B. Alternatively, it is also good to separately calculate modification values from the residual crosstalk amounts of the respective components, and to subtract the modification values from the signal levels of the respective components.

With this processing, the light emission amount of the right-eye frame No. 3 decreases (as shown by the dash-dot line in FIG. 29) from the original level (shown by the broken line in FIG. 29) by the amount corresponding to the modification value. This decrease reduces the amount of crosstalk component in the right-eye frame No. 3 at the time when the left-eye frame No. 3 is displayed. As a result, it is possible to suppress the residual crosstalk in the left-eye frame No. 3.

It is to be noted that a right-eye frame and a left-eye frame which are temporally adjacent to each other in the aforementioned three-dimensional video signal are images having contents different by the parallax between these frames. Accordingly, it is possible to estimate the tendency in temporal changes between the images belonging to a first (or second) series, based on the tendency in temporal changes between the images belonging to a second (or first) series.

In view of this, in the case where a small degree of difference (not higher than the first threshold value) is found as the difference between the signal level of a particular pixel in a right-eye frame No. 2 belonging to the first series and the signal level of a co-located pixel in the right-eye frame No. 3, it is possible to estimate a small difference as the difference between the signal level of a co-located pixel in a left-eye frame No. 2 belonging to the second series and the signal level of a co-located pixel in the left-eye frame No. 3. In this case, it is possible to estimate that the residual crosstalk amount between the particular pixel of the right-eye frame No. 2 and the co-located pixel of the left-eye frame No. 2 is close to the residual crosstalk amount between the co-located pixel of the right-eye frame No. 3 and the co-located pixel of the left-eye frame No. 3.

In this way, it is possible to effectively suppress such residual crosstalk by utilizing characteristics of the three dimensional video signal in order to modify, in advance, a signal (in the example of FIG. 29, the right-eye frame No. 3) which would affect the immediately-following signal (in the example of FIG. 29, the left-eye frame No. 3) effectively.

The above example uses only the degrees of difference between the signal levels of the pixels of the most recent two images (the particular pixel of the right-eye frame No. 2 and the co-located pixel of the right-eye frame No. 3) when the decision unit 2520 decides whether or not to execute modification. However, it is also good to make such a decision based on the degrees of difference from an image prior to the most recent two images with an aim to estimate the tendency in temporal changes more precisely. More specifically, the decision unit 2520 may further obtain the difference degrees of the signal levels of the co-located pixels in the right-eye frame No. 1 and right-eye frame No. 2, and execute modification on the right-eye frame No. 3 only when both the two difference degrees fall below the first threshold value.

In addition, the Rch input signal modifying unit 2100R executes modification such that the ratio between the signal levels of the Rch input R, Rch input G, and Rch input B is maintained, and therefore, the hue of the output right-eye frame to be displayed on the display panel 11 is substantially the same as the original hue of the input right-eye frame. In other words, it is possible to achieve image processing in which hue change is minimized.

Embodiment 6

Figure 32:
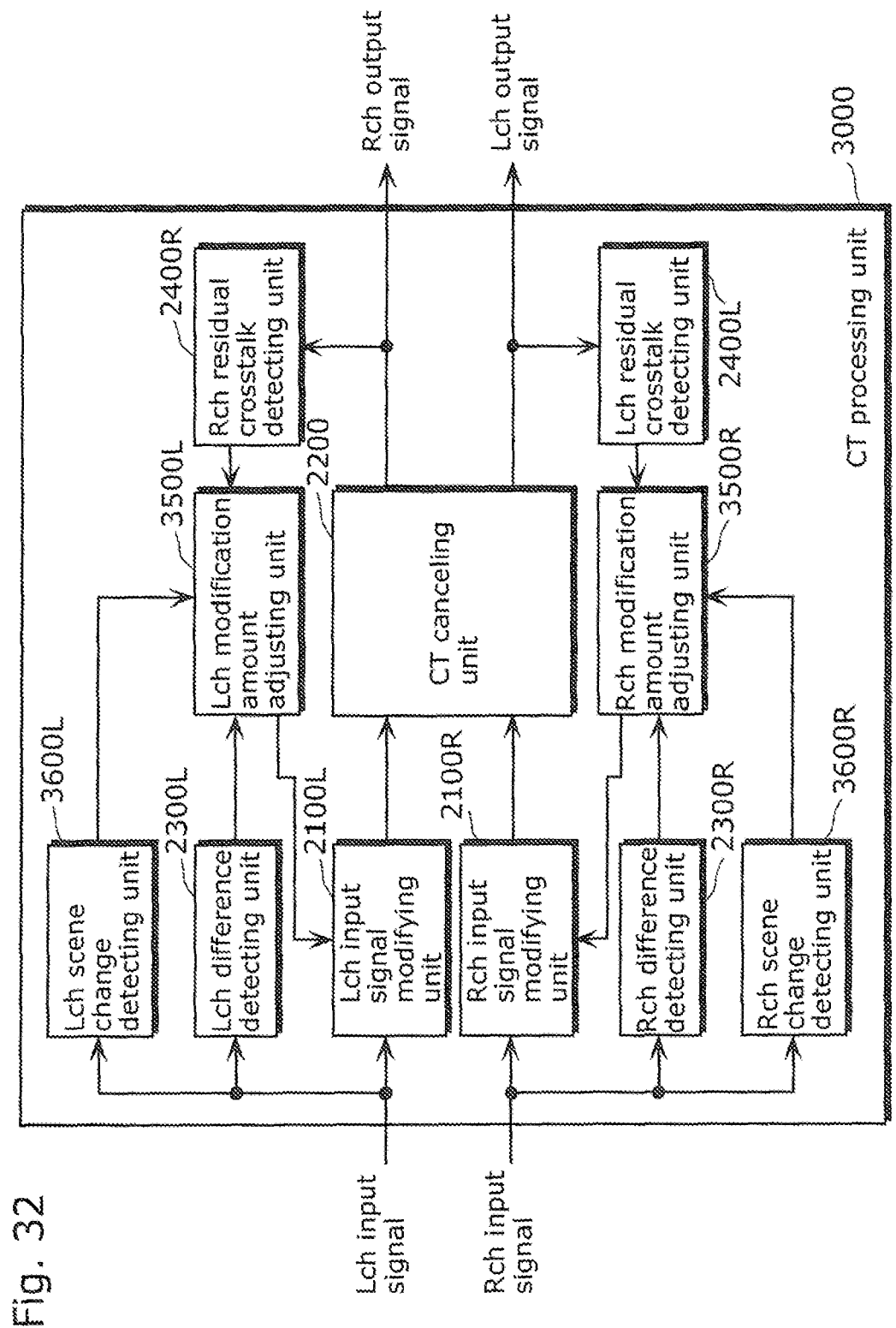
FIG. 32 is a functional block diagram of a CT processing unit according to Embodiment 6.
Figure 33:
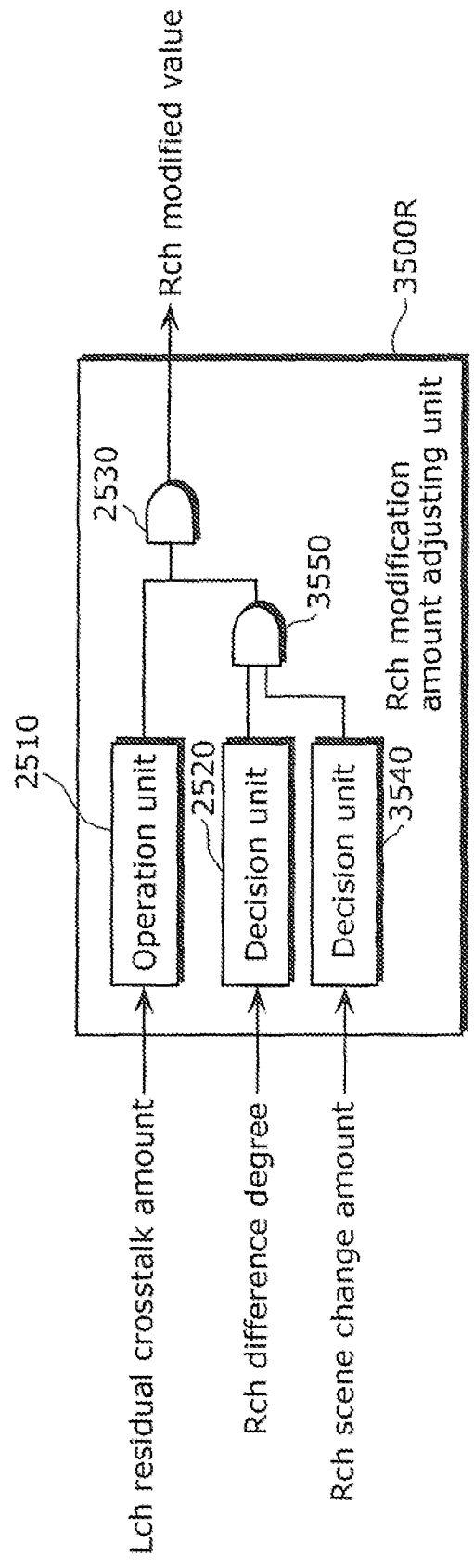
FIG. 33 is a functional block diagram of an Rch modification amount adjusting unit according to Embodiment 6.

Next, a CT processing unit 3000 according to Embodiment 6 of the present invention is described with reference to FIG. 32 and FIG. 33. FIG. 32 is a functional block diagram of the CT processing unit 3000 according to Embodiment 6. FIG. 33 is a functional block diagram of an Rch modification amount adjusting unit 3500R according to Embodiment 6. The same structural elements as those of the CT processing unit 2000 in Embodiment 5 are assigned with the same reference numerals, and detailed descriptions thereof are not repeated here.

As shown in FIG. 32, the CT processing unit 3000 according to Embodiment 6 includes an Lch input signal modifying unit 2100L, an Rch input signal modifying unit 2100R, a CT canceling unit 2200, an Lch difference detecting unit 2300L, an Rch difference detecting unit 2300R, an Lch residual crosstalk detecting unit 2400L, an Rch residual crosstalk detecting unit 2400R, an Lch modification amount adjusting unit 3500L, an Rch modification amount adjusting unit 3500R, an Lch scene change detecting unit 3600L, and an Rch scene change detecting unit 3600R.

The Rch scene change detecting unit 3600R calculates scene change amounts (Rch scene change amounts) of temporally adjacent two images from among the images belonging to the same series. Methods of calculating such Rch scene change amounts are not specifically limited. For example, it is good to accumulate, in units of a frame (or a predetermined segment area), the signal level difference degree calculated, in units of a pixel, by the Rch difference detecting unit 2300R. Furthermore, the Rch scene change detecting unit 3600R calculates the average value for each of consecutive frames, performs statistical operations on the average value using parameters in combination, to detect a scene change. Examples of such parameters include: the amount of difference in the center of gravity between the frames; the distribution of the average values; and the difference between the average values. Operations for obtaining an Lch scene amount are the same, and thus the same description is not repeated here.

As shown in FIG. 33, the Rch modification amount adjusting unit 3500R further includes a decision unit 3540, and a decision output unit 3550, in addition to an operation unit 2510; a decision unit 2520; and a modification value output unit 2530.

The decision unit 3540 makes a decision that the Rch input signal modifying unit 2100R executes modification when all of conditions that all the respective parameters (hereinafter referred to as a scene change amount as a whole) that are used to determine the Rch scene changes obtained from the Rch scene change detecting unit 3600R fall below their predetermined threshold values. Whether or not to execute modification on the right-eye frame No. 3 shown in FIG. 29 is decided based on the Rch scene change amounts of the most recent two frames (the right-eye frame No. 1 and the right-eye frame No. 2) belonging to the same series.

The decision output unit 3550 finally decides whether or not to execute modification based on the decisions made by the decision units 2520 and 3540. For example, the decision output unit 3550 outputs a decision of executing modification only when both the decision units 2520 and 3540 make a decision that the modification should be executed, and outputs a decision of not executing modification when at least one of the decision units 2520 and 3540 makes a decision that no modification should be executed.

In Embodiment 6, the decision output unit 3550 decides whether or not to execute modification by obtaining not only the difference degrees in units of a pixel as outcome of the detection by the Rch difference detecting unit 2300R but also scene change amounts in units of a frame as outcome of the detection by the Rch scene change detecting unit 3600R. This makes it possible to estimate the tendency in temporal changes more precisely, and thereby achieving a more effective suppression of residual crosstalk.

Embodiment 7

Next, a CT processing unit 4000 according to Embodiment 7 of the present invention is described with reference to FIG.

Figure 34:
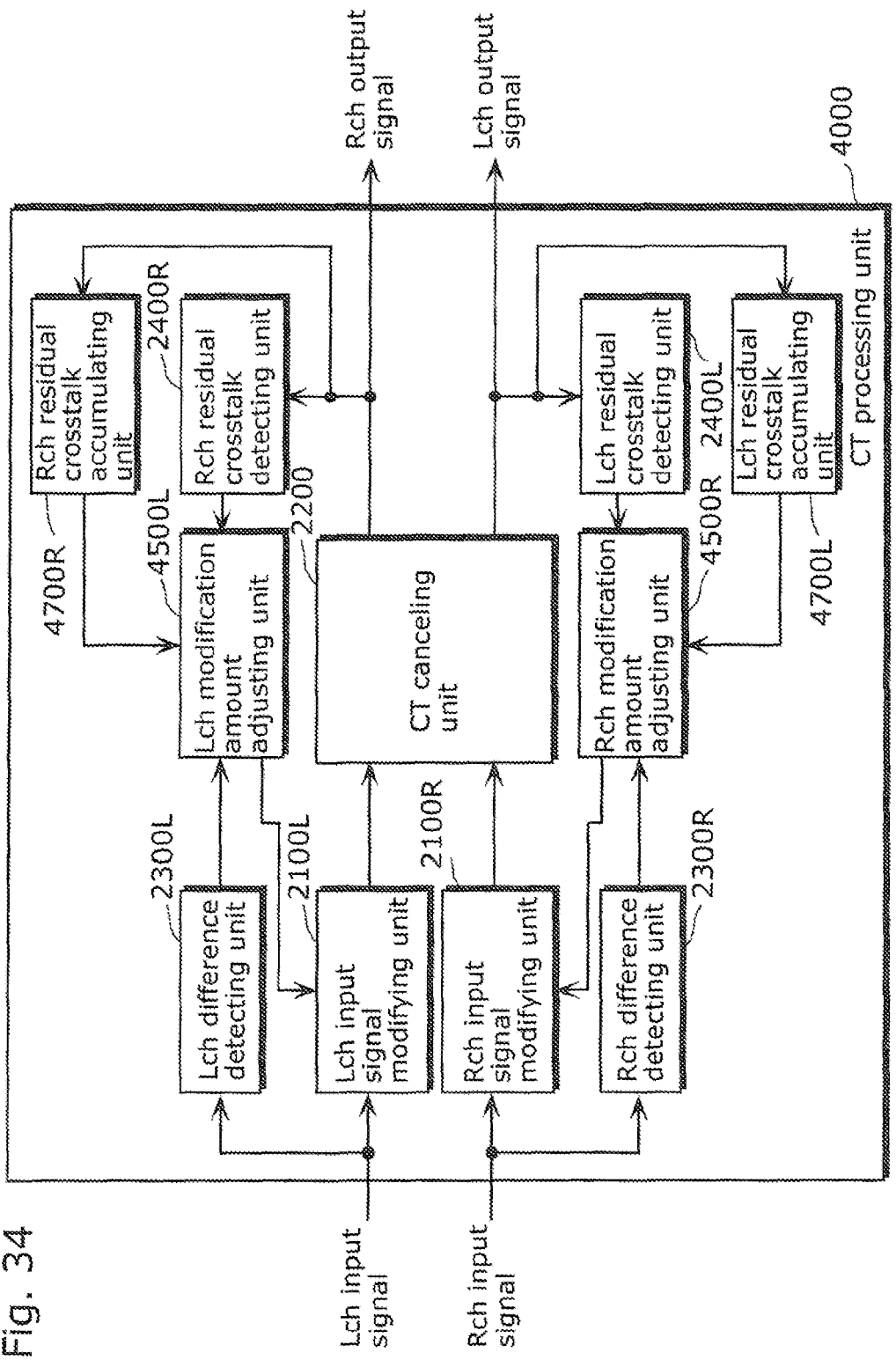
FIG. 34 is a functional block diagram of a CT processing unit according to Embodiment 7.
Figure 37A:
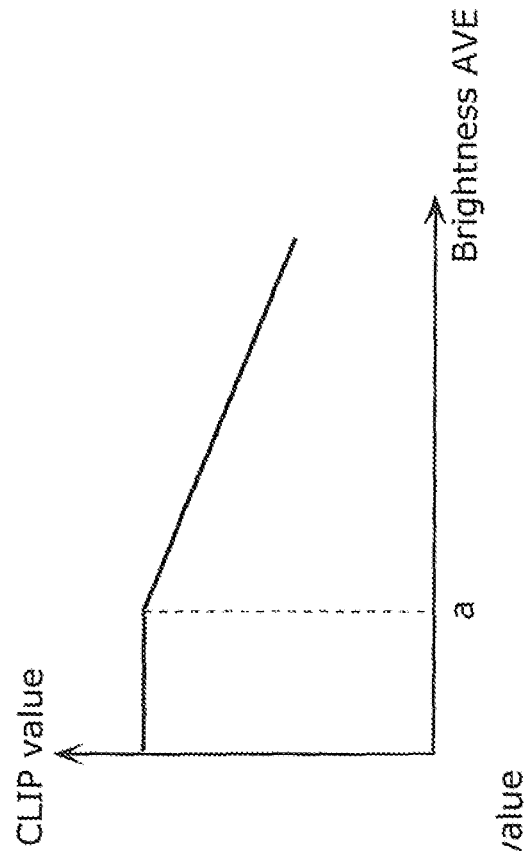
FIG. 37A is a graph showing relationships between residual CT accumulated values and CLIP values.
Figure 37B:
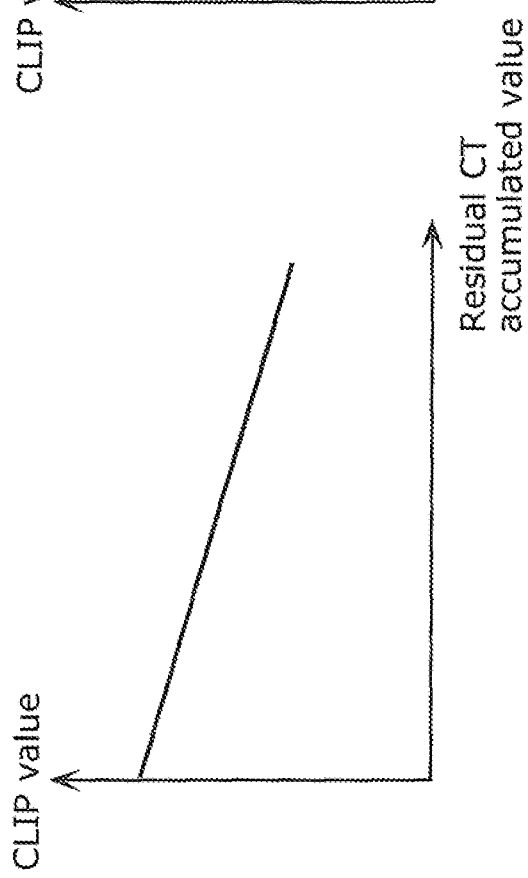
FIG. 37B is a graph showing relationships between brightness AVE and CLIP values.
Figure 38:
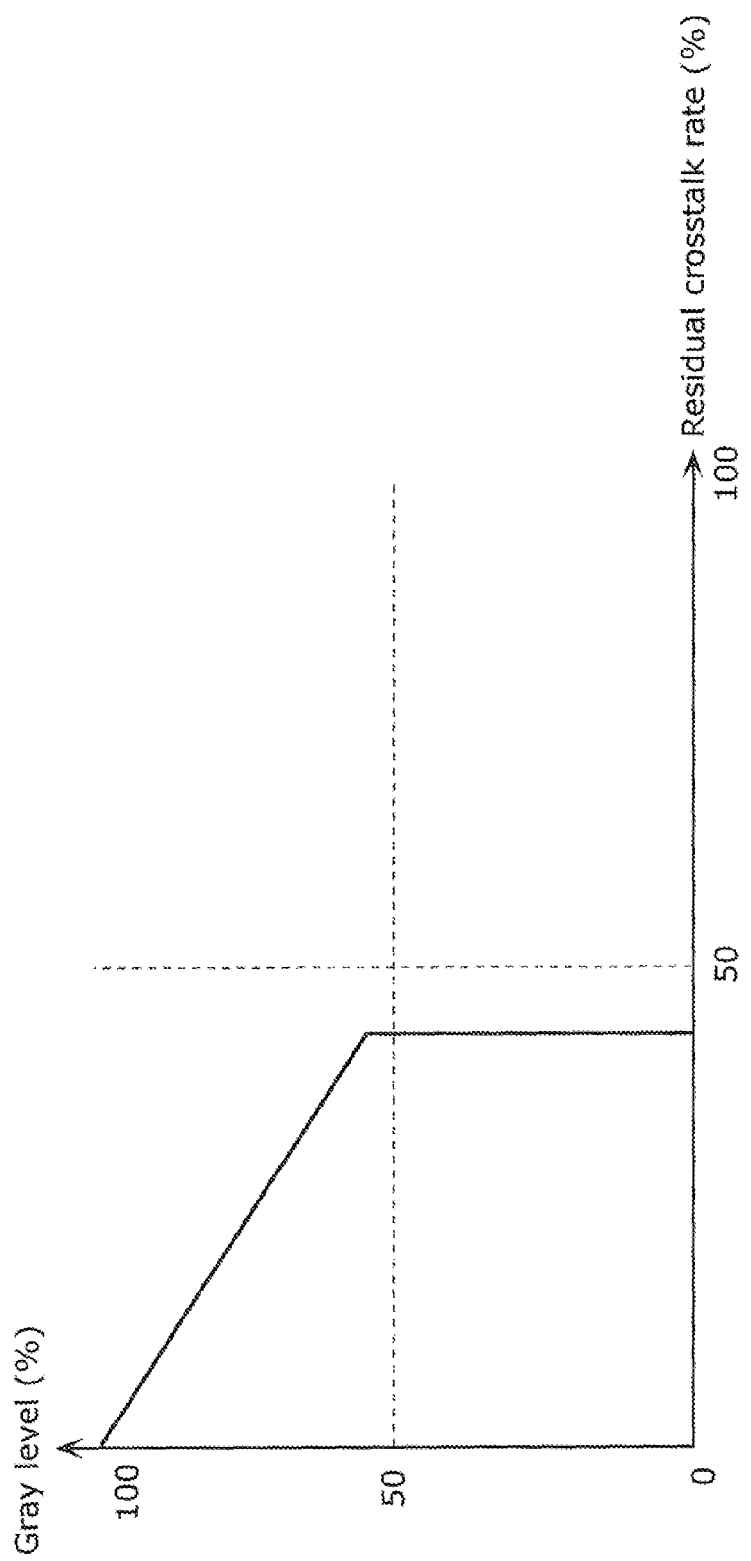
FIG. 38 is a graph showing relationships between residual crosstalk rates and gray levels.

34 to FIG. 38. FIG. 34 is a functional block diagram of the CT processing unit 4000 according to Embodiment 7. FIG. 35 is a functional block diagram of a residual crosstalk accumulating unit 4700. FIG. 36 is a functional block diagram of an Rch modification amount adjusting unit 4500R. Each of FIG. 37A and FIG. 37B is a graph showing relationships between either residual CT accumulated values or brightness AVE and CLIP values. FIG. 38 is a graph showing relationships between residual crosstalk rates and gray levels. The same structural elements as those of the CT processing units 2000 and 3000 in Embodiments 5 and 6 are assigned with the same reference numerals, and thus detailed descriptions thereof are not repeated here.

As shown in FIG. 34, the CT processing unit 4000 according to Embodiment 7 includes an Lch input signal modifying unit 2100L, an Rch input signal modifying unit 2100R, a CT canceling unit 2200, an Lch difference detecting unit 2300L, an Rch difference detecting unit 2300R, an Lch residual crosstalk detecting unit 2400L, an Rch residual crosstalk detecting unit 2400R, an Lch modification amount adjusting unit 4500L, an Rch modification amount adjusting unit 4500R, an Lch residual crosstalk accumulating unit 4700L, and an Rch residual crosstalk accumulating unit 4700R.

The residual crosstalk accumulating unit 4700L obtains the Lch output signal, and calculates the residual crosstalk accumulated value of the left-eye frame in units of a frame (or a predetermined segment area). With reference to FIG. 35, descriptions are given of detailed structures of the Lch residual crosstalk accumulating unit 4700L and Rch residual crosstalk accumulating unit 4700R (called a "residual crosstalk accumulating unit 4700" as a whole).

As shown in FIG. 35, the residual crosstalk accumulating unit 4700 includes signal modifying units 4710L and 4710R, an absolute value calculating units 4720L and 4720R, LPF (Low Path Filter) units 4730L and 4730R, and frame accumulating units 4740L and 4740R. The residual crosstalk accumulating unit 4700 is configured to allow independent execution of processing on a left-eye frame and processing on a right-eye frame. Thus, processing on one side (left-eye frame) is described here.

The signal modifying unit 4710L detects the signal level of an Lch output signal that is output from the CT canceling unit 2200, and modifies the signal level as necessary. More specifically, the signal modifying unit 4710L modifies the signal level of the Lch output signal that is input to 0 and outputs the signal having the modified signal level when the signal level of the Lch output signal is 0 or more, that is, the signal level is a positive value. In contrast, when the signal level of the Lch output signal to be input is not higher than 0, that is, the signal level is a negative value, the signal modifying unit 4710L outputs the signal having the value without such modification. In this way, only a signal having a negative value (that is, including residual crosstalk) from among the Lch output signals processed by the CT canceling unit 2200 is extracted by the signal modifying unit 4710L.

The absolute value calculating unit 4720L calculates the absolute value of the signal modified by the signal modifying unit 4710L. The LPF unit 4730L reduces the change rate of the value calculated by the absolute value calculating unit 4720L. More specifically, the LPF unit 4730L performs LPF operations in which some of the signals sequentially output from the absolute value calculating unit 4720L are decimated at a predetermined rate, and outputs the pass signals. The frame accumulating unit 4740L accumulates the signals output from the LPF unit 4730L in units of a frame (or a predetermined segment area).

In other words, the output signal from the Lch residual crosstalk accumulating unit 4700L corresponds to (the representative value of) the amounts of residual crosstalk included in the Lch output signal corresponding to a frame. The calculated residual crosstalk accumulated value is output to the Rch modification amount adjusting unit 4500R. The processing may be executed for each of the red, green, and blue color components. Alternatively, all the values may be accumulated without distinguishing such color components.

As shown in FIG. 36, the Rch modification amount adjusting unit 4500R includes an operation unit 2510, a decision unit 2520, a modification value output unit 2530, and an adjusting unit 4560. Operations performed by the Lch modification amount modifying unit 4500L are the same, and thus descriptions thereof are not repeated here.

The adjusting unit 4560 calculates a CLIP value, based on the Lch residual crosstalk accumulated value obtained from the Lch residual crosstalk accumulating unit 4700L. Methods of calculating the CLIP value are not specifically limited. For example, as shown in FIG. 37A, it is only necessary that the absolute value of the CLIP value is set to be smaller as the residual crosstalk accumulated value is larger. In this example, the CLIP value is assumed to be 8.

A CLIP value is used to determine the largest modification value that is output from the modification value output unit 2530, and is always a positive value. The residual crosstalk accumulated value used to calculate the CLIP value is the residual crosstalk accumulated value of the left-eye frame immediately preceding the right-eye frame that is currently being processed by the CT processing unit 4000.

Next, the adjusting unit 4560 obtains the modification value calculated by the operation unit 2510. Here, as in the case of FIG. 30, the modification value is assumed to be 10. Next, the adjusting unit 4560 compares the obtained modification value and the calculated CLIP value, and outputs the smallest one as the final modification value. In this case, the modification value is 8.

When the Rch input signal modifying unit 2100R modifies, using this modification value, the input right-eye frame No. 3 shown in FIG. 30, the pixel of the modified right-eye frame No. 3 includes the Rch input R, the Rch input G, and the Rch input B having signal levels of 29, 47, and 21, respectively.

The modification value (8) in Embodiment 7 is smaller than the addition value (10) in Embodiment 5. More specifically, the upper limit for the modification value is limited to the CLIP value. In other words, the Rch modification amount adjusting unit 4500R defines the upper limit for the modification value, according to the characteristics (residual crosstalk accumulated value) of the immediately-preceding Lch input signal.

Here, a larger modification value can suppress residual crosstalk more significantly in one-time modification process. However, such a larger modification value reduces the signal level of the right-eye frame No. 3 more significantly, and thus change in brightness (change to darkness) may be too noticeable in the right-eye frame No. 3 displayed on the display panel 11. To prevent this, it is possible to balance the suppression of residual crosstalk and changes in brightness by placing a limit for the largest signal level value to be subtracted in one modification processing.

The parameters as bases in CLIP value calculation are not limited to the residual crosstalk amount accumulated value. For example, it is also good to calculate a CLIP value using the average brightness level of the immediately-preceding frame belonging to the same series as the frame to be modified.

For example, the Rch average brightness calculating unit (not shown) obtains the Rch input signal, and calculates the average brightness level of the input right-eye frame in units of a frame (or a predetermined segment area). Calculation methods are not specifically limited. For example, it is only necessary to calculate an arithmetic average of the brightness levels of all the pixels of the input right-eye frame. Operations performed by the Lch average brightness calculating unit (not shown) are the same, and thus descriptions thereof are not repeated here.

Methods of calculating such a CLIP value are not specifically limited. For example, the CLIP value is set to be smaller as the average brightness level is higher. More specifically, as shown in FIG. 37B, it is good that the CLIP value is fixed (at the maximum) in the case where the average brightness level (denoted as "Brightness AVE") is not higher than a predetermined threshold value a, and otherwise, the absolute value of the CLIP value is set to be smaller as the average brightness level is higher. This is an example of CLIP value setting methods considering that residual crosstalk is likely to occur in a dark scene as a whole, but is unlikely to occur in a bright scene.

Furthermore, the adjusting unit 4560 modifies the modification value obtained from the operation unit 2510 to calculate a new modification value. More specifically, the adjusting unit 4560 calculates the new modification value by multiplying the modification value obtained from the operation unit 2510 with a predetermined coefficient (gray level). For example, as shown in FIG. 38, the adjusting unit 4560 decreases the gray level as the residual crosstalk rate increases. Furthermore, the adjusting unit 4560 sets the gray level to 0 when the residual crosstalk rate reaches a predetermined threshold value b (for example, 45%).

A residual crosstalk rate is a value obtained by using, as the denominator, the maximum value (255 in the case of 8-bit representation) for the signal level, and using, as the numerator, the absolute value of the signal level of the largest value component. Accordingly, a large residual crosstalk rate is substantially the same as the absolute value of the signal level of the largest value component.

When the Lch output B is the largest value component, the adjusting unit 4560 may execute processing for decreasing the gray level more significantly than when either the Lch output R or the Lch output G is the largest value component. This is based on the characteristics of the display panel 11 on which the blue color components produce a small amount of persistence compared to the red color component and the green color component.

Figure 39:
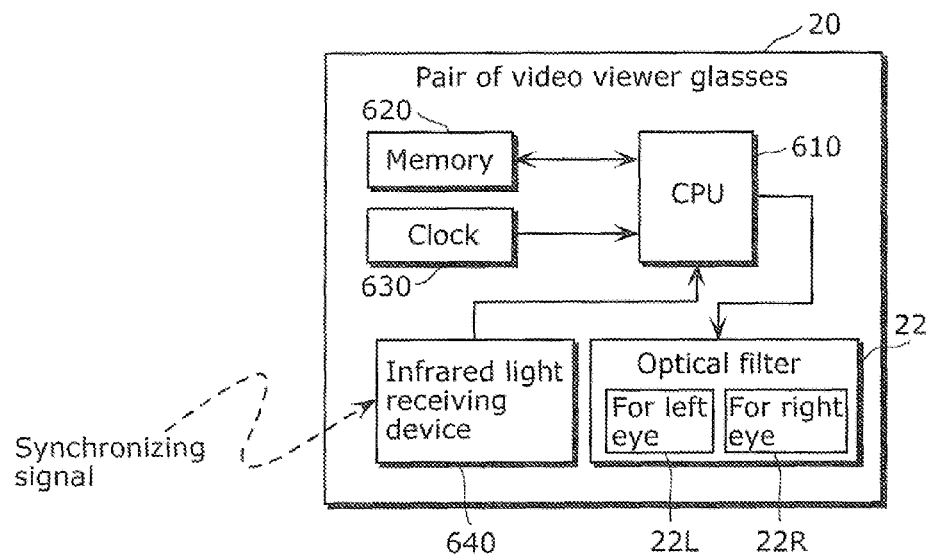
FIG. 39 is a diagram of a hardware structure of a pair of video viewer glasses according to an embodiment of the present invention.

Next, a structure of a pair of video viewer glasses 20 is described in detail with reference to FIG. 39 and FIG. 40. FIG. 39 is a diagram showing an example of a hardware structure of the pair of video viewer glasses 20. FIG. 40 is a functional block diagram of the pair of video viewer glasses 20.

As shown in FIG. 39, the pair of video viewer glasses 20 includes a CPU 610, a memory 620, a clock 630, optical filters 22, and an infrared light receiving device 640. The optical filters 22 include a left-eye optical filter 22L and a right-eye optical filter 22R shown in FIG. 1.

The CPU 610 controls the whole pair of video viewer glasses 20. The CPU 610 mainly controls the pair of video viewer glasses, particularly the optical filters 22 by executing a predetermined software program.

The memory 620 stores data, as a medium for storing such a software program executed by the CPU 610, or a medium for temporarily storing various parameters used when the software program is executed by the CPU 610. The memory 620 may be a volatile one, a non-volatile one, or a combination of these.

The clock 630 generates a reference signal (clock signal) that is necessary when the CPU 610 etc operates. A crystal oscillator or any other oscillator can be used as the clock 630. Alternatively, it is possible to divide or multiply a clock signal generated by the clock 630.

The optical filters 22 include a left-eye optical filter 22L provided for the left eye of a viewer wearing the pair of video viewer glasses 20 and a right-eye optical filter 22R provided for the viewer's right eye. The optical filters 22 adjust the amounts and characteristics of light incident to the both eyes, and the like.

The infrared light receiving device 640 receives a synchronizing signal that is transmitted from outside, particularly from the video display apparatus 10. In this embodiment, the infrared light receiving device 640 is used as an example because an infrared light is used as such a synchronizing signal. However, receiving elements are not limited to this. In the case of receiving a synchronizing signal using radio transmission etc., any receiving elements (such as an antenna and a tuner) for receiving the radio are possible. In short, any receiving elements capable of properly receiving such a synchronizing signal are possible irrespective of the kinds.

As shown in FIG. 40, the pair of video viewer glasses 20 includes, an external synchronizing signal receiving unit 710, a synchronizing signal detecting unit 720, a synchronizing signal analyzing unit 730, a synchronizing information storing unit 740, an internal synchronizing signal generating unit 750, an optical filter control unit 760, and optical filters 22.

The external synchronizing signal receiving unit 710 receives a synchronizing signal transmitted using an infrared light from the video display apparatus 10. The external synchronizing signal receiving unit 710 outputs the electric signal to the synchronizing signal detecting unit 720 according to the received infrared light. The external synchronizing signal receiving unit 710 corresponds to the infrared light receiving device 640 in the hardware configuration shown in FIG. 39. As stated in the description of the hardware configuration shown in FIG. 39, this embodiment describes an example case of using an infrared light, but methods of transmitting and receiving such a synchronizing signal is not limited to the method using an infrared light. It is also good to use radio transmission or the like as transmitting and receiving means.

The synchronizing signal detecting unit 720 detects a synchronizing signal that is an electric signal output from the external synchronizing signal receiving unit 710. More specifically, a signal having a predetermined electric waveform or the like is detected as a synchronizing signal.

The synchronizing signal analyzing unit 730 analyzes information such as time intervals for causing the optical filters 22 to operate, based on the synchronizing signal detected by the synchronizing signal detecting unit 720. The information such as time intervals for causing the optical filters 22 to operate is, for example, information about open/close timing of the left-eye filter and the right-eye filter. The synchronizing signal detecting unit 720 and the synchronizing signal analyzing unit 730 correspond to some parts of the program executed by the CPU 610 in the hardware configuration in FIG. 39.

The synchronizing information storing unit 740 stores or holds control information relating to operation details of the optical filters 22 analyzed by the synchronizing signal analyzing unit 730. The synchronizing information storing unit 740, corresponds to the memory 620 in the hardware configuration in FIG. 39. More specifically, the CPU 610 records the information into the memory 620.

The internal synchronizing signal generating unit 750 generates a synchronizing signal inside the pair of video viewer glasses 20, based on either the synchronizing information recorded in the synchronizing information storing unit 740 or the synchronizing information (time interval information etc.) analyzed by the synchronizing signal analyzing unit 730. The internal synchronizing signal generating unit 750 corresponds to the CPU 610 and the clock 630 in the hardware configuration in FIG. 39.

The optical filter control unit 760 performs operation control of the right and left optical filters 22 which are of the pair of video viewer glasses 20 and are provided for both eyes. For example, the optical filter control unit 760 performs control such as adjusting the amount of light that is passed through the optical filters 22. The optical filter control unit 760 corresponds to one of the following in the hardware configuration in FIG. 39: the program that is executed by the CPU 610 to control the optical filters; and a driving circuit etc. for driving optical filters 22 that are described later.

The optical filters 22 of the pair of video viewer glasses are provided for both eyes, and intended to adjust transparent light incident to the right and left eyes. Various kinds of optical filters can be used as such optical filters 22. Examples include a filter for adjusting the amount of transparent light or a filter for adjusting the deflection of transparent light. Such an optical filter 22 may be a filter that includes a liquid crystal element and adjusts the amount of transparent light by controlling the liquid crystal element.

This embodiment describes, as an example, a case in which a right-eye image and a left-eye image in a video are alternately displayed on the video display apparatus 10. In this case, as for the operations of the optical filters 22, the left-eye optical filter 22L and the right-eye optical filter 22R operate like shutters that alternately increase and decrease the amount of transparent light. This embodiment describes using this case as an example, but operations performed by the optical filters 22 are not limited to this. Other examples include optical filters for causing light incident to the right eye and light incident to the left eye deflect in mutually different directions. In short, any optical filters capable of adjusting transparent light in synchronization with a video displayed on the video display apparatus 10 are possible irrespective of the kinds.

The correspondence between the hardware configuration shown in FIG. 39 and the functional blocks shown in FIG. 40 is a specific example of a correspondence used for the descriptions in this embodiment, and such a correspondence is not limited to this. Other hardware configuration and software configurations are also possible.

The pair of video viewer glasses 20 described in this embodiment is intended to generate an internal synchronizing signal, based on a synchronizing signal received from outside, and causes its optical filters 22 to operate based on the internal synchronizing signal. However, the pair of video viewer glasses 20 may operate in a different manner. The pair of video viewer glasses 20 may control the optical filter control unit 760, directly based on a synchronizing signal received from outside without generating such an internal synchronizing signal. In this case, it is possible to configure a pair of video viewer glasses 20 in a relatively simple manner.

The respective embodiment described above show examples of processing a three-dimensional video signal in which left-eye images and right-eye images between which parallax is present are alternately output. However, the present invention is not limited to three-dimensional video signals, and is also applicable to two-dimensional video signals.

(Other Variations)

The present invention has been described above based on the above embodiments. As a matter of course, the present invention is not limited to those embodiments. The following cases are also included within the scope of the present invention.

Each of the aforementioned apparatus is, specifically, a computer system including a microprocessor, a ROM, a RAM, a hard disk unit, a display unit, a keyboard, a mouse, and so on. A computer program is stored in the RAM or hard disk unit. The respective apparatuses achieve their functions through the microprocessor's operations according to the computer program. Here, with an aim to achieve predetermined functions, the computer program is configured by combining plural instruction codes indicating instructions for the computer.

A part or all of the constituent elements constituting the respective apparatuses may be configured with a single system-LSI (Large-Scale Integration). The system-LSI is a super-multi-function LSI manufactured by integrating constituent units on a single chip, and is specifically a computer system configured to include a microprocessor, a ROM, a RAM, and so on. A computer program is stored in the RAM. The system-LSI achieves its function through the microprocessor's operation according to the computer program. A part or all of the constituent elements constituting the respective apparatuses may be configured as an IC card which can be attached to and detached from the respective apparatuses or as a stand-alone module. The IC card or the module is a computer system configured from a microprocessor, a ROM, a RAM, and so on. The IC card or the module may also be included in the aforementioned super-multi-function LSI. The IC card or the module achieves its function through the microprocessor's operation according to the computer program. The IC card or the module may also be implemented to be tamper-resistant.

The present invention may be implemented as methods including the steps corresponding to the unique constituent units of the above-described apparatuses. The present invention, may be implemented as computer programs for executing the above-described methods, using a computer, and may also be implemented as digital signals including the computer programs.

Furthermore, the present invention may also be implemented as the aforementioned computer programs or digital signals recorded on a computer readable recording media such as a flexible disc, a hard disk, a CD-ROM, an MO, a DVD, a DVD-ROM, a DVD-RAM, a BD (Blu-ray Disc), and a semiconductor memory. Furthermore, the present invention may also be implemented as digital signals recorded on these recording media.

Furthermore, the present invention may also be implemented as the aforementioned computer programs or digital signals transmitted via a telecommunication line, a wireless or wired communication line, a network represented by the Internet, a data broadcast, and so on.

The present invention may also be a computer system including a microprocessor and a memory, in which the memory stores the aforementioned computer program and the microprocessor operates according to the computer program.

Furthermore, by transferring the programs or the digital signals recorded on the aforementioned recording media, or by transferring the programs or digital signals via the aforementioned network and the like, execution using another independent computer system is also made possible.

Accordingly, any combinations of the above-described embodiments and variations are included within the scope of the present invention.

Some exemplary embodiments of the present invention have been described with reference to the drawings, but the present invention is not limited to those embodiments described above and illustrated in the drawings. Those skilled in the art will readily appreciate that many modifications and variations are possible in the exemplary embodiments and the drawings without materially departing from the novel teachings and advantages of the present invention. Accordingly, all such modifications and variations are intended to be included within the scope of the present invention.

INDUSTRIAL APPLICABILITY

The present invention is advantageously applicable to video signal processing apparatuses and video display apparatuses.

What is claimed is:

1. A video signal processing apparatus which processes, using signals of a first image included in a video, signals of a second image that is an image immediately following the first image,
   wherein each of the pixels of the first image and the second image is represented as a combination of a signal level of a red color component, a signal level of a green color component, and a signal level of a blue color component, said video signal processing apparatus comprising:
   a crosstalk canceling unit configured to calculate, for each of the red color component, the green color component, and the blue color component of each of the pixels, a crosstalk component that (i) is produced by the first image and (ii) affects the second image, and subtract the crosstalk component from a corresponding one of the signal levels of the co-located pixel of the second image, to generate a modified second image that includes pixels each represented as a combination of a signal level of a modified red color component, a signal level of a modified green color component, and a signal level of a modified blue color component; and
   a saturation modification processing unit configured to (i) extract a component having a negative signal level and having the largest absolute value from among the modified red color component, the modified green color component, and the modified blue color component, (ii) update, to 0, the signal level of the extracted component and (iii) add, to the signal levels of the other two color components, an addition value calculated using the absolute value of the signal level of the extracted component.

2. The video signal processing apparatus according to claim 1,
   wherein said saturation modification processing unit is configured to control an upper limit for the addition value, in accordance with characteristics of a predetermined area of an image immediately preceding the second image.

3. The video signal processing apparatus according to claim 2, further comprising
   an average brightness calculating unit configured to calculate an average brightness level of each of pixels of the immediately-preceding image,
   wherein said saturation modification processing unit is configured to lower the upper limit for the addition value as the average brightness level calculated by said average brightness calculating unit is higher.

4. The video signal processing apparatus according to claim 2, further comprising
   a residual crosstalk accumulating unit configured to accumulate a negative signal level selected from among signal levels of the pixels of the modified second image that corresponds to the immediately-preceding image processed by said crosstalk canceling unit,
   wherein said saturation modification processing unit is configured to lower the upper limit for the addition value as the negative signal level accumulated by said residual crosstalk accumulation unit is larger.

5. The video signal processing apparatus according to claim 2, further comprising
   a residual crosstalk accumulating unit configured to accumulate the number of pixels having a signal level equal to or lower than a predetermined value among the pixels of the modified second image that corresponds to the immediately-preceding image processed by said crosstalk canceling unit,
   wherein said saturation modification processing unit is configured to lower the upper limit for the addition value as the number of pixels accumulated by said residual crosstalk accumulation unit is larger.

6. The video signal processing apparatus according to claim 1,
   wherein said saturation modification processing unit is further configured to determine a smaller coefficient as the absolute value of the signal level of the extracted component is larger, and multiply the absolute value of the signal level of the extracted component value with the coefficient to obtain the addition value.

7. The video signal processing apparatus according to claim 6,
   wherein said saturation modification processing unit is configured to decrease the addition value more significantly when the modified blue color component is the extracted component than when either the modified red color component or the modified green color component is the extracted component.

8. The video signal processing apparatus according to claim 1,
   wherein said video signal processing apparatus is a three-dimensional video signal processing apparatus which alternately outputs a left-eye image and a right-eye image between which parallax is present,
   wherein the first image is one of the left-eye image and the right-eye image, and
   wherein the second image is the other one of the left-eye image and the right-eye image.

9. The video signal processing apparatus according to claim 8, further comprising:
   an input signal modifying unit configured to modify the second image in accordance with characteristics of a predetermined area of an image immediately preceding the second image.

10. A video display apparatus which processes, using signals of a first image included in a video, signals of a second image that is an image immediately following the first image, and displays the second image,
    wherein each of the pixels of the first image and the second image is represented as a combination of a signal level of a red color component, a signal level of a green color component, and a signal level of a blue color component, said video display apparatus comprising:

a crosstalk canceling unit configured to calculate, for each of the red color component, the green color component, and the blue color component of each of the pixels, a crosstalk component that (i) is produced by the first image and (ii) affects the second image, and subtract the crosstalk component from a corresponding one of the signal levels of the co-located pixel of the second image, to generate a modified second image that includes pixels each represented as a combination of a signal level of a modified red color component, a signal level of a modified green color component, and a signal level of a modified blue color component;

a saturation modification processing unit configured to (i) extract a component having a negative signal level and having the largest absolute value from among the modified red color component, the modified green color component, and the modified blue color component, (ii) update, to 0, the signal level of the extracted component and (iii) add, to the signal levels of the other two color components, an addition value calculated using the absolute value of the signal level of the extracted component; and a display unit configured to display the modified second image generated by said saturation modification processing unit.

11. The video display apparatus according to claim 10, wherein said saturation modification processing unit is configured to control an upper limit for the addition value, in accordance with characteristics of a predetermined area of an image immediately preceding the second image.

12. The video display apparatus according to claim 11, further comprising
an average brightness calculating unit configured to calculate an average brightness level of each of pixels of the immediately-preceding image,
wherein said saturation modification processing unit is configured to lower the upper limit for the addition value as the average brightness level calculated by said average brightness calculating unit is higher.

13. The video display apparatus according to claim 12, further comprising
a residual crosstalk accumulating unit configured to accumulate a negative signal level selected from among signal levels of the pixels of the modified second image that corresponds to the immediately-preceding image processed by said crosstalk canceling unit,
wherein said saturation modification processing unit is configured to lower the upper limit for the addition value as the accumulated value by said residual crosstalk accumulation unit is larger.

14. The video display apparatus according to claim 10, wherein said saturation modification processing unit is further configured to determine a smaller coefficient as the absolute value of the signal level of the extracted component is larger, and multiply the absolute value of the signal level of the extracted component with the coefficient to obtain the addition value.

15. The video display apparatus according to claim 14, wherein said saturation modification processing unit is configured to decrease the addition value more significantly when the modified blue color component is the extracted component than when either the modified red color component or the modified green color component is the extracted component.

16. The video display apparatus according to claim 10, wherein said video signal processing apparatus is a three-dimensional video signal processing apparatus which alternately outputs a left-eye image and a right-eye image between which parallax is present,
wherein the first image is one of the left-eye image and the right-eye image, and
wherein the second image is the other one of the left-eye image and the right-eye image.

17. The video display apparatus according to claim 16, further comprising:
an input signal modifying unit configured to modify the second image in accordance with characteristics of a predetermined area of an image immediately preceding the second image.

18. A video signal processing method of processing, using signals of a first image included in a video, signals of a second image that is an image immediately following the first image,
wherein each of the pixels of the first image and the second image is represented as a combination of a signal level of a red color component, a signal level of a green color component, and a signal level of a blue color component,
said video signal processing method comprising:
calculating, for each of the red color component, the green color component, and the blue color component of each of the pixels, a crosstalk component that (i) is produced by the first image and (ii) affects the second image, and subtracting the crosstalk component from a corresponding one of the signal levels of the co-located pixel of the second image, to generate a modified second image that includes pixels each represented as a combination of a signal level of a modified red color component, a signal level of a modified green color component, and a signal level of a modified blue color component;
extracting a component having a negative signal level and having the largest absolute value from among the modified red color component, the modified green color component, and the modified blue color component;
updating, to 0, the signal level of the extracted component; and
adding, to the signal levels of the other two color components, an addition value calculated using the absolute value of the signal level of the extracted component.

19. An integrated circuit which processes, using signals of a first image included in a video, signals of a second image that is an image immediately following the first image,
wherein each of the pixels of the first image and the second image is represented as a combination of a signal level of a red color component, a signal level of a green color component, and a signal level of a blue color component,
said integrated circuit comprising:
a crosstalk canceling unit configured to calculate, for each of the red color component, the green color component, and the blue color component of each of the pixels, a crosstalk component that (i) is produced by the first image and (ii) affects the second image, and subtract the crosstalk component from a corresponding one of the signal levels of the co-located pixel of the second image, to generate a modified second image that includes pixels each represented as a combination of a signal level of a modified red color component, a signal level of a modified green color component, and a signal level of a modified blue color component; and
a saturation modification processing unit configured to (i) extract a component having a negative signal level and having the largest absolute value from among the modified red color component, the modified green color component, and the modified blue color component, (ii) update, to 0, the signal level of the extracted component and (iii) add, to the signal levels of the other two color components, an addition value calculated using the absolute value of the signal level of the extracted component.

\* \* \* \* \*